United States Patent
Ohara et al.

(10) Patent No.: US 10,122,462 B2
(45) Date of Patent: Nov. 6, 2018

(54) TRANSPORT APPARATUS AND TRANSPORT METHOD

(71) Applicant: NIPPON TELEGRAPH AND TELEPHONE CORPORATION, Tokyo (JP)

(72) Inventors: Takuya Ohara, Yokosuka (JP); Kei Kitamura, Yokosuka (JP); Yoshiaki Kisaka, Yokosuka (JP); Shigeki Aisawa, Yokosuka (JP); Masahiro Suzuki, Yokosuka (JP); Etsushi Yamazaki, Yokosuka (JP); Tomoyoshi Kataoka, Yokosuka (JP); Masahito Tomizawa, Yokosuka (JP); Yoshiaki Yamada, Yokosuka (JP); Mitsuhiro Teshima, Yokosuka (JP); Akira Hirano, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 235 days.

(21) Appl. No.: 15/126,557

(22) PCT Filed: Nov. 19, 2014

(86) PCT No.: PCT/JP2014/080612
§ 371 (c)(1),
(2) Date: Sep. 15, 2016

(87) PCT Pub. No.: WO2015/141061
PCT Pub. Date: Sep. 24, 2015

(65) Prior Publication Data
US 2017/0111116 A1    Apr. 20, 2017

(30) Foreign Application Priority Data
Mar. 20, 2014    (JP) .................................. 2014-059129

(51) Int. Cl.
*H04B 10/00*    (2013.01)
*H04B 10/40*    (2013.01)
(Continued)

(52) U.S. Cl.
CPC ............. *H04B 10/40* (2013.01); *H04B 10/27* (2013.01); *H04B 10/5161* (2013.01); *H04B 10/60* (2013.01)

(58) Field of Classification Search
CPC ......... H04B 10/40; H04B 10/50; H04B 10/60
See application file for complete search history.

(56) References Cited

U.S. PATENT DOCUMENTS

2002/0165962 A1*  11/2002  Alvarez ................... G06F 8/65
                                                          709/226
2008/0080860 A1    4/2008   Katagiri
(Continued)

FOREIGN PATENT DOCUMENTS

CN      1419758 A       5/2003
CN    203423700 U       2/2014
(Continued)

OTHER PUBLICATIONS

Partial Supplementary European Search Report for parallel application EP 14885881.4, EPO, Munich, dated Oct. 6, 2017.
(Continued)

Primary Examiner — Daniel Dobson
(74) Attorney, Agent, or Firm — Harness, Dickey & Pierce, P.L.C.

(57)    ABSTRACT

A transport apparatus includes: a client signal transceiving unit which transceives a client signal; a line signal transceiving unit which performs electric-optic conversion on a line signal to be transmitted, transmits an optical line signal, performs optic-electric conversion on a received line signal, and outputs an electrical line signal; and a plurality of signal
(Continued)

processing units which perform signal processing on the client signal to generate the line signal to be transmitted and perform signal processing on the electrical line signal to generate the client signal. Each of the plurality of signal processing units includes a signal transceiving unit which performs transfer of a branched signal obtained by branching a signal to be transmitted and a merged signal obtained by merging received signals with another signal processing unit, and the signal transceiving unit of each of the plurality of signal processing units and the signal transceiving unit of the other signal processing unit are coupled via an inter-chip wiring.

11 Claims, 58 Drawing Sheets

(51) Int. Cl.
*H04B 10/516* (2013.01)
*H04B 10/60* (2013.01)
*H04B 10/27* (2013.01)
*H04J 14/00* (2006.01)

(56) References Cited

U.S. PATENT DOCUMENTS

| | | |
|---|---|---|
| 2009/0190931 A1 | 7/2009 | Hamano et al. |
| 2010/0142525 A1 | 6/2010 | Cho et al. |
| 2010/0281343 A1 | 11/2010 | Caggioni et al. |
| 2010/0287449 A1 | 11/2010 | Kubo et al. |
| 2014/0270776 A1 | 9/2014 | Jinno et al. |
| 2014/0314401 A1* | 10/2014 | Fujimori ............... H04B 10/038 398/5 |
| 2017/0257169 A1* | 9/2017 | Kitamura ................ H04J 14/08 |

FOREIGN PATENT DOCUMENTS

| | | |
|---|---|---|
| EP | 2348654 A1 | 7/2011 |
| JP | 2001/186518 A | 7/2001 |
| JP | 2010/263555 A | 11/2010 |
| JP | 5917629 B2 | 5/2016 |
| WO | WO-2011/030423 A1 | 3/2011 |
| WO | WO-2011/145218 A1 | 11/2011 |
| WO | WO-2012/0147889 A1 | 11/2012 |

OTHER PUBLICATIONS

ITU-T Recommendation G.709/Y.1331, Interfaces for the Optical Transport Network (OTN), Feb. 2012.
Jinno et al., IEICE Technical Report OCS2011-21, 2011.
International Search Report issued in PCT/JP2014/080612 (in English and Japanese), dated Feb. 17, 2015; ISA/JP.
Office Action issued in counterpart Application No. JP 2013-106509 (with English Translation), dated May 24, 2016.
Office Action in the parallel Application CN 201480077203.9, dated Dec. 4, 2017, with partial translation of Search Report.

* cited by examiner

| Row# \ Column# | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | Frame Alignment overhead | | | | | | | OTUk overhead | | | | | | | OPUk overhead | |
| 2 | RES | PM& TCM | TCM ACT | TCM6 | | | | TCM5 | | | TCM4 | | | FTFL | | |
| 3 | TCM3 | GCC2 | | TCM2 | | | | TCM1 | | | PM | | EXP | | | |
| 4 | GCC1 | | | APS/PCC | | | | RES | | | | | | | | |

TRANSPORT APPARATUS AND TRANSPORT METHOD

CROSS-REFERENCE TO RELATED APPLICATIONS

This application is a 371 U.S. National Stage of International Application No. PCT/JP2014/080612, filed Nov. 19, 2014, which claims priority to Japanese Patent Application No. 2014-059129, filed Mar. 20, 2014, the contents of both of which are incorporated herein by reference.

TECHNICAL FIELD

The present invention relates to a technique of a transport apparatus that relays signals.

BACKGROUND ART

A 100 gigabit per second (Gbps) transport apparatus receives a 100 G Ethernet (registered trademark) (100 GE) client signal, for example, and maps the client signal to an optical-channel transport unit 4 (OTU4) transport frame by a framing processing unit. Then, the transport apparatus performs digital signal processing for performing signal equalization or the like by a signal processing unit, transfers an electrical signal output from the signal processing unit to an optical transceiver that performs electric-optic (E/O) conversion, converts the electrical signal into an optical signal by the optical transceiver, converts the optical signal into a 100 G line signal by means of modulation using dual polarization quadrature phase shift keying (DP-QPSK), and transfers the line signal.

In up-to 100 G transport apparatuses, generally, a client signal corresponding to 100 G is input, and a line signal corresponding to 100 G is output. In this case, one client signal is input and one line signal is output.

On the other hand, in forthcoming beyond-100 G transport apparatuses, for example, when 100 GE×3 client signals are input, 150 G signals modulated by means of 8-quadrature amplitude modulation (8 QAM) may be transported via a super-channel having two central wavelengths. By doing so, the same analog-to-digital converter (ADC) and digital-to-analog converter (DAC) as used in the 100 G transport apparatus can be used. In this case, three client signals are input and two line signals are output. A specific example of a transport frame is OTUk (k=1, 2, 3, 4) defined by ITU-T Recommendation G.709, "Interfaces for Optical Transport Network (OTN)" (Non-Patent Document 1).

PRIOR ART DOCUMENT

Non-Patent Document

Non-Patent Document 1: ITU-T Recommendation G.709/Y.1331, "Interfaces for the Optical Transport Network (OTN)", February 2012

SUMMARY OF INVENTION

Problems to be Solved by the Invention

As described above, in the up-to 100 G transport apparatuses, generally, one client signal is input and one line signal is output. For example, a 100 G client signal is transported via one 100 G channel which uses QPSK modulation. Thus, one input client signal is processed by one signal processing unit (chip) in the transport apparatus and the signal subjected to the signal processing is output to the line side.

Here, one client signal refers to a client signal corresponding to a bit rate which can be processed by the transport apparatus. The client signal may be defined as one 100 G client signal (100 GE×1). The client signal may be defined as (10 GE×10) by multiplexing ten 10 GE signals.

In the future, in the beyond-100 G transport apparatuses, when signals exceeding 100 G are transferred on the line side, the signals may be transported via a super-channel. Signals of a plurality of wavelengths that form the super-channel may be output from a plurality of signal processing units (chips). For example, three 100 GE client signals (100 GE×3) may be transported via two (150 G×2) super-channels which use 8 QAM modulation.

However, the transport apparatus described above does not have a function of branching or merging signals and a function of allowing a plurality of signal processing units to transceive the branched signals. Thus, the transport apparatus described above cannot branch three 100 GE client signals (100 GE×3) to two signal processing units (chips), process the branched signals, and transport the processed signals via two super-channels.

In view of the above circumstances, an object of the present invention is to provide a technique of allowing a plurality of client signals to be transferred as a plurality of line signals of different systems.

Means for Solving the Problems

An aspect of the present invention is a transport apparatus including: a client signal transceiving unit which transceives a client signal; a line signal transceiving unit which performs electric-optic conversion on a line signal to be transmitted, transmits an optical line signal, performs optic-electric conversion on a received line signal, and outputs an electrical line signal; and a plurality of signal processing units which perform signal processing on the client signal to generate the line signal to be transmitted and perform signal processing on the electrical line signal to generate the client signal, wherein each of the plurality of signal processing units comprises a signal transceiving unit which performs transfer of a branched signal obtained by branching a signal to be transmitted and a merged signal obtained by merging received signals with another signal processing unit, and the signal transceiving unit of each of the plurality of signal processing units and the signal transceiving unit of the other signal processing unit are coupled via an inter-chip wiring.

Preferably, in the transport apparatus, each of the plurality of signal processing units comprises a signal branching/merging unit which branches a signal to be transferred to the other signal processing unit among signals to be transferred from the client signal transceiving unit to the line signal transceiving unit and merges signals transferred from the other signal processing unit among signals to be transferred from the line signal transceiving unit to the client signal transceiving unit.

Preferably, in the transport apparatus, each of the plurality of signal processing units comprises a signal merging/branching unit which merges signals to be transferred from the client signal transceiving unit to the line signal transceiving unit and branches a signal to be transferred from the line signal transceiving unit to the client signal transceiving unit.

Preferably, in the transport apparatus, each of the plurality of signal processing units further comprises a framing processing unit which performs framing on the client signal input from the client signal transceiving unit and recovers the client signal from a frame received from the line signal transceiving unit.

Preferably, in the transport apparatus, each of the plurality of signal processing units further comprises a digital signal processing unit which performs signal processing on a signal to be transferred from the client signal transceiving unit to the line signal transceiving unit and a signal to be transferred from the line signal transceiving unit to the client signal transceiving unit.

Preferably, in the transport apparatus, each of the plurality of signal processing units performs rate conversion between the client signal transceived with a first transfer rate and the line signal transceived with a second transfer rate, and each of the plurality of signal processing units comprises: a transmission-side framing processing unit which sets the client signal received with the first transfer rate in a transport frame that is compliant with a third transfer rate, inserts a dummy signal having a deficient data amount for transfer with the third transfer rate into the transport frame that is compliant with the third transfer rate, and transmits the transport frame that is compliant with the third transfer rate with the third transfer rate; a transmission-side digital signal processing unit which sets the client signal set in the transport frame received with the third transfer rate from the transmission-side framing processing unit in a transport frame that is compliant with the second transfer rate and transmits the transport frame that is compliant with the second transfer rate with the second transfer rate as the line signal; a reception-side digital signal processing unit which sets a client signal in a transport frame received with the second transfer rate as the electrical line signal in the transport frame that is compliant with the third transfer rate, inserts a dummy signal having a deficient data amount for transfer with the third transfer rate into the transport frame that is compliant with the third transfer rate, and transmits the transport frame that is compliant with the third transfer rate with the third transfer rate; and a reception-side framing processing unit which extracts the client signal set in the transport frame received with the third transfer rate from the reception-side digital signal processing unit and transmits the extracted client signal with the first transfer rate.

Preferably, in the transport apparatus, the client signal transceiving unit receives the client signal and outputs a signal having a frame structure to the plurality of signal processing units, each of the plurality of signal processing units comprises: a distribution unit which divides the signal having the frame structure based on a value equal to or larger than the number of bytes of an overhead element used for detecting the frame structure of the signal having the frame structure to generate a plurality of blocks of the same size and distributes the blocks to a plurality of lanes so that a block including the overhead element among the blocks is included in each lane; a transmission-side signal processing unit which detects the frame structure based on the overhead element included in each of signals of the plurality of lanes distributed by the distribution unit and performs transmission-side signal processing on each of the signals of the plurality of lanes; a transmitting unit which transmits signals included in the plurality of lanes, having been subjected to the transmission-side signal processing as the line signal; a reception-side signal processing unit which performs reception-side signal processing corresponding to the transmission-side signal processing performed by the transmission-side signal processing unit on the electrical line signal and outputs signals having been subjected to the reception-side signal processing to the lanes; and a coupling unit which detects the frame structure based on the overhead element included in the signals having been subjected to the reception-side signal processing and distributed to the plurality of lanes and couples the signals having been subjected to the reception-side signal processing and distributed to the plurality of lanes, wherein the client signal transceiving unit receives a signal coupled by the coupling unit and outputs the client signal.

An aspect of the present invention is a transport apparatus including: a client signal transceiving unit which transceives a client signal; a mapping unit which maps the received client signal to a first transport frame; a transmission-side rate conversion unit which performs rate conversion on the first transport frame to generate a second transport frame; a line signal transceiving unit which converts the second transport frame obtained by the rate conversion into an optical signal, transmits the converted optical signal as a line signal, converts a received line signal into an electrical signal, and outputs an electrical line signal; a reception-side rate conversion unit which performs rate conversion on a third transport frame included in the electrical line signal to generate a fourth transport frame; and a demapping unit which extracts a client signal from the fourth transport frame and outputs the extracted client signal to the client signal transceiving unit.

Preferably, in the transport apparatus, the client signal transceiving unit transceives the client signal with a first transfer rate, and the line signal transceiving unit transceives the line signal with a second transfer rate, the mapping unit sets the client signal received with the first transfer rate in the first transport frame that is compliant with a third transfer rate, the transport apparatus comprises a transmission-side framing processing unit which inserts a dummy signal having a deficient data amount for transfer with the third transfer rate into the first transport frame and transmits the first transport frame with the third transfer rate, the transmission-side rate conversion unit sets the client signal set in the first transport frame received from the transmission-side framing processing unit in the second transport frame that is compliant with the second transfer rate and transmits the second transport frame with the second transfer rate, the reception-side rate conversion unit sets a client signal in the third transport frame received with the second transfer rate as the electrical line signal in the fourth transport frame that is compliant with the third transfer rate, inserts a dummy signal having a deficient data amount for transfer with the third transfer rate into the fourth transport frame, and transmits the fourth transport frame with the third transfer rate, and the demapping unit extracts the client signal set in the fourth transport frame received from the reception-side rate conversion unit and transmits the extracted client signal to the client signal transceiving unit with the first transfer rate.

Preferably, in the transport apparatus, the mapping unit receives the client signal and outputs a signal having a frame structure, the transport apparatus comprises: a distribution unit which divides the signal having the frame structure based on a value equal to or larger than the number of bytes of an overhead element used for detecting the frame structure of the signal having the frame structure to generate a plurality of blocks of the same size and distributes the blocks to a plurality of lanes so that a block including the overhead element among the generated blocks is included in each lane; and a transmission-side signal processing unit which detects the frame structure based on the overhead element included in each of signals of the plurality of lanes distributed by the distribution unit and performs transmission-side signal processing on each of the signals of the plurality of lanes, the line signal transceiving unit transmits signals included in the plurality of lanes, having been subjected to the transmission-side signal processing; the transport apparatus comprises: a reception-side signal processing unit which performs reception-side signal processing corresponding to the transmission-side signal processing performed by the transmission-side signal processing unit on the electrical line signal and outputs signals having been subjected to the reception-side signal processing to the lanes; and a coupling unit which detects the frame structure based on the overhead element included in the signals having been subjected to the reception-side signal processing and distributed to the plurality of lanes and couples the signals having been subjected to the reception-side signal processing and distributed to the plurality of lanes, and the client signal transceiving unit receives a signal coupled by the coupling unit and outputs the client signal.

An aspect of the present invention is a transport method including: a step of receiving a client signal; a step of transferring a branched signal obtained by branching a signal to be transmitted and a merged signal obtained by merging received signals between each of a plurality of signal processing units and another signal processing unit via an inter-chip wiring that couples the plurality of signal processing units; a step of performing signal processing on the client signal in the plurality of signal processing units to generate a line signal to be transmitted; a step of performing optic-electric conversion on the line signal to be transmitted and transmitting an optical line signal; a step of performing optic-electric conversion on a received line signal to output an electrical line signal; a step of performing signal processing on the electrical line signal in the plurality of signal processing units to generate a client signal; and a step of transmitting the generated client signal.

Advantageous Effects of the Invention

With the present invention, it is possible to transfer a plurality of client signals as a plurality of line signals of different systems.

BRIEF DESCRIPTION OF DRAWINGS

FIG. 10A is a diagram illustrating an example of dividing a frame into blocks.

FIG. 10B is a diagram illustrating an example of dividing a frame into blocks.

FIG. 10C is a diagram illustrating an example of dividing a frame into blocks.

FIG. 10D is a diagram illustrating an example of dividing a frame into blocks.

FIG. 10E is a diagram illustrating an example of dividing a frame into blocks.

FIG. 23A is a diagram illustrating a frame configuration of a transport frame in accordance with the fourth embodiment.

FIG. 27 is a diagram illustrating fields of an overhead.

MODES FOR CARRYING OUT THE INVENTION

Hereinafter, embodiments of the present invention will be described with reference to the drawings.

<First Embodiment>

Figure 1:
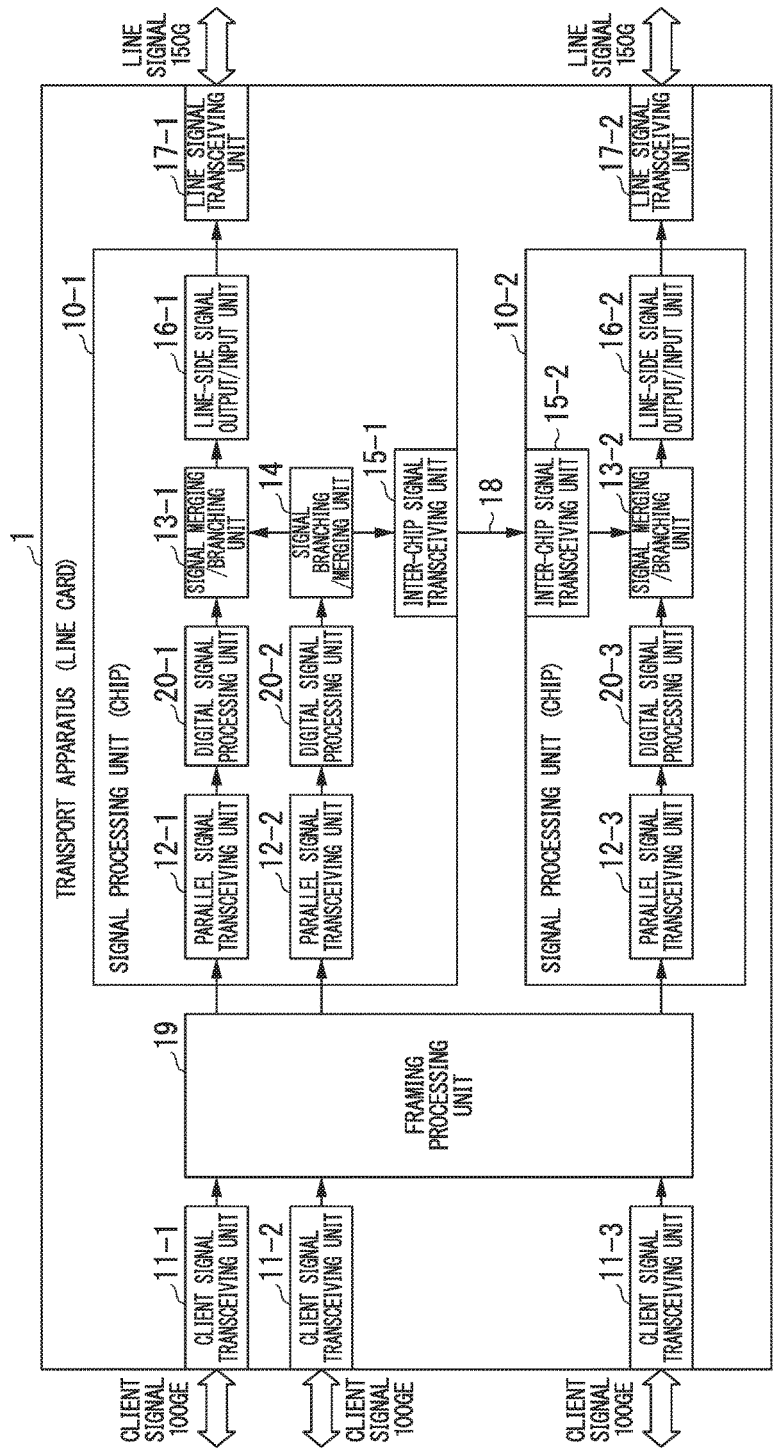
FIG. 1 is a functional block diagram illustrating a configuration during transmission of a transport apparatus in accordance with a first embodiment of the present invention.
Figure 2:
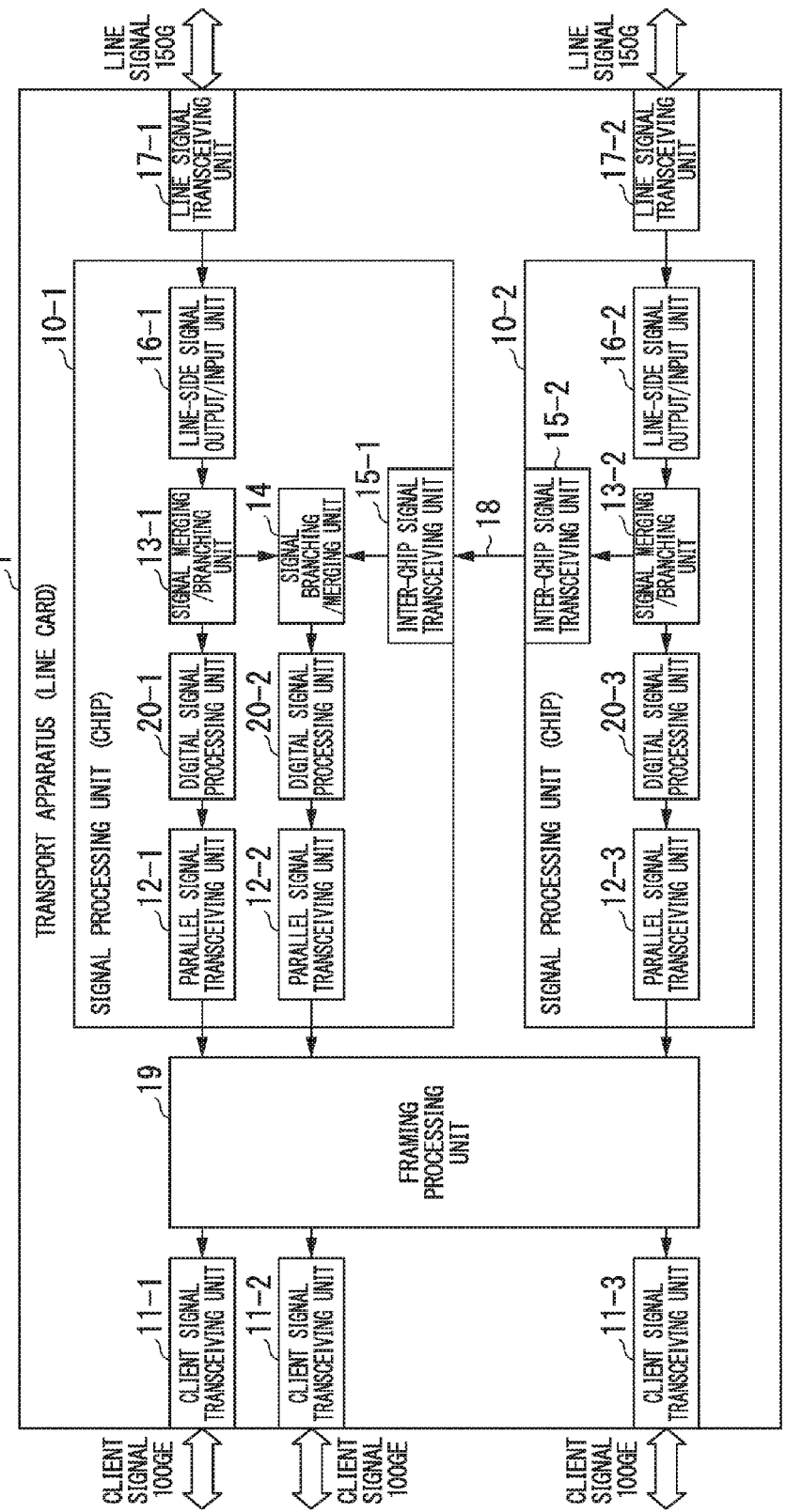
FIG. 2 is a functional block diagram illustrating a configuration during reception of the transport apparatus in accordance with the first embodiment of the present invention.

FIGS. 1 and 2 are functional block diagrams illustrating a configuration of a transport apparatus in accordance with a first embodiment of the present invention. FIG. 1 illustrates a transmission-side signal path and FIG. 2 illustrates a reception-side signal path. The transport apparatus 1 illustrated in FIGS. 1 and 2 performs the transport of signals between 100 GE×3 client signals and 150 G×2 line signals.

In FIGS. 1 and 2, the transport apparatus 1, in which components for transport of signals are mounted on one substrate, is called a line card. The transport apparatus 1 includes three client signal transceiving units 11-1, 11-2, and 11-3, a framing processing unit 19, signal processing units 10-1 and 10-2, and line signal transceiving units 17-1 and 17-2.

The signal processing units 10-1 and 10-2 are configured as chips and are arranged in the line card that forms the transport apparatus 1. Moreover, in the present embodiment, an inter-chip wiring 18 is provided between the signal processing unit 10-1 and the signal processing unit 10-2.

The signal processing unit 10-1 includes parallel signal transceiving units 12-1 and 12-2, digital signal processing units 20-1 and 20-2, a signal merging/branching unit 13-1, a signal branching/merging unit 14, an inter-chip signal transceiving unit 15-1, and a line-side signal output/input unit 16-1.

The signal processing unit 10-2 includes a parallel signal transceiving unit 12-3, a digital signal processing unit 20-3, a signal merging/branching unit 13-2, an inter-chip signal transceiving unit 15-2, and a line-side signal output/input unit 16-2. The inter-chip wiring 18 is provided between the inter-chip signal transceiving unit 15-1 of the signal processing unit 10-1 and the inter-chip signal transceiving unit 15-2 of the signal processing unit 10-2.

First, referring to FIG. 1, a case in which the transport apparatus 1 receives 100 GE×3 client signals and transfers the received client signals as 150 G×2 line signals will be described.

In FIG. 1, the client signal transceiving units 11-1, 11-2, and 11-3 receive 100 GE client signals and transfer the 100 GE×3 client signals to the framing processing unit 19. The framing processing unit 19 converts the client signals into signals of transport frames. The converted 100 G×3 transport frames are input to the parallel signal transceiving units 12-1 and 12-2 of the signal processing unit 10-1 and the parallel signal transceiving unit 12-3 of the signal processing unit 10-2.

It is to be noted that when the received client signals already have the transport frame format, for example, like OTU4, the framing processing unit 19 can be omitted.

In the signal processing unit 10-1, the parallel signal transceiving unit 12-1 transmits a received 100 G transport frame signal to the digital signal processing unit 20-1. The digital signal processing unit 20-1 performs digital signal processing for equalization of deterioration due to transport or the like on the signal received from the parallel signal transceiving unit 12-1. The signal output from the digital signal processing unit 20-1 is input to the signal merging/branching unit 13-1.

Moreover, in the signal processing unit 10-1, the parallel signal transceiving unit 12-2 transmits a received 100 G transport frame signal to the digital signal processing unit 20-2. The digital signal processing unit 20-2 performs digital signal processing for equalization of deterioration due to transport or the like on the signal received from the parallel signal transceiving unit 12-2. The signal output from the digital signal processing unit 20-2 is input to the signal branching/merging unit 14.

The signal branching/merging unit 14 branches the 100 G transport frame signal having been subjected to the digital signal processing by the digital signal processing unit 20-2 at the ratio of 1:1. The branching ratio in the signal branching/merging unit 14 may be an arbitrary value as long as it corresponds to the bit rate of the line signal, and a particularly preferable branching ratio is 1:1 (=0.5). In this case, the signal branching/merging unit 14 branches the 100 G transport frame signal to two 50 G signals. Then, the signal branching/merging unit 14 transfers one of the branched 50 G signals to the signal merging/branching unit 13-1 and transfers the other 50 G signal to the inter-chip signal transceiving unit 15-1.

The signal merging/branching unit 13-1 merges the 100 G signal transferred from the digital signal processing unit 20-1 and the 50 G signal transferred from the signal branching/merging unit 14 to obtain a 150 G signal and transfers the 150 G signal to the line-side signal output/input unit 16-1. The line-side signal output/input unit 16-1 transmits the received 150 G signal to the line signal transceiving unit 17-1. The line signal transceiving unit 17-1 performs electric-optic conversion on the 150 G signal and outputs the converted optical signal to the line side.

The 50 G signal transferred from the signal branching/merging unit 14 to the inter-chip signal transceiving unit 15-1 is transferred to the inter-chip signal transceiving unit 15-2 via the inter-chip wiring 18. The inter-chip signal transceiving unit 15-2 receives the transmitted 50 G signal and transfers the received 50 G signal to the signal merging/branching unit 13-2.

In the signal processing unit 10-2, the parallel signal transceiving unit 12-3 transmits a received 100 G transport frame signal to the digital signal processing unit 20-3. The digital signal processing unit 20-3 performs digital signal processing for equalization of deterioration due to transport or the like on the signal received from the parallel signal transceiving unit 12-3. The signal output from the digital signal processing unit 20-3 is input to the signal merging/branching unit 13-2.

The signal merging/branching unit 13-2 merges the 50 G signal received from the inter-chip signal transceiving unit 15-2 and the 100 G signal received from the digital signal processing unit 20-3 to obtain a 150 G signal and transfers the 150 G signal to the line-side signal output/input unit 16-2. The line-side signal output/input unit 16-2 transmits the received 150 G signal to the line signal transceiving unit 17-2. The line signal transceiving unit 17-2 performs electric-optic conversion on the 150 G signal and outputs the converted signal to the line side.

Next, referring to FIG. 2, a case in which the transport apparatus 1 receives 150 G×2 line signals and transfers the received line signals as 100 GE×3 client signals will be described.

In FIG. 2, the 150 G×2 signals received by the line signal transceiving units 17-1 and 17-2 are transferred to the line-side signal output/input unit 16-1 of the signal processing unit 10-1 and the line-side signal output/input unit 16-2 of the signal processing unit 10-2.

In the signal processing unit 10-1, the line-side signal output/input unit 16-1 transfers a received 150 G signal to the signal merging/branching unit 13-1. The signal merging/branching unit 13-1 branches the received 150 G signal to a 100 G signal and a 50 G signal. Then, the signal merging/branching unit 13-1 transfers the branched 100 G signal to the digital signal processing unit 20-1 and transfers the 50 G signal to the signal branching/merging unit 14.

The digital signal processing unit 20-1 performs signal equalization or the like by means of digital signal processing on the signal received from the signal merging/branching unit 13-1 to recover a 100 G transport frame signal. The recovered 100 G transport frame signal is transferred to the parallel signal transceiving unit 12-1. The parallel signal transceiving unit 12-1 transfers the received 100 G transport frame signal to the framing processing unit 19.

A 150 G signal received by the line signal transceiving unit 17-2 is transferred to the line-side signal output/input unit 16-2 of the signal processing unit 10-2. The line-side signal output/input unit 16-2 transfers the received 150 G signal to the signal merging/branching unit 13-2. The signal merging/branching unit 13-2 branches the received 150 G signal to a 100 G signal and a 50 G signal. Then, the signal merging/branching unit 13-2 transfers the branched 100 G signal to the digital signal processing unit 20-3 and transfers the branched 50 G signal to the inter-chip signal transceiving unit 15-2.

The digital signal processing unit 20-3 performs signal equalization or the like by means of digital signal processing on the signal received from the signal merging/branching unit 13-2 to recover a 100 G transport frame signal. The recovered 100 G transport frame signal is transferred to the parallel signal transceiving unit 12-3. The parallel signal transceiving unit 12-3 transfers the received 100 G transport frame signal to the framing processing unit 19.

On the other hand, in the signal processing unit 10-2, the 50 G signal transferred from the signal merging/branching unit 13-2 to the inter-chip signal transceiving unit 15-2 is transferred to the inter-chip signal transceiving unit 15-1 via the inter-chip wiring 18. The inter-chip signal transceiving unit 15-1 receives the 50 G signal transmitted from the signal merging/branching unit 13-2 via the inter-chip wiring 18 and transfers the 50 G signal to the signal branching/merging unit 14.

The signal branching/merging unit 14 merges the 50 G signal received from the signal merging/branching unit 13-1 and the 50 G signal received from the inter-chip signal transceiving unit 15-1. The merged 100 G signal is transferred to the digital signal processing unit 20-2. The digital signal processing unit 20-2 performs signal equalization or the like by means of digital signal processing on the signal received from the signal branching/merging unit 14 to recover a 100 G transport frame signal. The recovered 100 G transport frame signal is transferred to the parallel signal transceiving unit 12-2. The parallel signal transceiving unit 12-2 transfers the received 100 G transport frame signal to the framing processing unit 19.

The framing processing unit 19 recovers 100 GE×3 client signals from the 100 G×2 signals received from the parallel signal transceiving units 12-1 and 12-2 and the 100 G signal received from the parallel signal transceiving unit 12-3. The recovered 100 GE×3 client signals are transferred to the client signal transceiving units 11-1, 11-2, and 11-3. The client signal transceiving units 11-1, 11-2, and 11-3 output the 100 GE signals outside the transport apparatus.

As described above, in the present embodiment, the signal merging/branching unit 13-1 and the signal branching/merging unit 14 are provided in the signal processing unit 10-1 and the signal merging/branching unit 13-2 is provided in the signal processing unit 10-2. Moreover, the inter-chip wiring 18 is provided between the inter-chip signal transceiving unit 15-1 of the signal processing unit 10-1 and the inter-chip signal transceiving unit 15-2 of the signal processing unit 10-2. As a result, 100 GE×3 client signals can be transferred as 150 G×2 line signals. Moreover, 150 G×2 line signals can be transferred as 100 GE×3 client signals.

Figure 3:
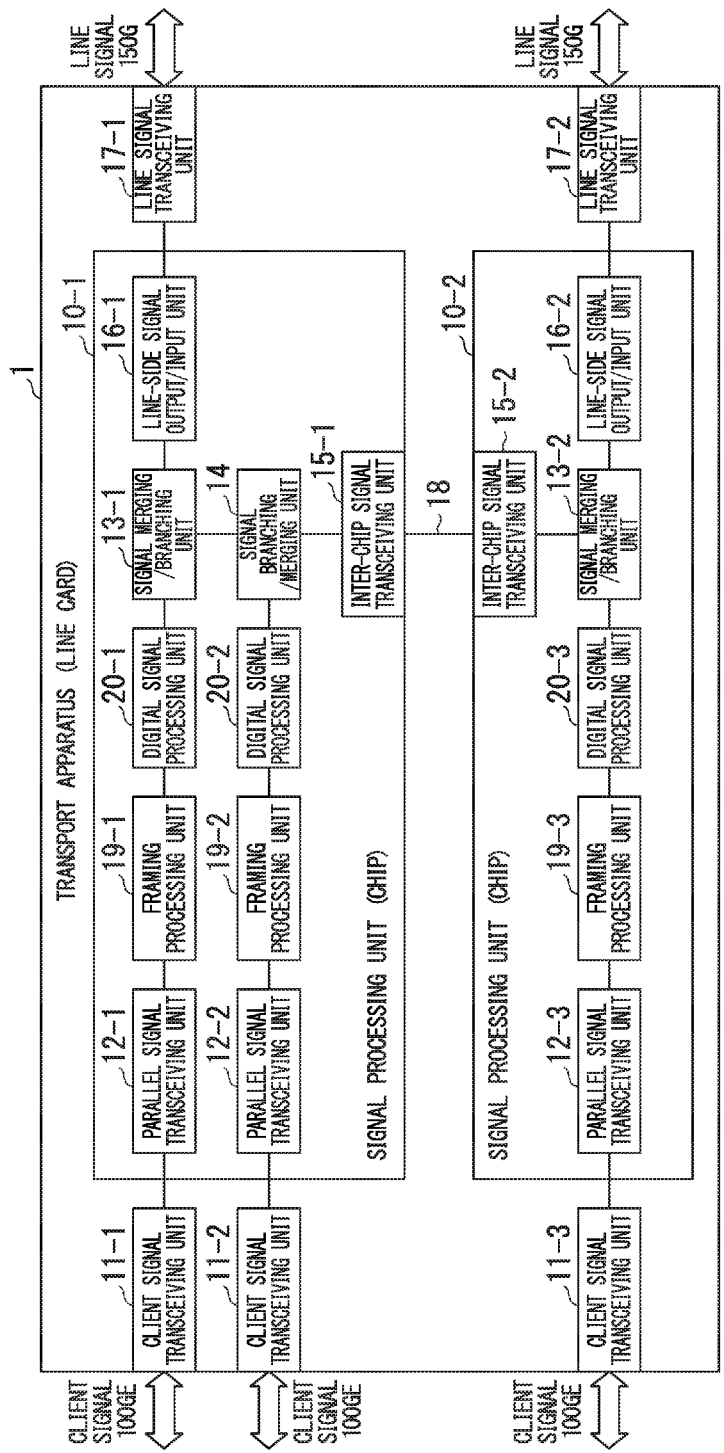
FIG. 3 is a functional block diagram used for description of a modified example of the transport apparatus in accordance with the first embodiment of the present invention.

It is to be noted that in the above-described example, the framing processing unit 19 is provided separately from the chips that form the signal processing units 10-1 and 10-2. However, the configuration of the framing processing unit 19 is not limited to the above-described configuration. FIG. 3 is a functional block diagram used for description of a modified example of the transport apparatus in accordance with the first embodiment of the present invention. As illustrated in FIG. 3, framing processing units 19-1 and 19-2 may be provided in the chip that forms the signal processing unit 10-1. In this case, a framing processing unit 19-3 may be provided in the chip that forms the signal processing unit 10-2.

Figure 4:
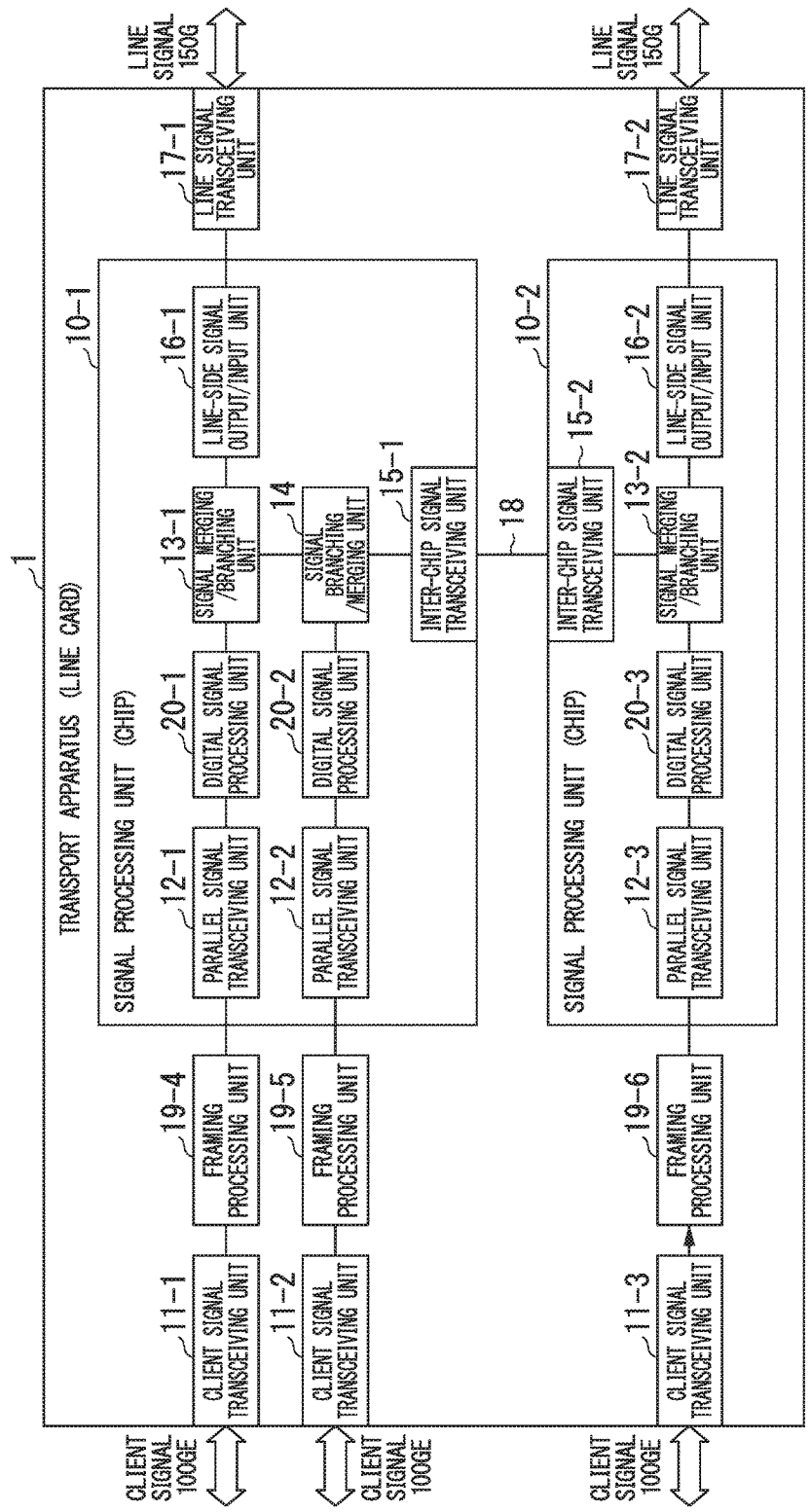
FIG. 4 is a functional block diagram used for description of a modified example of the transport apparatus in accordance with the first embodiment of the present invention.

Moreover, in the above-described example, one framing processing unit 19 is provided for 100 GE×3 signals. However, the configuration of the framing processing unit 19 is not limited to the above-described configuration. FIG. 4 is a functional block diagram used for description of a modified example of the transport apparatus in accordance with the first embodiment of the present invention. As illustrated in FIG. 4, three framing processing units 19-4, 19-5, and 19-6 may be provided for the 100 GE×3 signals, respectively.

Figure 5:
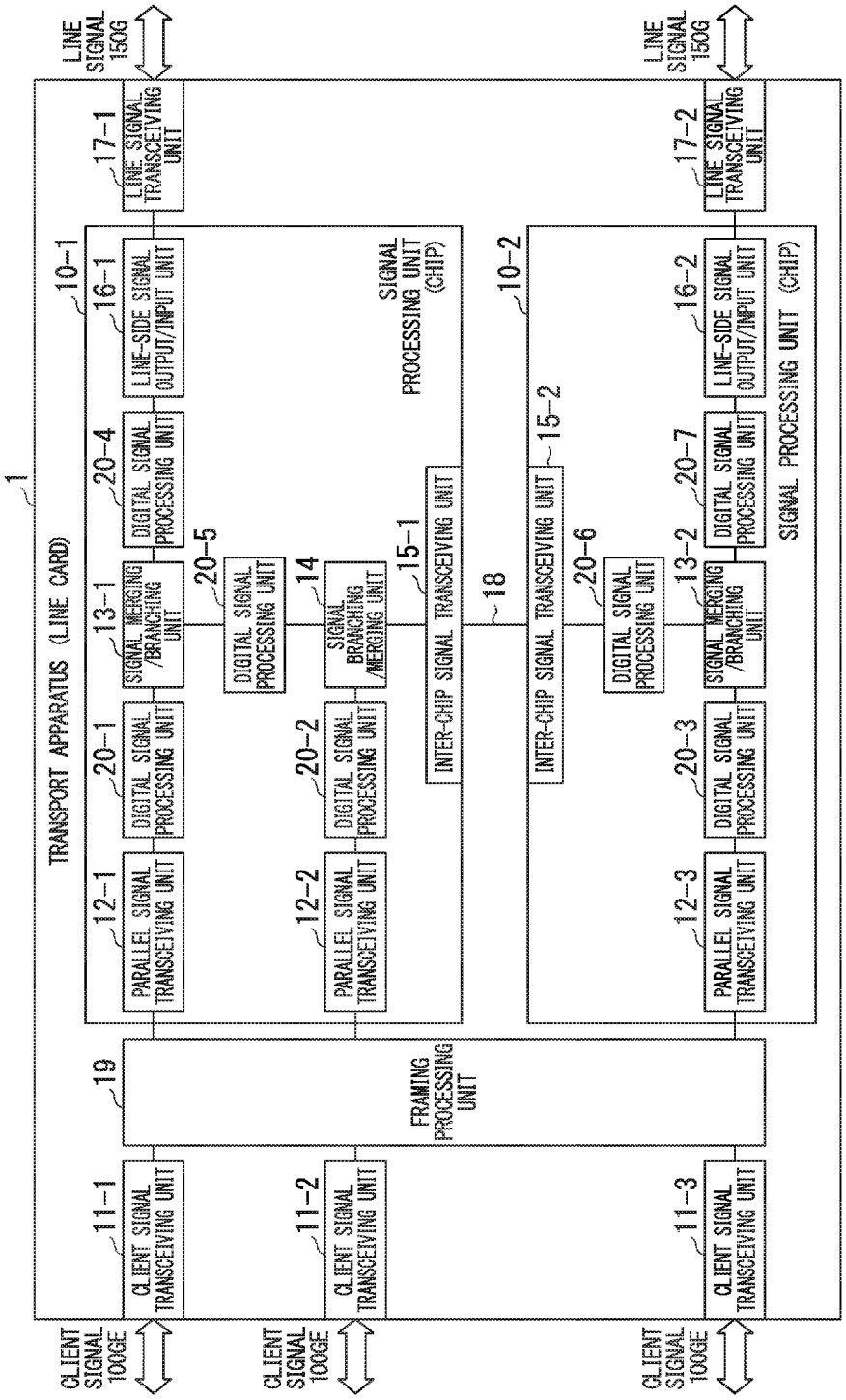
FIG. 5 is a functional block diagram used for description of a modified example of the transport apparatus in accordance with the first embodiment of the present invention.

Moreover, in the above-described example, two digital signal processing units 20-1 and 20-2 are provided in the signal processing unit 10-1, and one digital signal processing unit 20-3 is provided in the signal processing unit 10-2. However, the configuration of the signal processing units 10-1 and 10-2 is not limited to the above-described configuration. FIG. 5 is a functional block diagram used for description of a modified example of the transport apparatus in accordance with the first embodiment of the present invention. Digital signal processing units 20-4 and 20-5 may be provided in the signal processing unit 10-1 at positions illustrated in FIG. 5. In this case, digital signal processing units 20-6 and 20-7 may be provided in the signal processing unit 10-2. That is, the digital signal processing units 20-1 to 20-7 may be disposed at a preceding stage of the signal merging/branching units 13-1 and 13-2 or the signal branching/merging unit 14. The digital signal processing units 20-1 to 20-7 may be disposed at a subsequent stage of the signal merging/branching units 13-1 and 13-2 or the signal branching/merging unit 14. The digital signal processing units 20-1 to 20-7 may be disposed at both preceding and subsequent stages of the signal merging/branching units 13-1 and 13-2 or the signal branching/merging unit 14. It is to be noted that the digital signal processing units 20-4 to 20-7 perform digital signal processing for equalization of deterioration due to transport or the like, similarly to the digital signal processing units 20-1 to 20-3.

Figure 6:
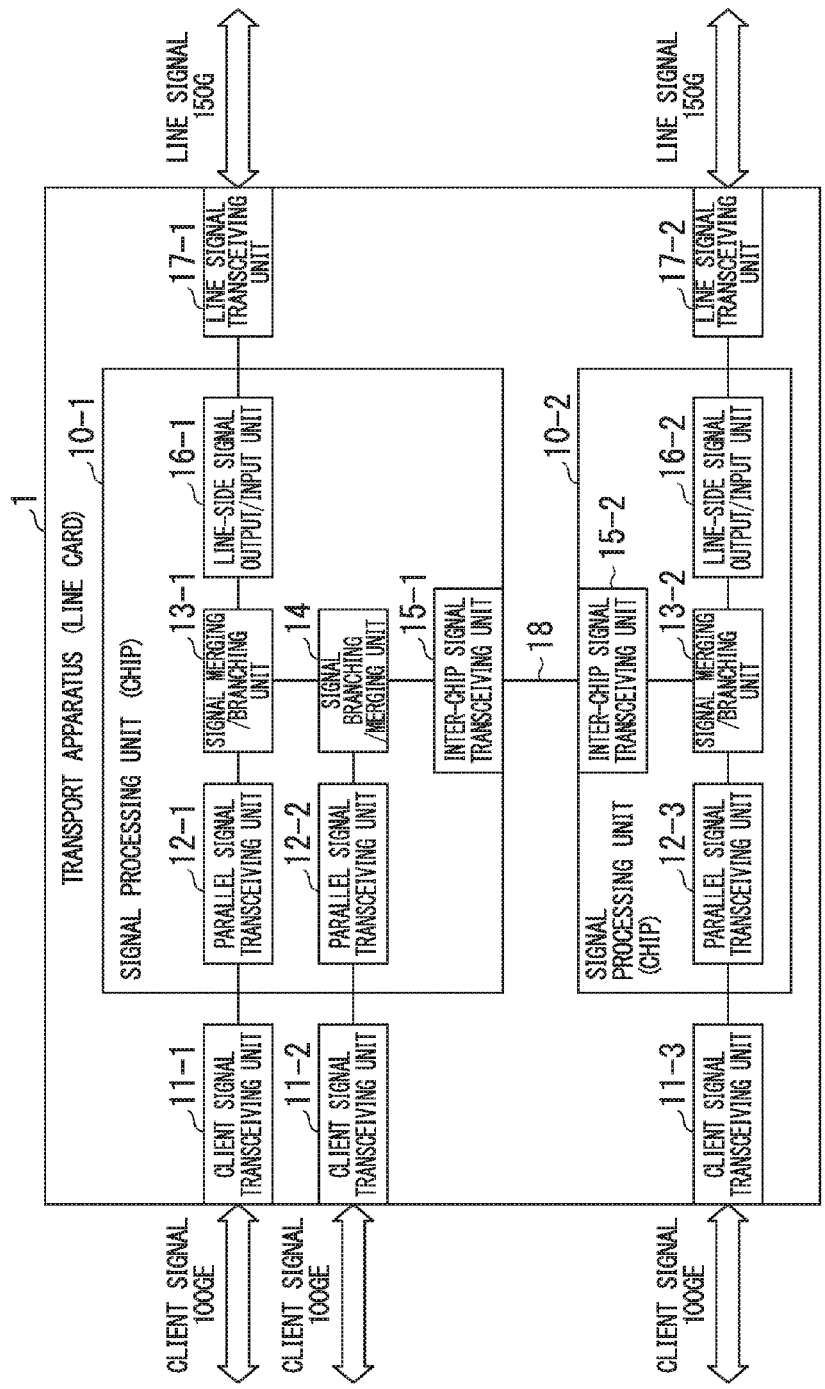
FIG. 6 is a functional block diagram used for description of a modified example of the transport apparatus in accordance with the first embodiment of the present invention.

FIG. 6 is a functional block diagram used for description of a modified example of the transport apparatus in accordance with the first embodiment of the present invention. As illustrated in FIG. 6, the framing processing unit 19 may be omitted and the digital signal processing units 20-1 to 20-3 may be omitted. Moreover, the branching ratio of the signal branching/merging unit 14 may be set arbitrarily, such as 5:5, 3:7, or 2:8.

Figure 7:
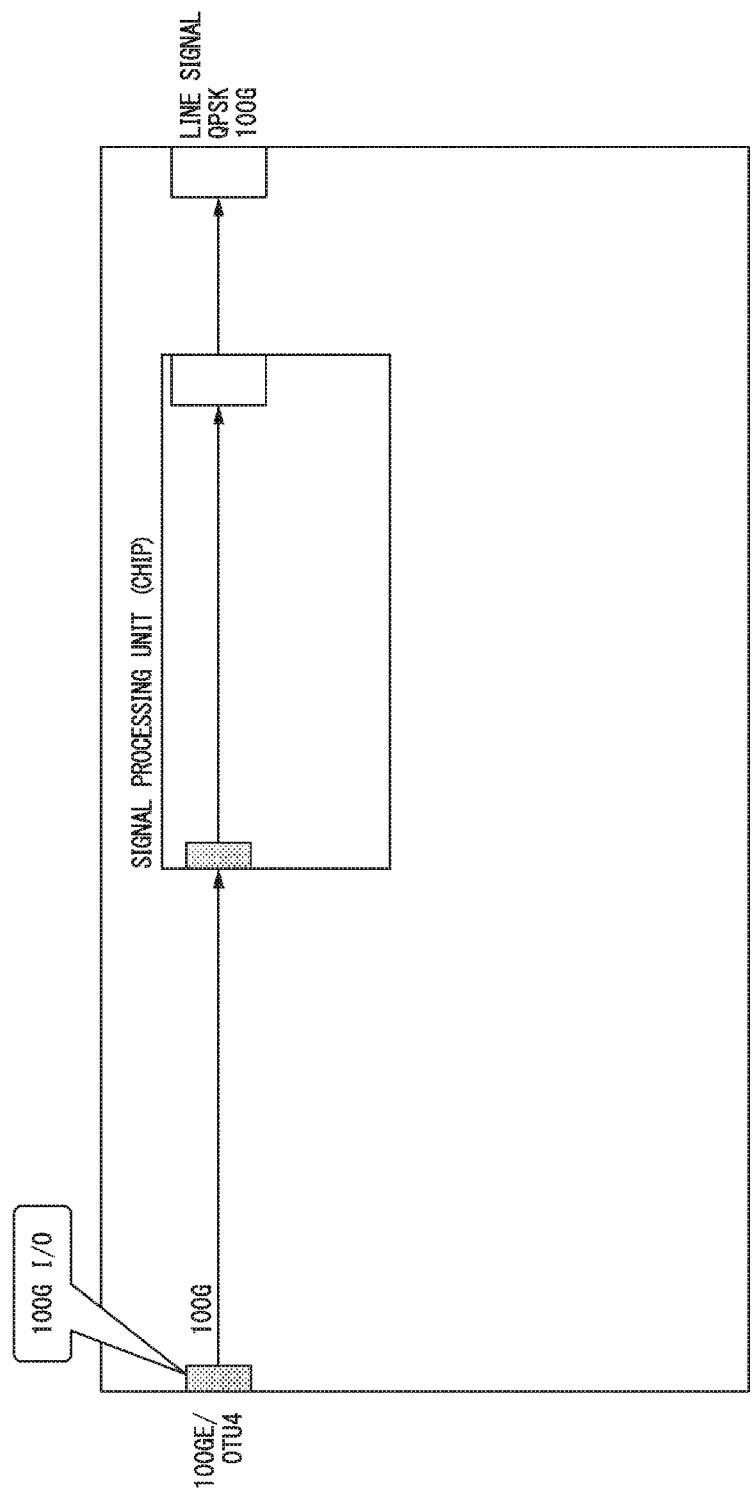
FIG. 7 is a block diagram illustrating a schematic configuration of a conventional transport apparatus described in the background art.
Figure 8:
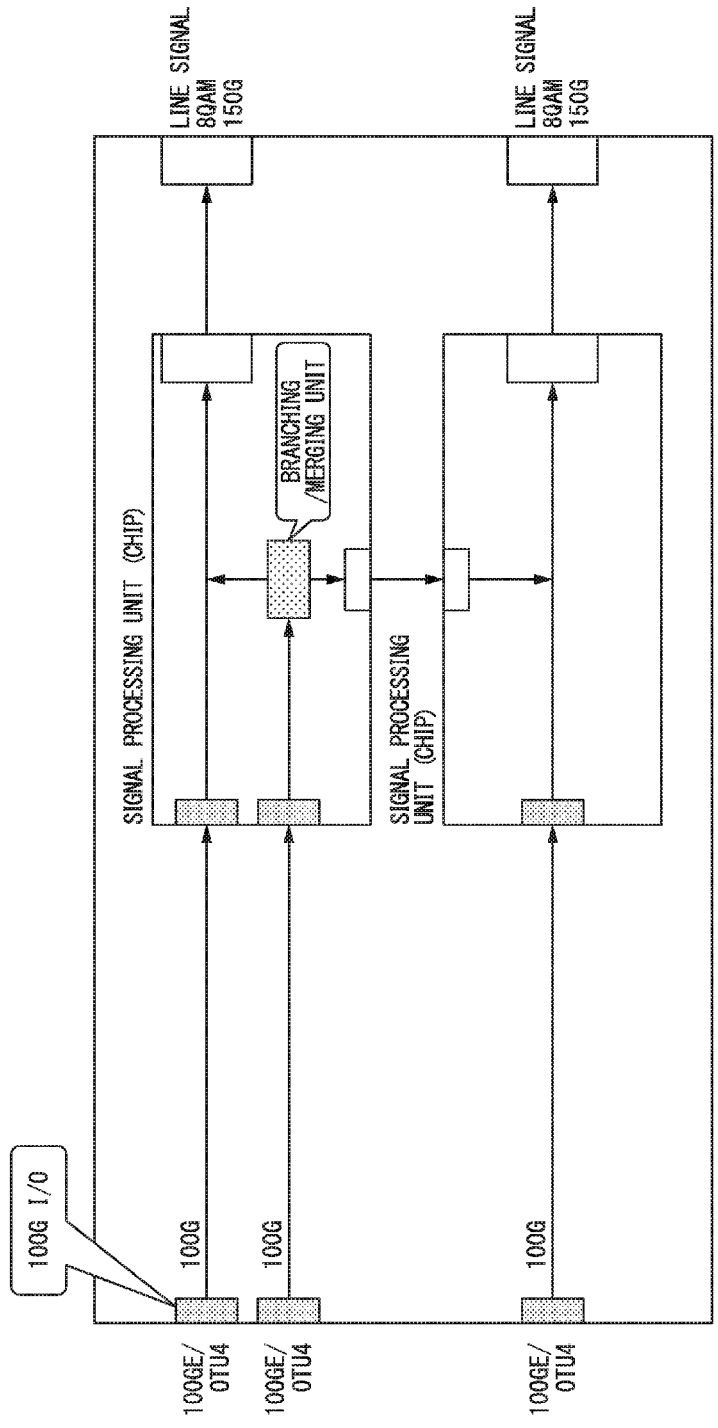
FIG. 8 is a block diagram illustrating a schematic configuration of the transport apparatus in accordance with the first embodiment of the present invention.

Here, the transport apparatus described in the background art will be compared with the transport apparatus in accordance with the present embodiment. FIG. 7 is a block diagram illustrating a schematic configuration of the conventional transport apparatus described in the background art. FIG. 8 is a block diagram illustrating a schematic configuration of the transport apparatus in accordance with the present embodiment.

In the conventional transport apparatus, a 100 G client signal (e.g., 100 GE or OTU4) is input to a signal processing unit (chip) via a 100 G input/output (I/O), the signal having been subjected to digital signal processing in the signal processing unit is converted into a 100 G signal by means of QPSK modulation, for example, and the converted signal is output as a line signal. As a result, in the conventional transport apparatus, it is impossible to perform digital signal processing on three 100 G client signals and to transport the processed signals via two super-channels.

In contrast, in the transport apparatus of the present embodiment, 100 G×3 client signals (e.g., 100 GE×3 or OTU4×3) are input, 100 G×2 client signals among these signals are input to a first signal processing unit (chip) via two 100 G I/Os (corresponding to client signal transceiving units), and the remaining 100 G client signal is input to a second signal processing unit (chip) via one 100 G I/O. In the first and second signal processing units, the digital signal processing or the like described in the present embodiment is performed, signals obtained by the processing are converted into 100 G×2 line signals by means of 8 QAM modulation, for example, and the converted signals are output as line signals.

In the transport apparatus of the present embodiment, the signal branching/merging unit is provided in the signal processing unit, and thus it is possible to process three 100 GE client signals, for example, and to transport the processed signals via two super-channels (300 G transport using 8 QAM 2-subcarriers (SC)). Moreover, the transport apparatus of the present embodiment can cope with adaptive modulation/demodulation such as binary phase shift keying (BPSK), QPSK, 8 QAM, and 16 QAM. In the case of BPSK and QPSK, it is possible to accommodate a 100 G client signal. In the case of 8 QAM, it is possible to accommodate 100 G+10 G×5, 100 G+40 G, and 100 G+40 G+10 G client signals. In the case of 16 QAM, it is possible to accommodate 100 G×2 client signals.

<Second Embodiment>

Figure 9:
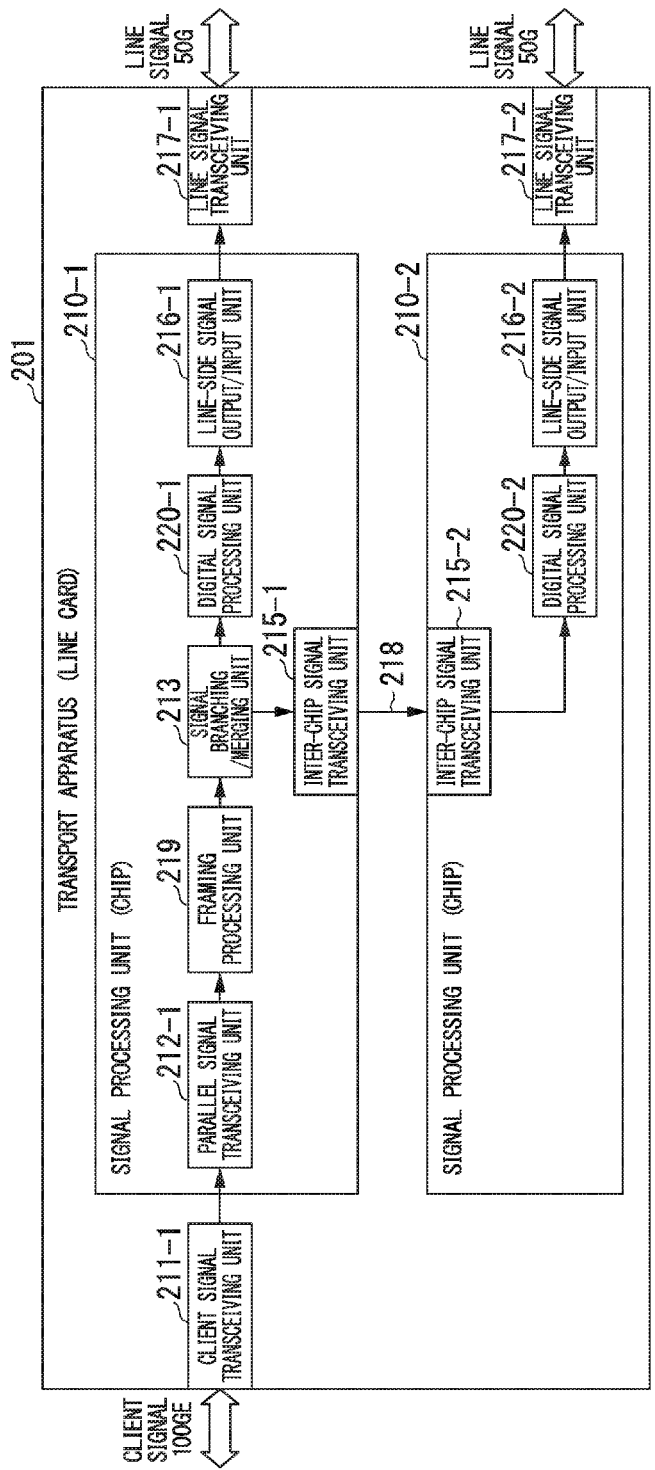
FIG. 9 is a functional block diagram illustrating a configuration of a transport apparatus 201 in accordance with a second embodiment of the present invention.
Figure 14:
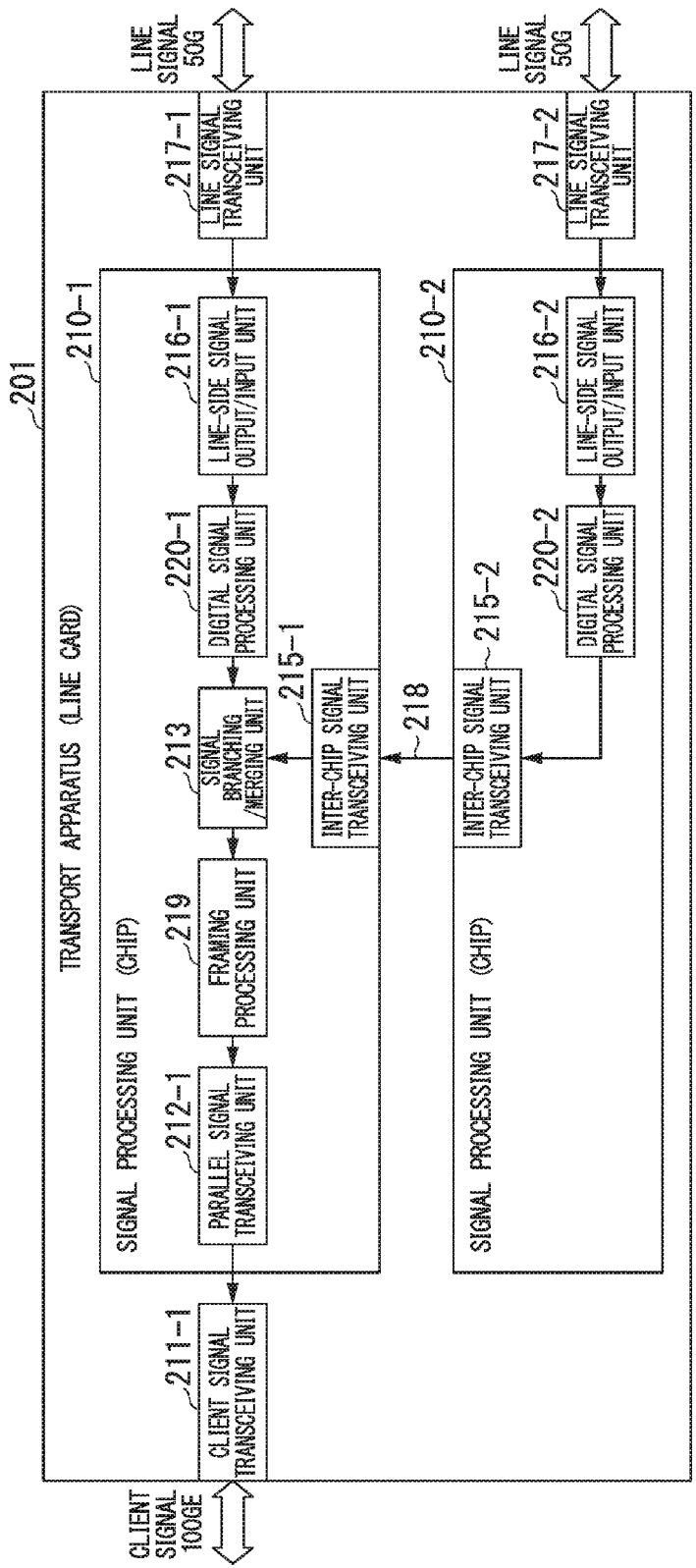
FIG. 14 is a functional block diagram illustrating a configuration of the transport apparatus 201 in accordance with the second embodiment of the present invention.

Next, a second embodiment of the present invention will be described. FIGS. 9 and 14 are functional block diagrams illustrating a configuration of a transport apparatus 201 in accordance with the second embodiment of the present invention. FIG. 9 illustrates a transmission-side signal path and FIG. 14 illustrates a reception-side signal path. The transport apparatus 201 illustrated in FIGS. 9 and 14 branches a 100 GE client signal to 50 G×2 line signals to perform the transport of signals. This case is an example in which the bit rate of the line signal is smaller than the bit rate of the client signal.

The transport apparatus 201 illustrated in FIGS. 9 and 14 includes a client signal transceiving unit 211-1, signal processing units 210-1 and 210-2, and line signal transceiving units 217-1 and 217-2.

The signal processing units 210-1 and 210-2 are configured as chips and are disposed in a line card that forms the transport apparatus 201. Moreover, in the present embodiment, an inter-chip wiring 218 is provided between the signal processing unit 210-1 and the signal processing unit 210-2.

The signal processing unit 210-1 includes a parallel signal transceiving unit 212-1, a framing processing unit 219, a signal branching/merging unit 213, a digital signal processing unit 220-1, a line-side signal output/input unit 216-1, and an inter-chip signal transceiving unit 215-1.

The signal processing unit 210-2 includes a digital signal processing unit 220-2, an inter-chip signal transceiving unit 215-2, and a line-side signal output/input unit 216-2. The inter-chip wiring 218 is provided between the inter-chip signal transceiving unit 215-1 of the signal processing unit 210-1 and the inter-chip signal transceiving unit 215-2 of the signal processing unit 210-2.

First, referring to FIG. 9, a case in which the transport apparatus 201 receives a 100 GE client signal and transfers the received client signal as 50 G×2 line signals will be described.

In FIG. 9, the client signal transceiving unit 211-1 of the transport apparatus 201 receives the 100 GE client signal and transfers the client signal to the parallel signal transceiving unit 212-1. The parallel signal transceiving unit 212-1 transfers the 100 GE signal to the framing processing unit 219. The framing processing unit 219 converts the received client signal into a 100 G transport frame signal. The converted 100 G transport frame signal is transferred from the framing processing unit 219 to the signal branching/merging unit 213.

The signal branching/merging unit 213 branches the 100 G transport frame signal at the ratio of 1:1. Moreover, the signal branching/merging unit 213 transfers one of the branched 50 G signals to the digital signal processing unit 220-1 and transfers the other 50 G signal to the inter-chip signal transceiving unit 215-1.

Here, when the 100 G transport frame signal is branched at the ratio of 1:1 by the signal branching/merging unit 213, the signal branching/merging unit 213 divides the 100 G transport frame (OTU4 of 112 G) signal formed by the framing processing unit 219 into blocks.

When the OTU4 signal is divided into the blocks, a value which is the value of a divisor of the size of an OTU4 frame and which is larger than or equal to the number of bytes of an overhead element required for a functional unit performing signal processing by referring to branched signals to detect a frame structure of the OTU4 frame is selected as the size of the divided blocks. For example, in the case of the OTU4 frame, the frame size is 16320 bytes. The divisors of 16320 are 1, 2, 3, 4, 5, 6, 8, 10, 12, 15, 16, 17, 20, . . . , 4080, 5440, 8160, and 16320, and these values are the candidates for a block size. The signal branching/merging unit 213 divides the OTU4 signal into the blocks based on the value selected as the block size.

Figures 10A, 10B, 10C, 10D, 10E:
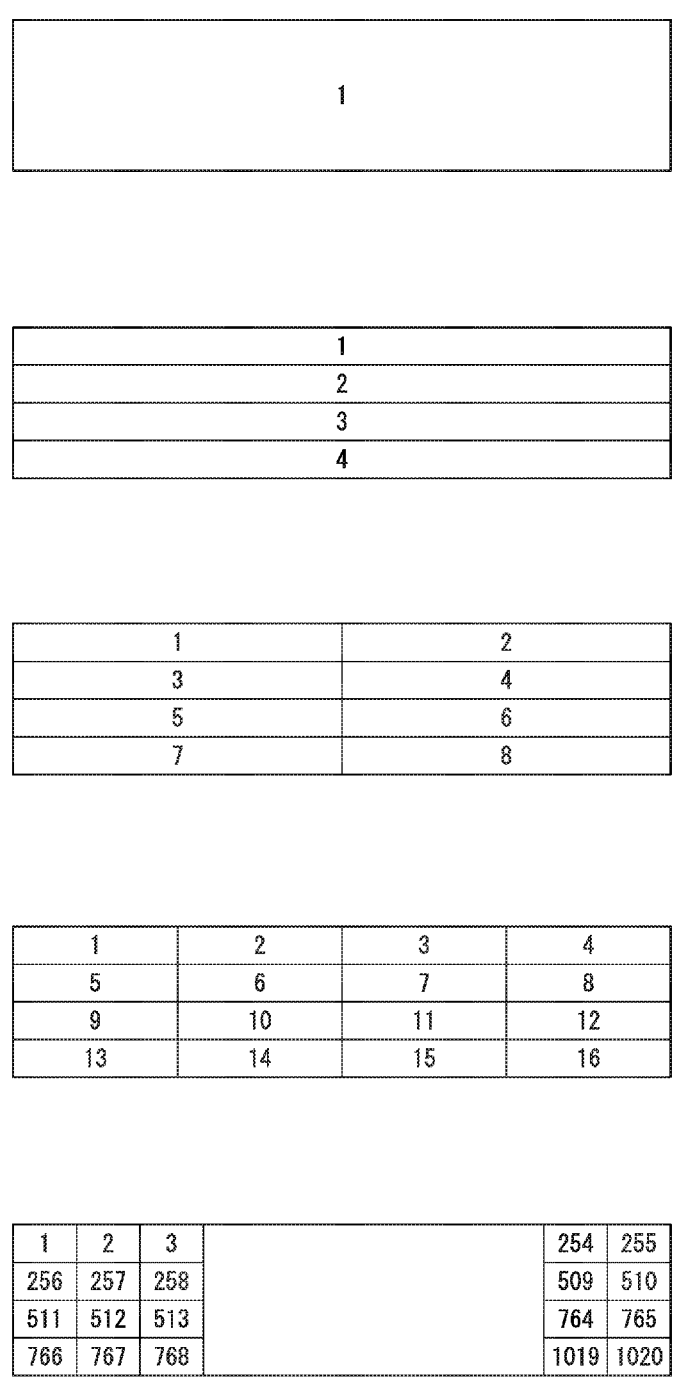

FIGS. 10A to 10E illustrate examples of dividing a frame into blocks. FIG. 10A illustrates a state in which one frame is divided into a 16320-byte block (4080×4/16320=1 block). FIG. 10B illustrates a state in which one frame is divided into 4080-byte blocks (4080×4/4080=4 blocks). FIG. 10C illustrates a state in which one frame is divided into 2040-byte block (4080×4/2040=8 blocks). FIG. 10D illustrates a state in which one frame is divided into 1020-byte blocks (4080×4/1020=16 blocks). FIG. 10E illustrates a state in which one frame is divided into 16-byte blocks (4080×4/16=1020 blocks).

The digital signal processing unit 220-1 performs signal processing for equalization of deterioration due to transport or the like on the input signal and transfers the signal subjected to the signal processing to the line-side signal output/input unit 216-1. The line-side signal output/input unit 216-1 transfers the signal to the line signal transceiving unit 217-1. The line signal transceiving unit 217-1 performs electric-optic conversion on the 50 G signal and transmits the converted optical signal to the reception side.

The 50 G signal input from the signal branching/merging unit 213 to the inter-chip signal transceiving unit 215-1 is transferred to the inter-chip signal transceiving unit 215-2 via the inter-chip wiring 218. The inter-chip signal transceiving unit 215-2 receives the 50 G signal transmitted from the signal branching/merging unit 213 via the inter-chip signal transceiving unit 215-1 and the inter-chip wiring 218 and transmits the received signal to the digital signal processing unit 220-2.

The digital signal processing unit 220-2 performs signal processing for equalization of deterioration due to transport or the like on the input signal and transfers the signal subjected to the signal processing to the line-side signal output/input unit 216-2. The line-side signal output/input unit 216-2 transfers the signal to the line signal transceiving unit 217-2. The line signal transceiving unit 217-2 performs electric-optic conversion on the 50 G signal and transmits the converted optical signal to the reception side.

Figure 11:
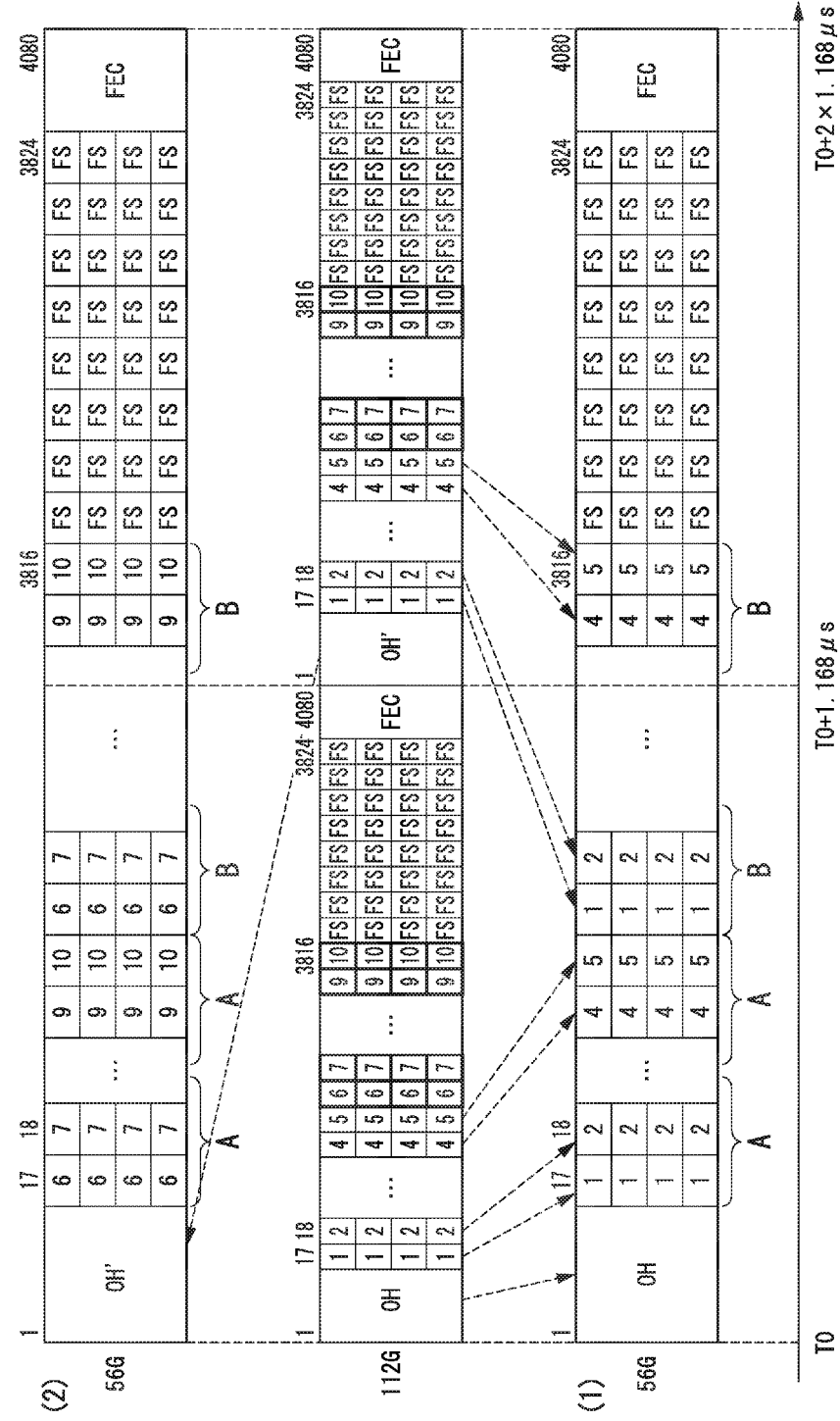
FIG. 11 is a diagram illustrating an example of a process when 100 G transport frames (112 G) are branched to 50 G transport frames (56 G).
Figure 12:
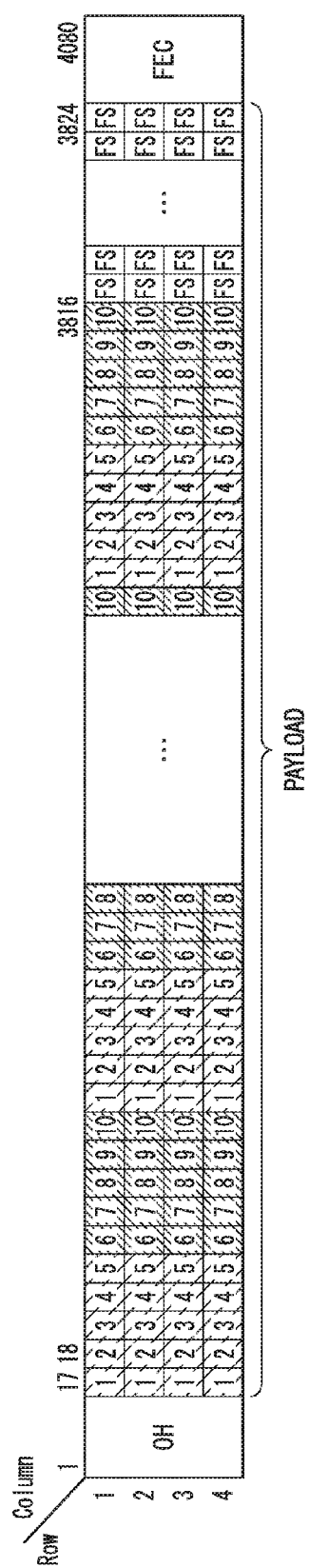
FIG. 12 is a diagram illustrating a 100 G transport frame input to a signal merging/branching unit.

FIG. 11 illustrates an example of a process when 100 G transport frames (112 G) are branched to 50 G transport frames (56 G). Moreover, FIG. 12 illustrates a 100 G transport frame input to the signal branching/merging unit 213.

As illustrated in FIG. 11, the 100 G transport frames (112 G) and the 50 G transport frames (56 G) each have 4 rows (1 byte) by 4080 columns. An overhead (OH) is set in the 16 bytes of the first to sixteenth columns, a payload is set in 3808 bytes of 17th to 3824th columns, and forward error correction (FEC) information is set in 256 bytes of 3825th to 4080 th columns. In the 100 G transport frames and the 50 G transport frames, fixed stuff (FS) is set in the 3817th to 3824th bytes of the payload. Here, for the sake of simplicity, an example in which the 17th to 3816th columns of the payload include ten 10 G tributary slots (TSs) is illustrated, and the numbers in the payload indicate the TS numbers.

The payload of the 100 G transport frame illustrated in FIG. 11 includes ten TSs of TS1 to TS10. A half of the ten TSs included in the payload of the 50 G transport frame illustrated in FIG. 11 is defined as a TS group A and the remaining half is defined as a TS group B. In the 50 G transport frame (1), five TSs of TS1 to TS5 are included in each of the TS groups A and B. In the 50 G transport frame (2), five TSs of TS6 to TS10 are included in each of the TS groups A and B. It is to be noted that in the drawing, the TS group A and the TS group B are alternately arranged in the payload, but the arrangement of the TS groups A and B is not limited thereto. For example, the TS group A may be arranged in a first-half area of the payload and the TS group B may be arranged in a second-half area of the payload.

When a process of converting the 100 G transport frames (112 G) into the 50 G transport frames is performed, a process of forming two 50 G transport frames (56 G) from two 100 G transport frames (112 G) is performed.

First, the signal branching/merging unit 213 extracts 50 G TSs at predetermined positions (TS1 to TS5) of the payload in the first 100 G transport frame. Thereafter, the signal branching/merging unit 213 maps the extracted TSs to half of the TSs (TS1 to TS5 of the TS group A) at predetermined positions of the payload of the 50 G transport frame (1). Moreover, the signal branching/merging unit 213 extracts 50 G TSs at predetermined positions (TS6 to TS10) of the payload in the first 100 G transport frame. Thereafter, the signal branching/merging unit 213 maps the extracted TSs to half of the TSs (TS6 to TS10 of the TS group A) at predetermined positions of the payload of the 50 G transport frame (2). The reason why half of the TSs of the first frame is used is to change the 100 G transport frames (112 G) to the 50 G transport frames (56 G).

Further, the signal branching/merging unit 213 extracts 50 G TSs set at predetermined positions (TS1 to TS5) of the payload in the second 100 G transport frame. Thereafter, the signal branching/merging unit 213 maps the extracted TSs to half of the TSs (TS1 to TS5 of the TS group B) at predetermined positions in the payload of the 50 G transport frame (1). Moreover, the signal branching/merging unit 213 extracts 50 G TSs set at predetermined positions (TS6 to TS10) in the payload of the second 100 G transport frame. Thereafter, the signal branching/merging unit 213 maps the extracted TSs to half of the TSs (TS6 to TS10 of the TS group B) at predetermined positions in the payload of the 50 G transport frame (2).

The signal branching/merging unit 213 sets the OH of the first 100 G transport frame as the OH of the 50 G transport frame (1) and sets an OH', which is the OH of the second 100 G transport frame, as the OH of the 50 G transport frame (2).

By mapping in the above-described manner, the signal branching/merging unit 213 generates the 50 G transport frames (1) and (2) from the 100 G transport frames.

Figure 13:
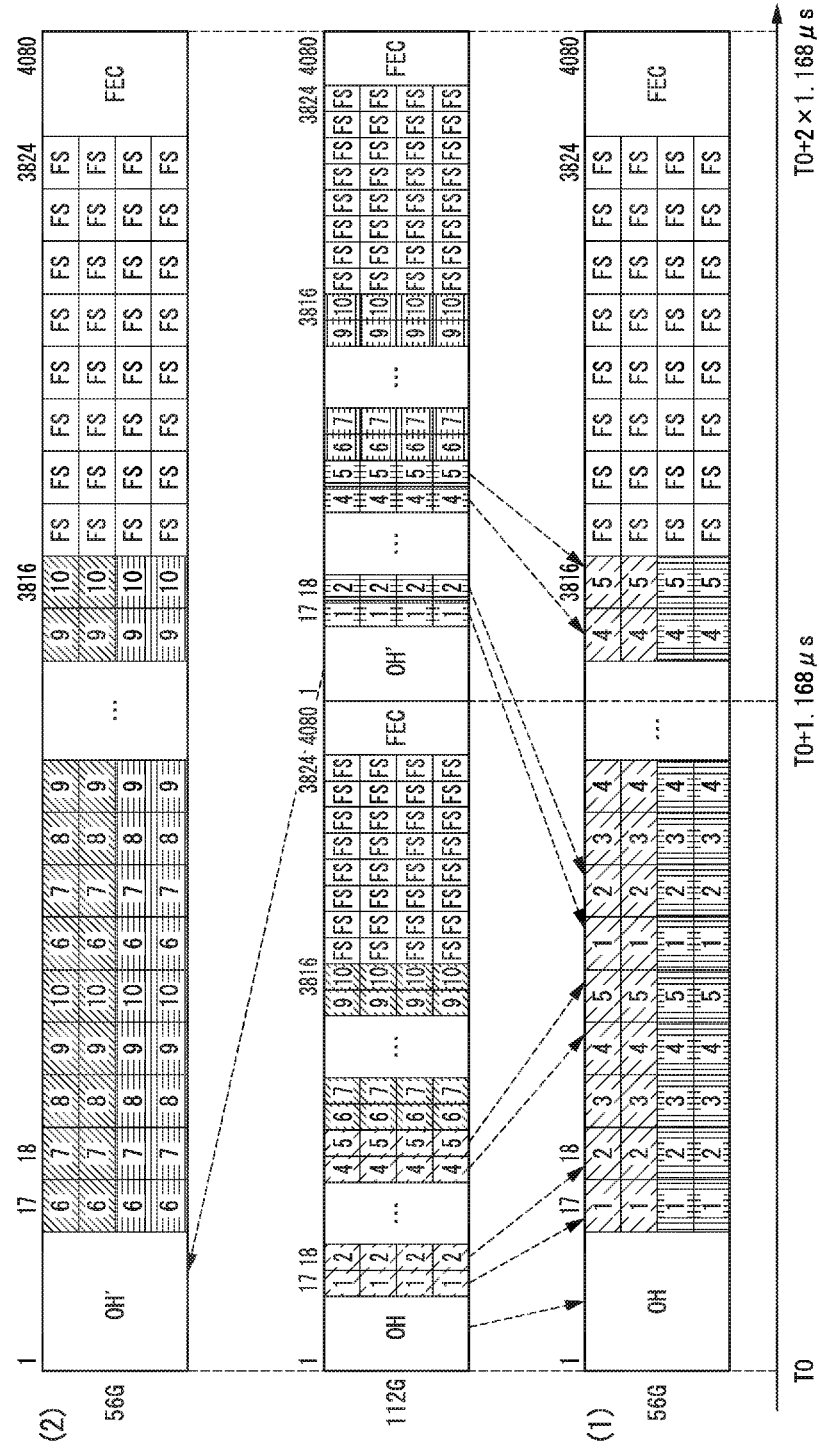
FIG. 13 is a diagram illustrating another example of a process when 100 G transport frames (112 G) are branched to 50 G transport frames (56 G).

FIG. 13 illustrates another example of a process when the 100 G transport frames (112 G) are branched to the 50 G transport frames (56 G). The following is the difference between this example and the example illustrated in FIG. 11. The signals TS1 to TS5 (back slashes) of the first 100 G transport frame are copied to the TSs (back slashes) of the rows 1 and 2 of the 50 G transport frame (1), and the signals TS1 to TS5 (vertical lines) of the second 100 G transport frame are copied to the TSs (vertical lines) of the rows 3 and 4 of the 50 G transport frame (1). Similarly, the signals TS6 to TS10 (forward slashes) of the first 100 G transport frame are copied to the TSs (forward slashes) of the rows 1 and 2 of the 50 G transport frame (2), and the signals TS6 to TS10 (horizontal lines) of the second 100 G transport frame are copied to the TSs (horizontal lines) of the rows 3 and 4 of the 50 G transport frame (2).

Next, referring to FIG. 14, a case in which the transport apparatus 201 receives 50 G×2 line signals and transfers the received line signals as a 100 GE client signal will be described.

In FIG. 14, the 50 G×2 signals received by the line signal transceiving units 217-1 and 217-2 are transferred to the line-side signal output/input unit 216-1 of the signal processing unit 210-1 and the line-side signal output/input unit 216-2 of the signal processing unit 210-2.

In the signal processing unit 210-1, the line-side signal output/input unit 216-1 transfers a received 50 G signal to the digital signal processing unit 220-1. The digital signal processing unit 220-1 performs signal equalization or the like by means of digital signal processing on the signal received from the line-side signal output/input unit 216-1 to recover the 50 G signal. The recovered 50 G signal is transferred to the signal branching/merging unit 213.

In the signal processing unit 210-2, the line-side signal output/input unit 216-2 transfers a received 50 G signal to the digital signal processing unit 220-2. The digital signal processing unit 220-2 performs signal equalization or the like by means of digital signal processing on the signal received from the line-side signal output/input unit 216-2 to recover the 50 G signal. The recovered signal is transferred to the inter-chip signal transceiving unit 215-2.

The 50 G signal from the inter-chip signal transceiving unit 215-2 is transferred to the inter-chip signal transceiving unit 215-1 via the inter-chip wiring 218. The inter-chip signal transceiving unit 215-1 receives the 50 G signal and transmits the received signal to the signal branching/merging unit 213.

The signal branching/merging unit 213 merges the 50 G signal received from the digital signal processing unit 220-1 and the 50 G signal received from the inter-chip signal transceiving unit 215-1 to recover the 100 G transport frame signal. Then, the signal branching/merging unit 213 transfers the 100 G transport frame signal to the framing processing unit 219.

The framing processing unit 219 recovers the 100 GE client signal from the 100 G transport frame and transfers the 100 GE client signal to the parallel signal transceiving unit 212-1. The parallel signal transceiving unit 212-1 transfers the 100 GE client signal to the client signal transceiving unit 211-1. The client signal transceiving unit 211-1 outputs the received 100 GE client signal outside the transport apparatus.

During reception, the signal branching/merging unit 213 performs conversion that is opposite to branching to recover the 100 G transport frame from the two 50 G transport frames. The process of the signal branching/merging unit 213 at this time will be described.

The signal branching/merging unit 213 maps the TS1 to TS5 of the TS group A of the received 50 G transport frame (1) to the TS1 to TS5 of the first 100 G transport frame in order to recover the first 100 G transport frame in FIG. 11. Further, the signal branching/merging unit 213 maps the TS6 to TS10 of the TS group A of the received 50 G transport frame (2) to the TS6 to TS10 of the first 100 G transport frame. As a result of the above, the first 100 G transport frame is recovered.

Thereafter, the signal branching/merging unit 213 maps the TS1 to TS5 of the TS group B of the received 50 G transport frame (1) to the TS1 to TS5 of the second 100 G transport frame in order to recover the second 100 G transport frame. Further, the signal branching/merging unit 213 maps the TS6 to TS10 of the TS group B of the received 50 G transport frame (2) to the TS6 to TS10 of the second 100 G transport frame. As a result of the above, the second 100 G transport frame is recovered. The signal branching/merging unit 213 transfers the recovered 100 G transport frames to the framing processing unit 219.

As described above, in the present embodiment, the signal branching/merging unit 213 is provided in the signal processing unit 210-1. Moreover, the inter-chip wiring 218 is provided between the inter-chip signal transceiving unit 215-1 of the signal processing unit 210-1 and the inter-chip signal transceiving unit 215-2 of the signal processing unit 210-2. As a result, it is possible to branch the 100 GE client signal to the 50 G×2 line signals and transfer the line signals. Moreover, it is possible to transfer the 50 G×2 line signals as the 100 GE client signal.

It is to be noted that in the present embodiment, the framing processing unit 219 is provided in the chip that forms the signal processing unit 210-1, but the framing processing unit 219 may be provided outside the chip that forms the signal processing unit 210-1. Moreover, when the client signal already has the transport frame format, the framing processing unit 219 can be omitted.

Moreover, in the present embodiment, one digital signal processing unit 220-1 is provided in the signal processing unit 210-1 and one digital signal processing unit 220-2 is provided in the signal processing unit 210-2, but another digital signal processing unit may be provided at another position. Moreover, the digital signal processing units 220-1 and 220-2 may be omitted.

<Third Embodiment>

Figure 15:
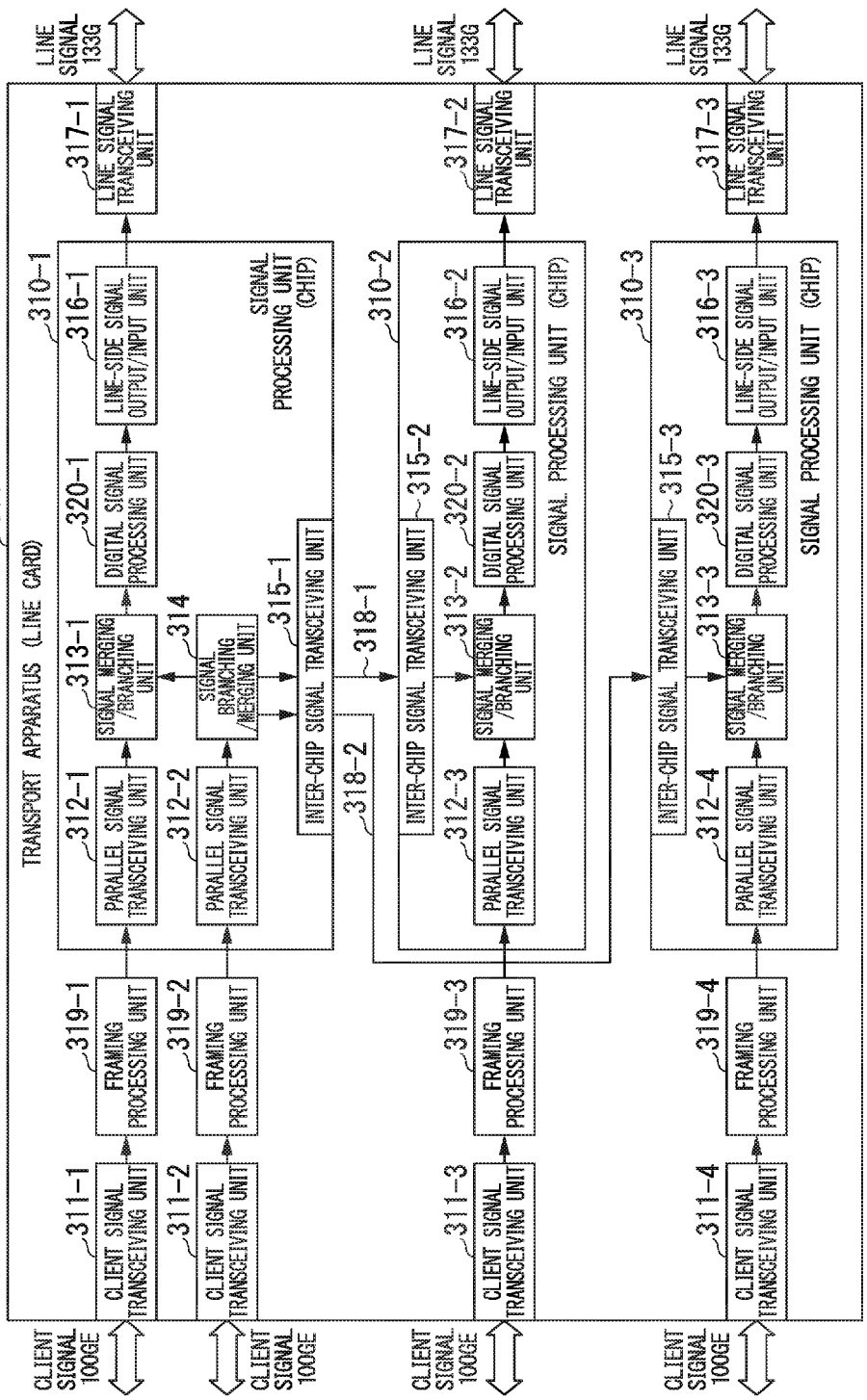
FIG. 15 is a functional block diagram illustrating a configuration of a transport apparatus 301 in accordance with a third embodiment of the present invention.
Figure 16:
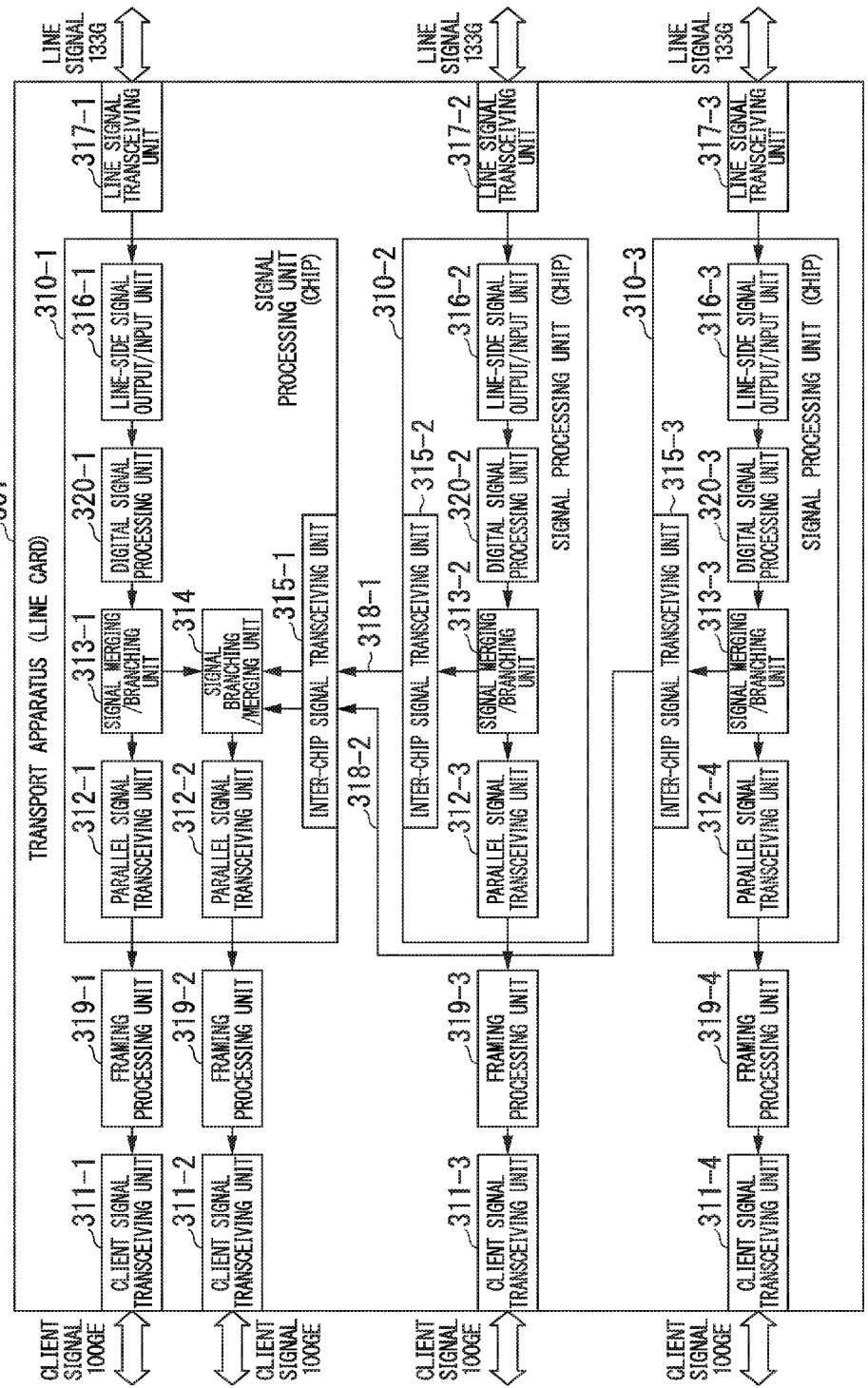
FIG. 16 is a functional block diagram illustrating a configuration of the transport apparatus 301 in accordance with the third embodiment of the present invention.

Next, a third embodiment of the present invention will be described. FIGS. 15 and 16 are functional block diagrams illustrating a configuration of a transport apparatus 301 in accordance with the third embodiment of the present invention. FIG. 15 illustrates a transmission-side signal path and FIG. 16 illustrates a reception-side signal path. The transport apparatus 301 illustrated in FIG. 15 transports 100 GE×4 client signals as 133 G×3 line signals.

The transport apparatus 301 includes client signal transceiving units 311-1 to 311-4, framing processing units 319-1 to 319-4, signal processing units 310-1 to 310-3, and line signal transceiving units 317-1 to 317-3.

The signal processing units 310-1 to 310-3 are configured as chips and are arranged in a line card that forms the transport apparatus 301. Moreover, in the present embodiment, an inter-chip wiring 318-1 is provided between the signal processing unit 310-1 and the signal processing unit 310-2. An inter-chip wiring 318-2 is provided between the signal processing unit 310-1 and the signal processing unit 310-3.

The signal processing unit 310-1 includes parallel signal transceiving units 312-1 and 312-2, a signal merging/branching unit 313-1, a signal branching/merging unit 314, a digital signal processing unit 320-1, a line-side signal output/input unit 316-1, and an inter-chip signal transceiving unit 315-1.

The signal processing unit (chip) 310-2 includes a parallel signal transceiving unit 312-3, a signal merging/branching unit 313-2, a digital signal processing unit 320-2, a line-side signal output/input unit 316-2, and an inter-chip signal transceiving unit 315-2.

The signal processing unit (chip) 310-3 includes a parallel signal transceiving unit 312-4, a signal merging/branching unit 313-3, a digital signal processing unit 320-3, a line-side signal output/input unit 316-3, and an inter-chip signal transceiving unit 315-3.

The inter-chip wiring 318-1 is provided between the inter-chip signal transceiving unit 315-1 of the signal processing unit 310-1 and the inter-chip signal transceiving unit 315-2 of the signal processing unit 310-2. The inter-chip wiring 318-2 is provided between the inter-chip signal transceiving unit 315-1 of the signal processing unit 310-1 and the inter-chip signal transceiving unit 315-3 of the signal processing unit 310-3.

First, referring to FIG. 15, a case in which the transport apparatus 301 receives 100 GE×4 client signals and transfers the received client signals as 133 G×3 line signals will be described.

The client signal transceiving units 311-1, 311-2, 311-3, and 311-4 of the transport apparatus 301 receive 100 GE client signals and transfer the received client signals to the framing processing units 319-1, 319-2, 319-3, and 319-4, respectively. The framing processing units 319-1, 319-2, 319-3, and 319-4 convert the 100 GE client signals into 100 G transport frame signals.

The signals received from the framing processing units 319-1 and 319-2 are input to the parallel signal transceiving units 312-1 and 312-2 of the signal processing unit 310-1, respectively. The signal received from the framing processing unit 319-3 is input to the parallel signal transceiving unit 312-3 of the signal processing unit 310-2. The signal received from the framing processing unit 319-4 is input to the parallel signal transceiving unit 312-4 of the signal processing unit 310-3.

In the signal processing unit 310-1, the signal received by the parallel signal transceiving unit 312-1 is transferred to the signal merging/branching unit 313-1. The signal received by the parallel signal transceiving unit 312-2 is transferred to the signal branching/merging unit 314.

The signal branching/merging unit 314 branches the 100 G transport frame signal received from the parallel signal transceiving unit 312-2 at the ratio of 1:1:1. Then, the signal branching/merging unit 314 transfers one of the branched 33 G signals to the signal merging/branching unit 313-1 and transfers the remaining two branched 33 G signals to the inter-chip signal transceiving unit 315-1. Here, the branching ratio may be an arbitrary value as long as it corresponds to the bit rate of the line signals.

The signal merging/branching unit 313-1 merges the 100 G transport frame signal received from the parallel signal transceiving unit 312-1 and the 33 G signal received from the signal branching/merging unit 314 and transfers the merged 133 G signal to the digital signal processing unit 320-1. The digital signal processing unit 320-1 performs signal processing for equalization of deterioration due to transport or the like on the received 133 G signal and transfers the processed signal to the line-side signal output/input unit 316-1.

The line-side signal output/input unit 316-1 transmits the received 133 G signal to the line signal transceiving unit

317-1. The line signal transceiving unit 317-1 performs electric-optic conversion on the 133 G signal and outputs the converted optical signal to the line side.

In the signal processing unit 310-2, the signal received by the parallel signal transceiving unit 312-3 is transferred to the signal merging/branching unit 313-2. One of the two 33 G signals transmitted from the signal branching/merging unit 314 to the inter-chip signal transceiving unit 315-1 is transferred from the inter-chip signal transceiving unit 315-1 to the inter-chip signal transceiving unit 315-2 via the inter-chip wiring 318-1. The inter-chip signal transceiving unit 315-2 transfers the received 33 G signal to the signal merging/branching unit 313-2.

The signal merging/branching unit 313-2 merges the 100 G transport frame signal received from the parallel signal transceiving unit 312-3 and the 33 G signal received from the inter-chip signal transceiving unit 315-2 and transfers the merged 133 G signal to the digital signal processing unit 320-2. The digital signal processing unit 320-2 performs signal processing for equalization of deterioration due to transport or the like on the received 133 G signal and transfers the signal subjected to the signal processing to the line-side signal output/input unit 316-2.

The line-side signal output/input unit 316-2 transmits the received 133 G signal to the line signal transceiving unit 317-2. The line signal transceiving unit 317-2 performs electric-optic conversion on the received 133 G signal and outputs the converted optical signal to the line side.

In the signal processing unit 310-3, the 100 G signal received by the parallel signal transceiving unit 312-4 is transferred to the signal merging/branching unit 313-3. The remaining one of the two 33 G signals transmitted from the signal branching/merging unit 314 to the inter-chip signal transceiving unit 315-1 is transferred from the inter-chip signal transceiving unit 315-1 to the inter-chip signal transceiving unit 315-3 via the inter-chip wiring 318-2. The inter-chip signal transceiving unit 315-3 transfers the received 33 G signal to the signal merging/branching unit 313-3.

The signal merging/branching unit 313-3 merges the 100 G transport frame signal received from the parallel signal transceiving unit 312-4 and the 33 G signal received from the inter-chip signal transceiving unit 315-3 and transfers the merged 133 G signal to the digital signal processing unit 320-3. The digital signal processing unit 320-3 performs signal processing for equalization of deterioration due to transport or the like on the received 133 G signal and transfers the signal subjected to the signal processing to the line-side signal output/input unit 316-3.

The line-side signal output/input unit 316-3 transmits the received 133 G signal to the line signal transceiving unit 317-3. The line signal transceiving unit 317-3 performs electric-optic conversion on the received 133 G signal and outputs the converted optical signal to the line side.

Next, referring to FIG. 16, a case in which the transport apparatus 301 receives 133 G×3 line signals and transfers the received line signals as 100 GE×4 client signals will be described.

In FIG. 16, the 133 G×3 signals received by the line signal transceiving units 317-1 to 317-3 are transferred to the line-side signal output/input unit 316-1, the line-side signal output/input unit 316-2, and the line-side signal output/input unit 316-3, respectively.

In the signal processing unit 310-1, the line-side signal output/input unit 316-1 transfers the received 133 G signal to the digital signal processing unit 320-1. The digital signal processing unit 320-1 performs signal equalization or the like by means of digital signal processing on the signal received from the line-side signal output/input unit 316-1. The 133 G signal having been subjected to signal equalization or the like is transferred to the signal merging/branching unit 313-1.

The signal merging/branching unit 313-1 branches the received 133 G signal to a 100 G transport frame signal and a 33 G signal. Then, the signal merging/branching unit 313-1 transfers the 100 G transport frame signal to the parallel signal transceiving unit 312-1 and transfers the 33 G signal to the signal branching/merging unit 314.

In the signal processing unit 310-2, the line-side signal output/input unit 316-2 transfers the 133 G signal received from the line signal transceiving unit 317-2 to the digital signal processing unit 320-2. The digital signal processing unit 320-2 performs signal equalization or the like by means of digital signal processing on the signal received from the line-side signal output/input unit 316-2. The 133 G signal having been subjected to signal equalization or the like is transferred to the signal merging/branching unit 313-2.

The signal merging/branching unit 313-2 branches the received 133 G signal to a 100 G transport frame signal and a 33 G signal. Then, the signal merging/branching unit 313-2 transfers the branched 100 G transport frame signal to the parallel signal transceiving unit 312-3 and transfers the 33 G signal to the inter-chip signal transceiving unit 315-2.

The inter-chip signal transceiving unit 315-2 transfers the received 33 G signal to the inter-chip signal transceiving unit 315-1 via the inter-chip wiring 318-1. The inter-chip signal transceiving unit 315-1 transfers the received 33 G signal to the signal branching/merging unit 314.

In the signal processing unit 310-3, the line-side signal output/input unit 316-3 transfers the 133 G signal received from the line signal transceiving unit 317-3 to the digital signal processing unit 320-3. The digital signal processing unit 320-3 performs signal equalization or the like by means of digital signal processing.

The 133 G signal having been subjected to signal equalization or the like, received from the digital signal processing unit 320-3 is transferred to the signal merging/branching unit 313-3. The signal merging/branching unit 313-3 branches the received 133 G signal to a 100 G transport frame signal and a 33 G signal. Then, the signal merging/branching unit 313-3 transfers the 100 G transport frame signal to the parallel signal transceiving unit 312-4 and transfers the 33 G signal to the inter-chip signal transceiving unit 315-3.

The inter-chip signal transceiving unit 315-3 transfers the received 33 G signal to the inter-chip signal transceiving unit 315-1 via the inter-chip wiring 318-2. The inter-chip signal transceiving unit 315-1 transfers the received 33 G signal to the signal branching/merging unit 314.

The signal branching/merging unit 314 merges the 33 G signal received from the signal merging/branching unit 313-1 and the two 33 G signals received from the inter-chip signal transceiving unit 315-1. Then, the signal branching/merging unit 314 recovers the 100 G transport frame signal and transfers the recovered signal to the parallel signal transceiving unit 312-2.

The parallel signal transceiving units 312-1, 312-2, 312-3, and 312-4 transfer the received 100 G transport frame signals to the framing processing units 319-1, 319-2, 319-3, and 319-4, respectively. The framing processing units 319-1, 319-2, 319-3, and 319-4 recover 100 GE client signals from the 100 G transport frame signals. Then, the framing processing units 319-1, 319-2, 319-3, and 319-4 transfer the client signals to the client signal transceiving units 311-1, 311-2, 311-3, and 311-4, respectively. The client signal transceiving units 311-1, 311-2, 311-3, and 311-4 output the received 100 GE client signals outside the transport apparatus.

As described above, in the present embodiment, the signal merging/branching unit 313-1 and the signal branching/merging unit 314 are provided in the signal processing unit 310-1. Moreover, the signal merging/branching unit 313-2 is provided in the signal processing unit 310-2. Moreover, the signal merging/branching unit 313-3 is provided in the signal processing unit 310-3. Moreover, the inter-chip wiring 318-1 is provided between the inter-chip signal transceiving unit 315-1 of the signal processing unit 310-1 and the inter-chip signal transceiving unit 315-2 of the signal processing unit 310-2. Moreover, the inter-chip wiring 318-2 is provided between the inter-chip signal transceiving unit 315-1 of the signal processing unit 310-1 and the inter-chip signal transceiving unit 315-3 of the signal processing unit 310-3. As a result, it is possible to transfer 100 GE×4 client signals as 133 G×3 line signals. Moreover, it is possible to transfer 133 G×3 line signals as 100 GE×4 client signals.

It is to be noted that in the present embodiment, the framing processing units 319-1 to 319-4 are provided outside the chips that form the signal processing units 310-1 to 310-3, but the framing processing units 319-1 to 319-4 may be provided in the chips that form the signal processing units 310-1 to 310-3. Moreover, when the client signals already have the transport frame format, the framing processing units 319-1 to 319-4 can be omitted.

Moreover, in the present embodiment, the digital signal processing units 320-1 to 320-3 are provided in the signal processing units 310-1 to 310-3, respectively, but another digital signal processing unit may be provided at another position. Moreover, the digital signal processing units 320-1 to 320-3 may be omitted.

<Extension Example>

Figure 17:
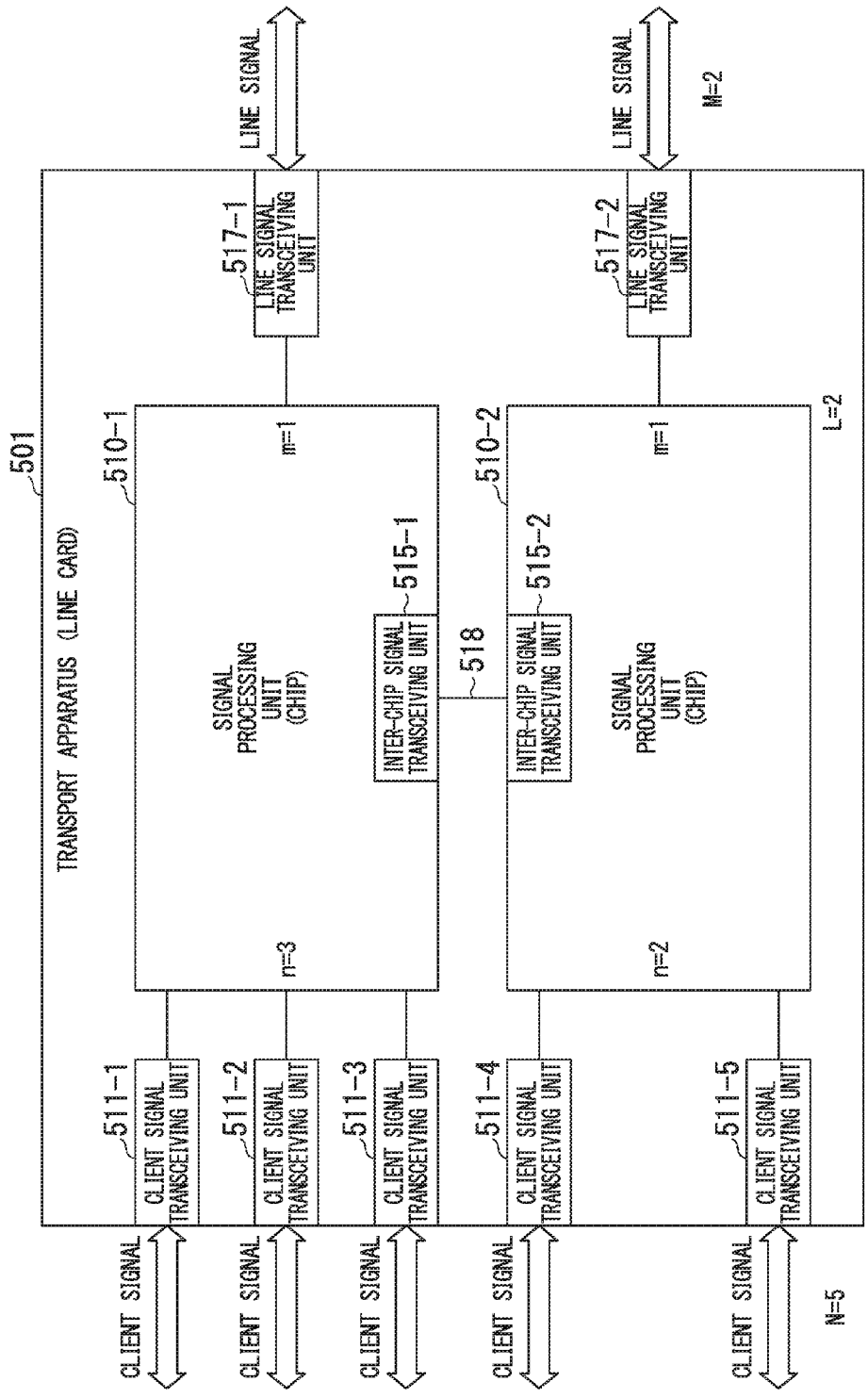
FIG. 17 is a functional block diagram illustrating a configuration in which the transport apparatus in accordance with the first to third embodiments of the present invention is extended to a general example.
Figure 18:
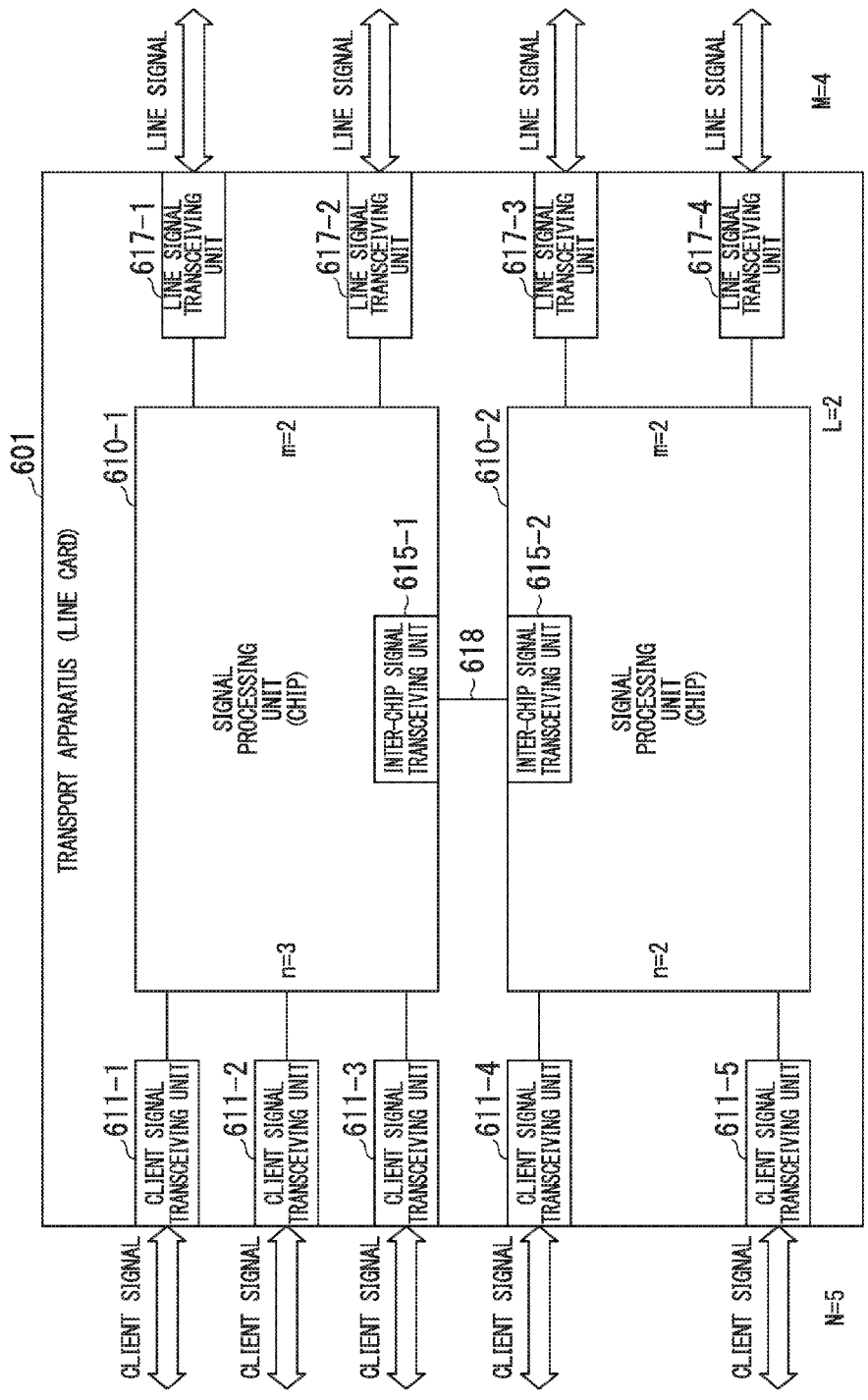
FIG. 18 is a functional block diagram illustrating a configuration in which the transport apparatus in accordance with the first to third embodiments of the present invention is extended to another general example.

FIGS. 17 and 18 are functional block diagrams illustrating a configuration in which the transport apparatus in accordance with the first to third embodiments of the present invention is extended to a general example.

The configuration illustrated in FIG. 17 is an example in which the number of ports corresponding to the number of channels on the line signal-side for each of the signal processing units 510-1 and 510-2 is one. This extension example is particularly an example in which signals corresponding to one channel are output from a signal processing unit (chip).

As illustrated in FIG. 17, a transport apparatus 501 includes N (N=5) client signal transceiving units 511-1 to 511-5, L (L=2) signal processing units 510-1 and 510-2, and M (M=2) line signal transceiving units 517-1 and 517-2.

The signal processing unit 510-1 includes n (n=3) client signal-side transceiving ports and m (m=1) line signal-side transceiving ports. The signal processing unit 510-2 includes n (n=2) client signal-side transceiving ports and m (m=1) line signal-side transceiving ports. The signal processing units 510-1 and 510-2 are configured as chips and are arranged in a line card that forms the transport apparatus 501. In the signal processing units 510-1 and 510-2, inter-chip signal transceiving units 515-1 and 515-2, parallel signal transceiving units, framing processing units, digital signal processing units, signal merging/branching units, signal branching/merging units, line-side signal output/input units (not illustrated), and the like are provided. Moreover, an inter-chip wiring 518 is provided between the inter-chip signal transceiving unit 515-1 of the signal processing unit 510-1 and the inter-chip signal transceiving unit 515-2 of the signal processing unit 510-2. A branched signal is transceived between the inter-chip signal transceiving unit 515-1 of the signal processing unit 510-2 and the inter-chip signal transceiving unit 515-2 of the signal processing unit 510-2 via the inter-chip wiring 518.

It is assumed that 100 GE client signals are input to client signal transceiving units 511-1, 511-2, 511-3, 511-4, and 511-5. In this case, the signals are branched by the signal branching/merging units in the signal processing units 510-1 and 510-2 at the ratio of 1:1. In this case, the bit rate of the signals output from the line signal transceiving units 517-1 and 517-2 is 100 G×5/2=250 G. When the client signals are converted into transport frames by the framing processing units of the signal processing units 510-1 and 510-2, the bit rate of the 250 G signals is increased by the amount corresponding to the overhead of the transport frames.

FIG. 18 is a functional block diagram illustrating another extension example of the transport apparatus in accordance with the first to third embodiments of the present invention. This extension example is particularly an example in which signals corresponding to a plurality of channels are output from a signal processing unit (chip). In the configuration illustrated in FIG. 17, the number of ports on the line signal-side for the signal processing units 510-1 and 510-2 is one. In contrast, in the configuration illustrated in FIG. 18, the number of ports on the line signal-side for signal processing units 610-1 and 610-2 is plural (in this example, two).

As illustrated in FIG. 18, a transport apparatus 601 includes N (N=5) client signal transceiving units 611-1 to 611-5, L (L=2) signal processing units 610-1 and 610-2, and M (M=4) line signal transceiving units 617-1 to 617-4.

The signal processing unit 610-1 includes n (n=3) client signal-side transceiving ports and m (m=2) line signal-side transceiving ports. The signal processing unit (chip) 610-2 includes n (n=2) client signal-side transceiving ports and m (m=2) line signal-side transceiving ports. The signal processing units 610-1 and 610-2 are configured as chips and are arranged in a line card that forms the transport apparatus 601. In the signal processing units 610-1 and 610-2, inter-chip signal transceiving units 615-1 and 615-2, parallel signal transceiving units, framing processing units, digital signal processing units, signal merging/branching units, signal branching/merging units, line-side signal output/input units (not illustrated), and the like are provided. Moreover, an inter-chip wiring 618 is provided between the inter-chip signal transceiving unit 615-1 of the signal processing unit 610-1 and the inter-chip signal transceiving unit 615-2 of the signal processing unit 610-2. A branched signal is transceived between the inter-chip signal transceiving unit 615-1 of the signal processing unit 610-1 and the inter-chip signal transceiving unit 615-2 of the signal processing unit 610-2 via the inter-chip wiring 618.

It is assumed that 100 GE client signals are input to the client signal transceiving units 611-1, 611-2, 611-3, 611-4, and 611-5. In this case, the signals are branched by the signal branching/merging units in the signal processing units 610-1 and 610-2 at the ratio of 1:1. In this case, the bit rate of the signals output from the line signal transceiving units 617-1 to 617-4 is 100 G 5/4=125 G. When the client signals are converted into transport frames by the framing processing units of the signal processing units (chips) 610-1 and 610-2, the bit rate of the 125 G signal is increased by the amount corresponding to the overhead of the transport frames.

<First Application Example>

Figure 19:
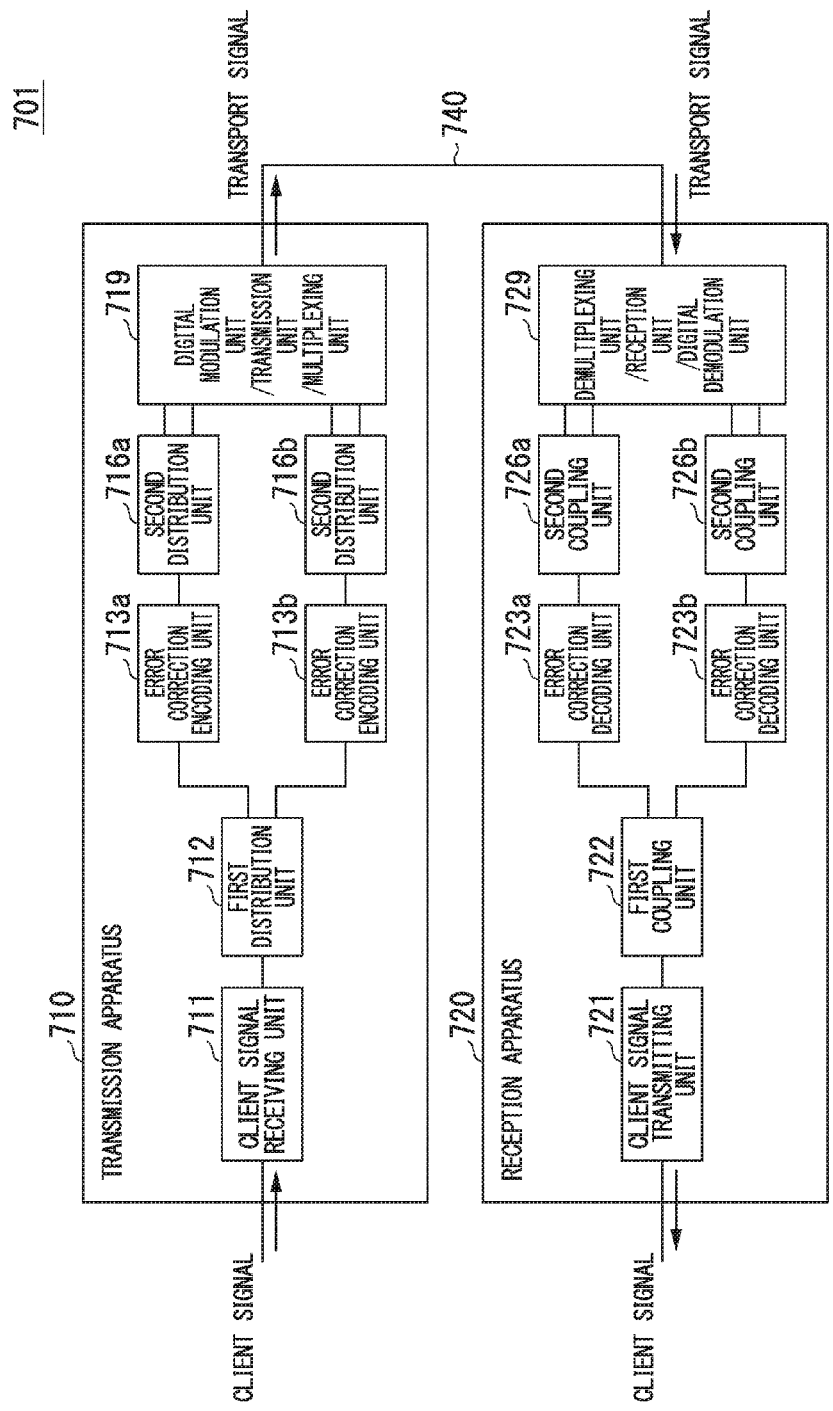
FIG. 19 is a diagram illustrating an outline of a multi-carrier optical transport system to which a signal branching/merging unit in accordance with the first to third embodiments of the present invention can be applied.

The transport apparatus in accordance with the first to third embodiments of the present invention can be broadly used when a client signal is branched and transported. FIG. 19 is a diagram illustrating an outline of a multi-carrier optical transport system to which the signal branching/merging unit in accordance with the first to third embodiments of the present invention can be applied.

As illustrated in FIG. 19, a multi-carrier optical transport system 701 includes a transmission apparatus 710, a reception apparatus 720, and an optical transmission path 740 that connects the transmission apparatus 710 and the reception apparatus 720.

In the transmission apparatus 710, a client signal receiving unit 711 receives a client signal such as 100 GE or OTU4 from an external apparatus connected to the transmission apparatus 710. Moreover, if the received client signal is an OTU4 frame, the client signal receiving unit 711 outputs the received client signal as it is. If the received client signal is 100 GE, the client signal receiving unit 711 maps the received client signal to an OTU4 frame and outputs the mapped OTU4 frame.

A first distribution unit 712 divides a signal of the OTU4 frame output by the client signal receiving unit 711 into blocks. Here, when the signal is divided into the blocks, the first distribution unit 712 selects a value which is a divisor of the size of the OTU4 frame and which is larger than or equal to the number of bytes of an overhead element required for a functional unit performing signal processing by referring to the distributed signals to detect a frame structure of the OTU4 frame, as the size of the divided blocks. For example, in the case of the OTU4 frame, the frame size is 16320 bytes. The divisors of 16320 are 1, 2, 3, 4, 5, 6, 8, 10, 12, 15, 16, 17, 20, . . . , 4080, 5440, 8160 , and 16320 , and these values are the candidates for a block size. Error correction encoding units 713a and 713b append an error correction code to each of the signals distributed by the first distribution unit 712.

Second distribution units 716a and 716b distribute a signal to which an error correction code is appended by the error correction encoding units 713a and 713b into two signals so as to correspond to X and Y-polarization waves. Moreover, similarly to the first distribution unit 712, the second distribution units 716a and 716b distribute signals based on the frame size of the signals output by the error correction encoding units 713a and 713b and the number of bytes of the overhead element required for the process of the functional unit performing signal processing by referring to the distributed signals to detect the frame structure. For example, in a process of digital modulation of a digital modulation unit included in a digital modulation unit/transmission unit/multiplexing unit 719 connected to the second distribution units 716a and 716b, a training sequence for estimating chromatic dispersion or the like of a transmission path may be appended after a frame structure is detected.

In the digital modulation unit/transmission unit/multiplexing unit 719, the digital modulation unit performs modulation based on a 2SC-DP-BPSK scheme on signals of the X and Y-polarization waves distributed by the second distribution units 716a and 716b and multiplexes the signals, the transmitting unit transmits the modulated signals, and the multiplexing unit wavelength-division multiplexes the modulated signals to generate a transport signal and outputs the transport signal. The output transport signal is transported through the optical transmission path 740 over a long distance.

In a demultiplexing unit/reception unit/digital demodulation unit 729 of the reception apparatus 720, the demultiplexing unit divides the optical signal (the transport signal) into signals for subcarriers and then demultiplexes each of the signals divided for the subcarriers to X and Y-polarization waves, the reception unit reads the demultiplexed signals, and the digital demodulation unit performs demodulation on the read signals to output signals corresponding to the demultiplexed X and Y-polarization waves. Second coupling units 726a and 726b detect frame alignment signal (FAS) bytes from blocks of the two signals of the X and Y-polarization waves. Moreover, the second coupling units 726a and 726b perform reordering and de-skewing on the blocks of the two signals using the detected FAS bytes to reproduce original signals and output the reproduced signals. Error correction decoding units 723a and 723b perform an error correction process on the signals output from the second coupling units 726a and 726b.

A first coupling unit 722 detects the FAS bytes from the blocks of the two signals output from the error correction decoding units 723a and 723b. Moreover, the first coupling unit 722 performs reordering and de-skewing on the blocks of the two signals using the detected FAS bytes to reproduce the original signal having the OTU4 frame structure and outputs the reproduced signal. A client signal transmitting unit 721 outputs the OTU4 frame signal output by the first coupling unit 722 as it is, or converts the OTU4 frame signal into a 100 GE signal and outputs the converted signal.

The signal branching/merging unit in accordance with the first to third embodiments of the present invention can be used in such a multi-carrier optical transport system when the first distribution unit 712 divides the OTU4 frame signal into the blocks and when the first coupling unit 722 couples the divided blocks to the OTU4 frame signal.

<Second Application Example>

Figure 20:
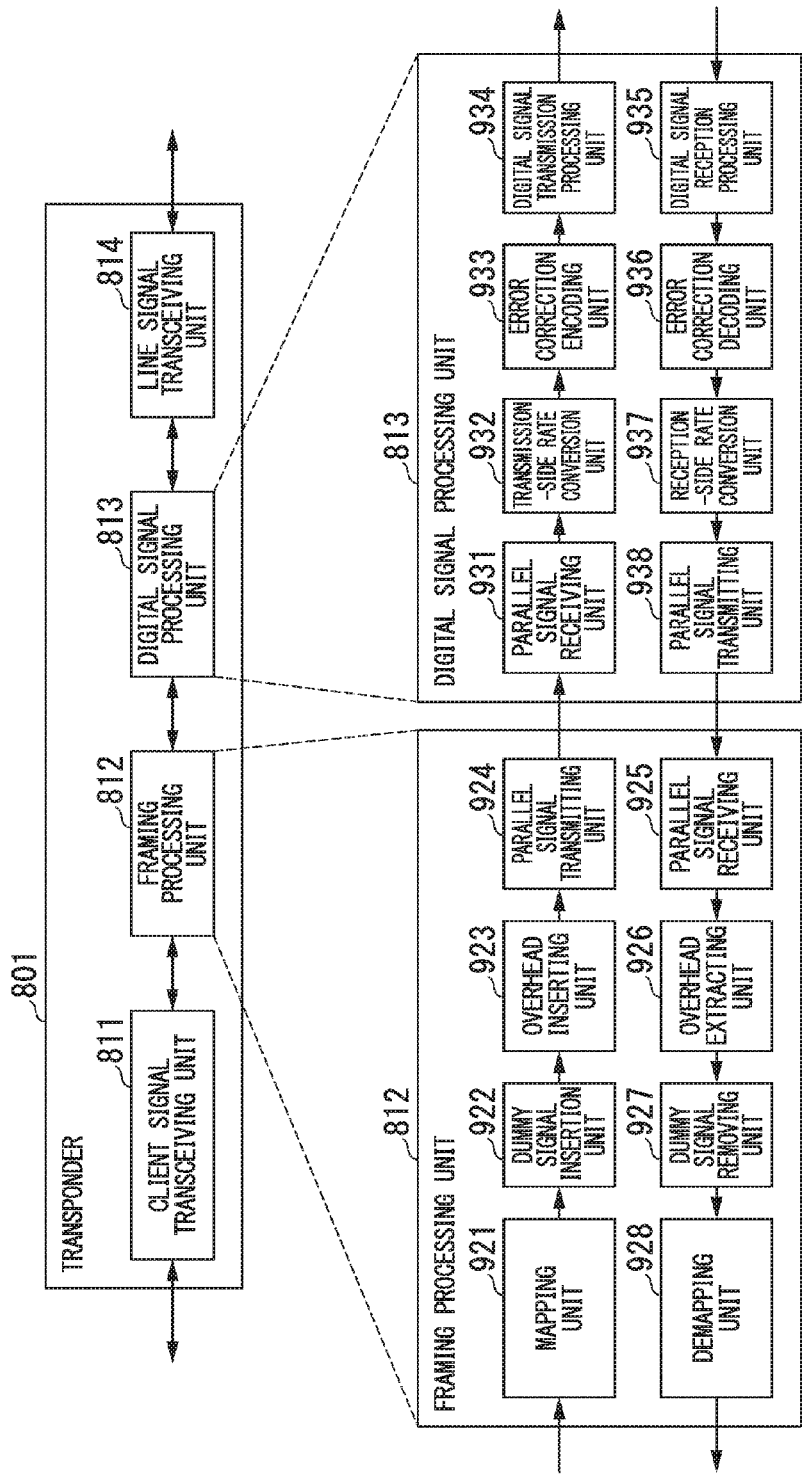
FIG. 20 is a functional block diagram illustrating a configuration of a transponder of an optical communication system which enables a line signal to be transferred even when the bit rate is variable.

FIG. 20 is a functional block diagram illustrating a configuration of a transponder of an optical communication system which enables transfer even when the bit rate of a line signal is variable.

As illustrated in the drawing, a transponder 801 is configured to include a client signal transceiving unit 811, a framing processing unit 812, a digital signal processing unit 813, and a line signal transceiving unit 814. The framing processing unit 812 includes an OTU4 framer, and the digital signal processing unit 813 includes a digital coherent signal processing large scale integration (DSP-LSI: digital signal processing large scale integration).

The client signal transceiving unit 811 transceives a client signal. The line signal transceiving unit 814 transceives the line signal to and from an opposing transponder 801 via a network. The framing processing unit 812 maps the client signal to a transport frame. The framing processing unit 812 is configured to include a mapping unit 921, a dummy signal insertion unit 922, an overhead inserting unit 923, a parallel signal transmitting unit 924, a parallel signal receiving unit 925, an overhead extracting unit 926, a dummy signal removing unit 927, and a demapping unit 928. The digital signal processing unit 813 performs a signal equalization process or the like on deterioration in an optical transmission path. The digital signal processing unit 813 is configured to include a parallel signal receiving unit 931, a transmission-side rate conversion unit 932, an error correction encoding unit 933, a digital signal transmission processing unit 934, a digital signal reception processing unit 935, an error correction decoding unit 936, a reception-side rate conversion unit 937, and a parallel signal transmitting unit 938.

It is assumed that 10 GE×5 (approximately 52 G) client signals are input to the transponder 801. The client signal transceiving unit 811 of the transponder 801 transmits the client signals to the framing processing unit 812. The mapping unit 921 of the framing processing unit 812 maps the client signals to a 100 G transport frame which is a transport frame corresponding to OTU4 since the interface (OTL4.10) between the OTU4 framer and the DSP is 112 G that is compliant with OTU4. The dummy signal insertion unit 922 inserts a dummy signal such as FS into the signal output from the mapping unit 921.

The overhead inserting unit 923 inserts an OH of the OTN into data output from the dummy signal insertion unit 922 and transmits the data having the OH inserted therein to the parallel signal transmitting unit 924 as a transport frame that is compliant with OTU4. The parallel signal transmitting unit 924 transmits transport frames output from the overhead inserting unit 923 concurrently to the digital signal processing unit 813 of the DSP via an optical channel transport lane (OTL) 4.10 interface. The parallel signal receiving unit 931 of the DSP recovers the OTU4 transport frame received from the framer (the framing processing unit 812) and transmits the recovered transport frame to the transmission-side rate conversion unit 932.

The transmission-side rate conversion unit 932 removes the dummy signal such as FS inserted by the OTU4 framer (the framing processing unit 812) from the OTU4 transport frame recovered by the parallel signal receiving unit 931 to generate a 50 G transport frame (56 G).

The transmission-side rate conversion unit 932 outputs the generated 50 G transport frame to the error correction encoding unit 933. The error correction encoding unit 933 appends an error correction code to the 50 G transport frame and transmits the 50 G transport frame having the error correction code appended thereto to the digital signal transmission processing unit 934.

The digital signal transmission processing unit 934 performs an optical digital coherent process for long-distance transport on the 50 G transport frame and transmits the processed 50 G transport frame to the line signal transceiving unit 814. The line signal transceiving unit 814 performs E/O conversion on data of the 50 G transport frame output from the digital signal processing unit 813 and transmits the converted data, which is an optical signal, to a network as a line signal. The transmitted data is received by the line signal transceiving unit 814 of the opposing transponder 801.

The line signal transceiving unit 814 of the opposing transponder 801 performs optic/electric (O/E) conversion on the received data and then outputs the electrical signal obtained by the conversion to the DSP (the digital signal processing unit 813).

The digital signal reception processing unit 935 of the digital signal processing unit 813 performs signal equalization on the received data and outputs a 50 G transport frame.

The error correction decoding unit 936 performs an error correction process on the 50 G transport frame output from the digital signal reception processing unit 935. The error correction decoding unit 936 transmits the 50 G transport frame having been subjected to the error correction process to the reception-side rate conversion unit 937.

The reception-side rate conversion unit 937 performs conversion that is opposite to the conversion in the transmission-side rate conversion unit 932 to generate 100 G transport frames (OTU4: 112 G) from 50 G transport frames (56 G) output by the error correction decoding unit 936.

The reception-side rate conversion unit 937 transmits the recovered two 100 G transport frames (OTU4: 112 G) to the parallel signal transmitting unit 938. The parallel signal transmitting unit 938 transmits the 100 G transport frames (OTU4: 112 G) concurrently to the OTU4 framer (the framing processing unit 812) via the OTL4.10 interface between the DSP and the OTU4 framer.

The parallel signal receiving unit 925 of the OTU4 framer recovers the 100 G transport frame (OTU4: 112 G) and transmits the recovered 100 G transport frame to the overhead extracting unit 926. The overhead extracting unit 926 performs a process relating to an overhead, such as error monitoring, on the recovered 100 G transport frame (OTU4: 112 G) and then transmits the processed 100 G transport frame to the dummy signal removing unit 927.

The dummy signal removing unit 927 removes the dummy signal from the 50 G TSs (e.g., TS6 to TS10) included at predetermined positions in the payload of the 100 G transport frame (OTU4: 112 G). The dummy signal removing unit 927 transmits the 100 G transport frame (OTU4: 112 G) from which the dummy signal is removed to the demapping unit 928.

The demapping unit 928 extracts a client signal from the 100 G transport frame (OTU4: 112 G). The demapping unit 928 transmits the extracted 10 GE×5 client signals to the client signal transceiving unit 811. The client signal transceiving unit 811 outputs the clients signal received from the framer (the framing processing unit 812).

The signal branching/merging units in accordance with the first to third embodiments of the present invention can be used in such a system when the transmission-side rate conversion unit 932 generates the 50 G transport frames from the 100 G OTU4 transport frames and when the reception-side rate conversion unit 937 generates the 100 G transport frames from the 50 G transport frames.

Next, fourth to eleventh embodiments of the present invention illustrated below will describe the second application example illustrated in FIG. 20 in further detail.

Figure 21:
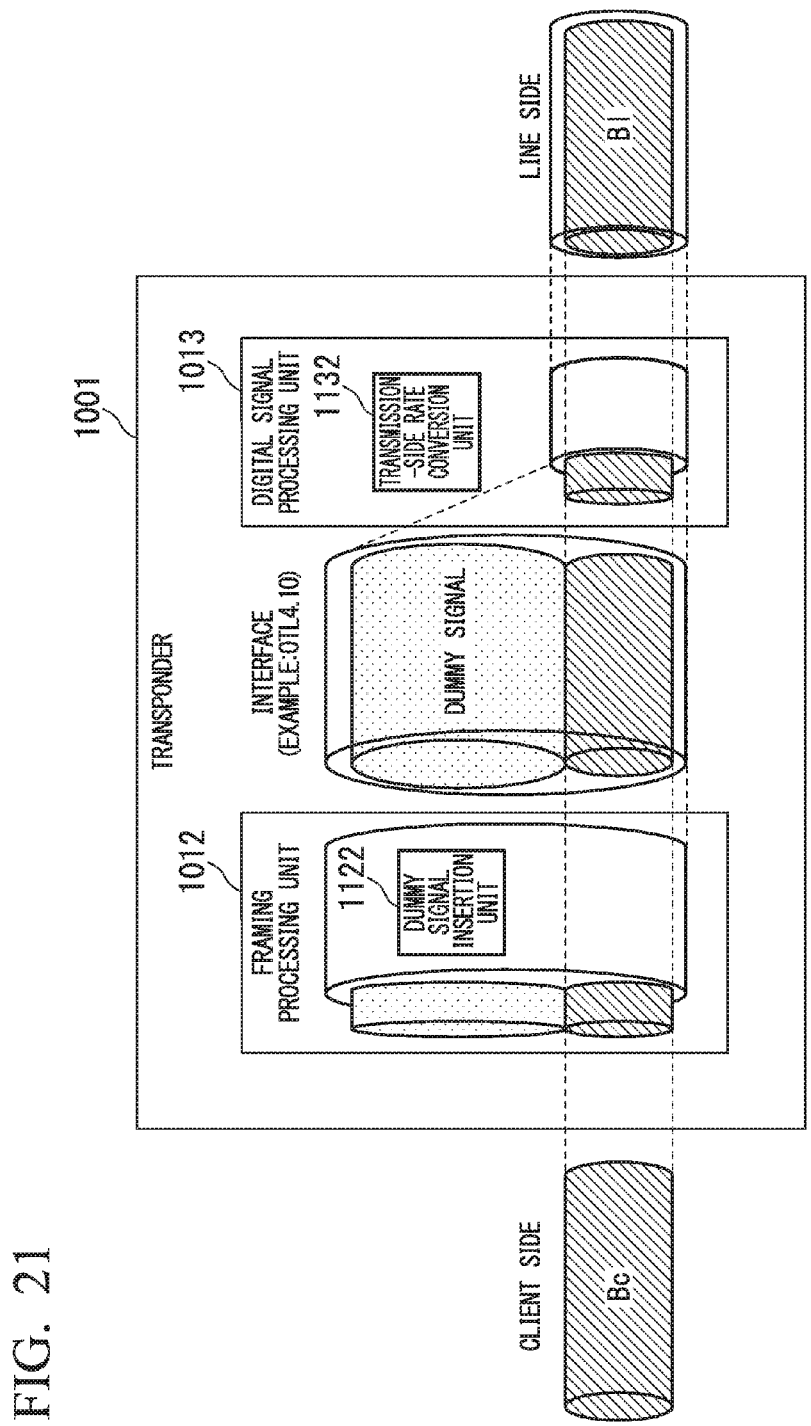
FIG. 21 is a diagram illustrating an outline of fourth to eleventh embodiments of the present invention.

FIG. 21 is a diagram illustrating an outline of the fourth to eleventh embodiments. The communication systems of these embodiments are formed by connecting a signal transmission-side transponder 1001 and a signal reception-side transponder 1001 via a network. The transmission and reception-side transponders 1001 which are frame rate conversion apparatuses have the same configuration and each include a framer having a framing processing unit 1012 and a DSP having a digital signal processing unit 1013. The OTL4.10, for example, is used as the interface between the framer and the DSP. In the drawing, an outline of the process of the transmission-side transponder 1001 is illustrated.

In the fourth to eleventh embodiments, as illustrated in the drawing, the framing processing unit 1012 in the framer of the transmission-side transponder 1001 forms a transport frame having the same bit rate (third transfer rate) as the interface between the framer and the DSP. By forming such a transport frame, signals can be transferred from the framer to the DSP. When the transport frame is formed, a dummy signal insertion unit 1122 of the framing processing unit 1012 inserts a dummy signal into TS of a payload of the transport frame between the framer and the DSP. By inserting this dummy signal, the bit rate (e.g., approximately 104 G in the case of an optical channel payload unit (OPU) 4) of the payload of the transport frame is made identical to the bit rate Bc (e.g., 10 GE×5: approximately 52 G, a first transfer rate) of the client signal. In this manner, the dummy signal insertion unit 1122 inserts a dummy signal having a deficient data amount for transfer with the transfer rate between the framer and the DSP. It is to be noted that G indicates gigabit.

In the DSP of the transmission-side transponder, a transmission-side rate conversion unit 1132 of the digital signal processing unit 1013 removes the dummy signal from the payload of the transport frame received from the framer and creates a transport frame corresponding to a bit rate B1

(second transfer rate) of the line signal. As a result, it is possible to perform transfer even when the bit rate B1 of the line signal is variable.

In the DSP of the reception-side transponder 1001, the digital signal processing unit 1013 inserts a dummy signal when setting the line signal received from the transmission-side transponder 1001 in the payload of the transport frame between the framer and the DSP. By inserting the dummy signal, a transport frame having the same bit rate as the interface between the framer and the DSP is recovered from the transport frame that is compliant with the bit rate B1 of the line signal. In the framer of the reception-side transponder 1001, the framing processing unit 1012 removes the dummy signal from the transport frame received from the DSP in which the dummy signal is set to recover the client signal and outputs the recovered client signal.

<Fourth Embodiment>

Figure 22:
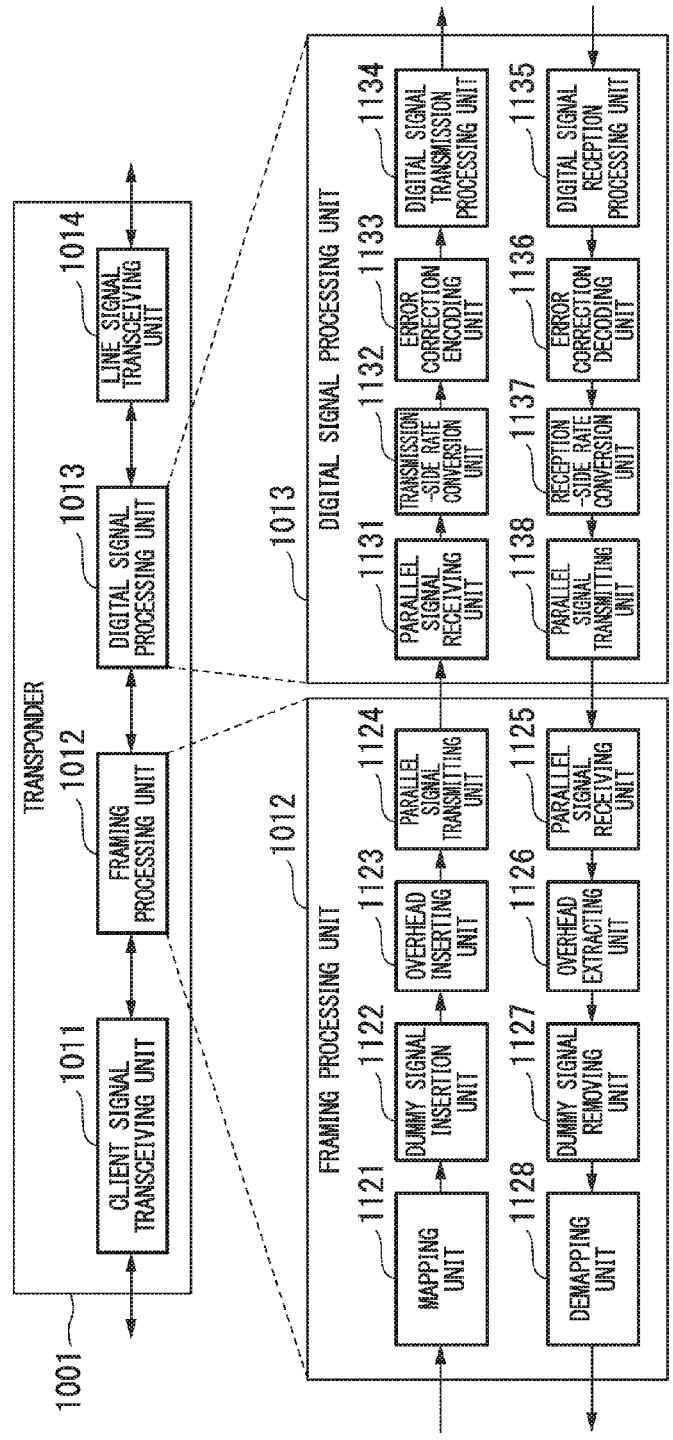
FIG. 22 is a functional block diagram illustrating a configuration of a transponder in accordance with the fourth embodiment of the present invention.

FIG. 22 is a functional block diagram illustrating a configuration of a transponder 1001 in accordance with the fourth embodiment of the present invention. The configuration of the transponder 1001 is basically the same as that of the transponder 801 illustrated in FIG. 20. As illustrated in FIG. 22, the transponder 1001 is configured to include a client signal transceiving unit 1011, a framing processing unit 1012, a digital signal processing unit 1013, and a line signal transceiving unit 1014. In the present embodiment, it is assumed that the framing processing unit 1012 is included in the OTU4 framer and the digital signal processing unit 1013 is included in the digital coherent signal processing LSI (DSP).

The client signal transceiving unit 1011 transceives a client signal. The line signal transceiving unit 1014 transceives a line signal to and from an opposing transponder 1001 via a network.

The framing processing unit 1012 maps the client signal to a transport frame. The framing processing unit 1012 is configured to include a mapping unit 1121, a dummy signal insertion unit 1122, an overhead inserting unit 1123, a parallel signal transmitting unit 1124, a parallel signal receiving unit 1125, an overhead extracting unit 1126, a dummy signal removing unit 1127, and a demapping unit 1128.

The mapping unit 1121 maps the client signal transmitted from the client signal transceiving unit 1011 to a transport frame that is compliant with an interface between the framer and the DSP and outputs the transport frame obtained by the mapping to the dummy signal insertion unit 1122. The dummy signal insertion unit 1122 inserts a dummy signal into the transport frame output from the mapping unit 1121 and outputs the transport frame having the dummy signal inserted therein to the overhead inserting unit 1123. The overhead inserting unit 1123 inserts overhead information into the transport frame into which the dummy signal is inserted by the dummy signal insertion unit 1122 and outputs the transport frame having the overhead information inserted therein to the parallel signal transmitting unit 1124. The parallel signal transmitting unit 1124 transfers transport frames into which overheads are inserted by the overhead inserting unit 1123 from the framing processing unit 1012 to the digital signal processing unit 1013 concurrently via the interface between the framer and the DSP.

The parallel signal receiving unit 1125 sets the signals transferred concurrently from the digital signal processing unit 1013 via the interface between the framer and the DSP in a transport frame and outputs the transport frame in which the signals are set to the overhead extracting unit 1126. The overhead extracting unit 1126 extracts an overhead of the transport frame output from the parallel signal receiving unit 1125 and performs a process relating to the overhead. The dummy signal removing unit 1127 removes the dummy signal from the transport frame output from the overhead extracting unit 1126 and outputs the transport frame from which the dummy signal is removed to the demapping unit 1128. The demapping unit 1128 recovers the client signal from the transport frame from which the dummy signal is removed by the dummy signal removing unit 1127 and outputs the recovered client signal to the client signal transceiving unit 1011.

The digital signal processing unit 1013 performs a signal equalization process or the like on deterioration in an optical transmission path. The digital signal processing unit 1013 is configured to include a parallel signal receiving unit 1131, a transmission-side rate conversion unit 1132, an error correction encoding unit 1133, a digital signal transmission processing unit 1134, a digital signal reception processing unit 1135, an error correction decoding unit 1136, a reception-side rate conversion unit 1137, and a parallel signal transmitting unit 1138.

The parallel signal receiving unit 1131 recovers a transport frame from the signals transmitted concurrently from the framing processing unit 1012 via the interface between the framer and the DSP and outputs the recovered transport frame to the transmission-side rate conversion unit 1132. The transmission-side rate conversion unit 1132 removes the dummy signal from the transport frame recovered by the parallel signal receiving unit 1131 to form a transport frame corresponding to a line-side rate and outputs the formed transport frame to the error correction encoding unit 1133. The error correction encoding unit 1133 appends an error correction code to the transport frame output by the transmission-side rate conversion unit 1132 and outputs the transport frame having the error correction code appended thereto to the digital signal transmission processing unit 1134. The digital signal transmission processing unit 1134 performs processing for signal equalization on the transport frame output from the error correction encoding unit 1133 and outputs the processed transport frame to the line signal transceiving unit 1014.

The digital signal reception processing unit 1135 outputs a transport frame obtained by performing a signal equalization process on the signal transferred from the line signal transceiving unit 1014 to the error correction decoding unit 1136. The error correction decoding unit 1136 outputs a transport frame obtained by performing error correction decoding on the transport frame output from the digital signal reception processing unit 1135 to the reception-side rate conversion unit 1137. The reception-side rate conversion unit 1137 forms a transport frame that is compliant with the interface between the framer and the DSP from the transport frame having been subjected to the error correction decoding by the error correction decoding unit 1136 so that the transport frame can be transferred to the framing processing unit 1012 and outputs the formed transport frame to the parallel signal transmitting unit 1138. The parallel signal transmitting unit 1138 transfers transport frames output from the reception-side rate conversion unit 1137 to the framing processing unit 1012 concurrently via the interface between the framer and the DSP.

The fourth embodiment illustrates an example of transfer when the bit rate of the client signal is 52 G, OTL4.10 that is compliant with OTU4 of 112 G is used as the interface between the OTU4 framer and the DSP, and the bit rate of the line signal is 56 G.

It is assumed that 10 GE×5 (approximately 52 G) client signals are input to the transponder 1001. The client signal transceiving unit 1011 of the transponder 1001 transmits the client signals to the framing processing unit 1012. The mapping unit 1121 of the framing processing unit 1012 maps the client signals to a 100 G transport frame which is a transport frame that is compliant with OTU4 since the interface (OTL4.10) between the OTU4 framer and the DSP is 112 G that is compliant with OTU4.

Figure 23A:
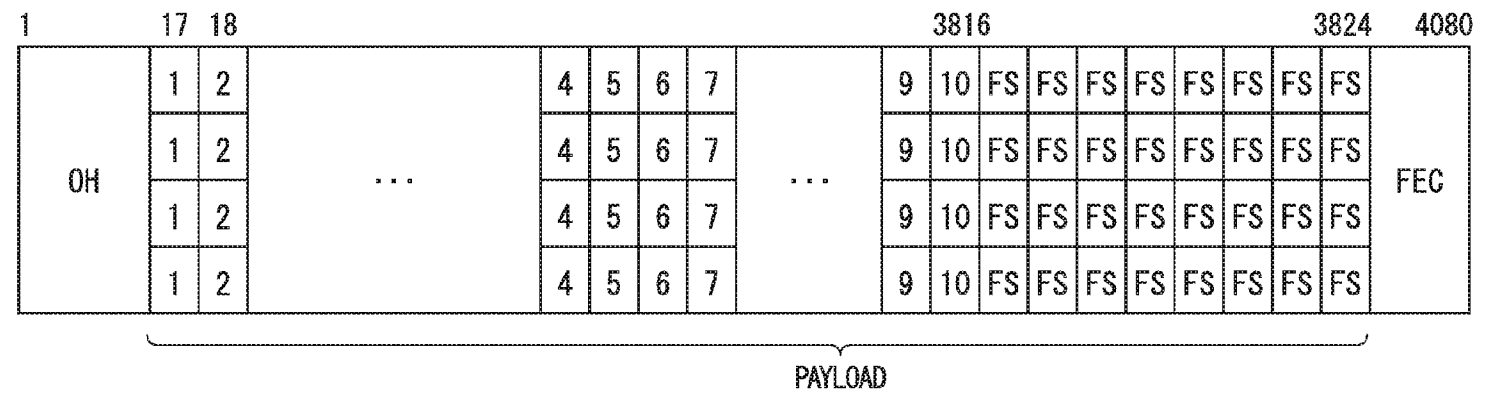
Figure 23B:
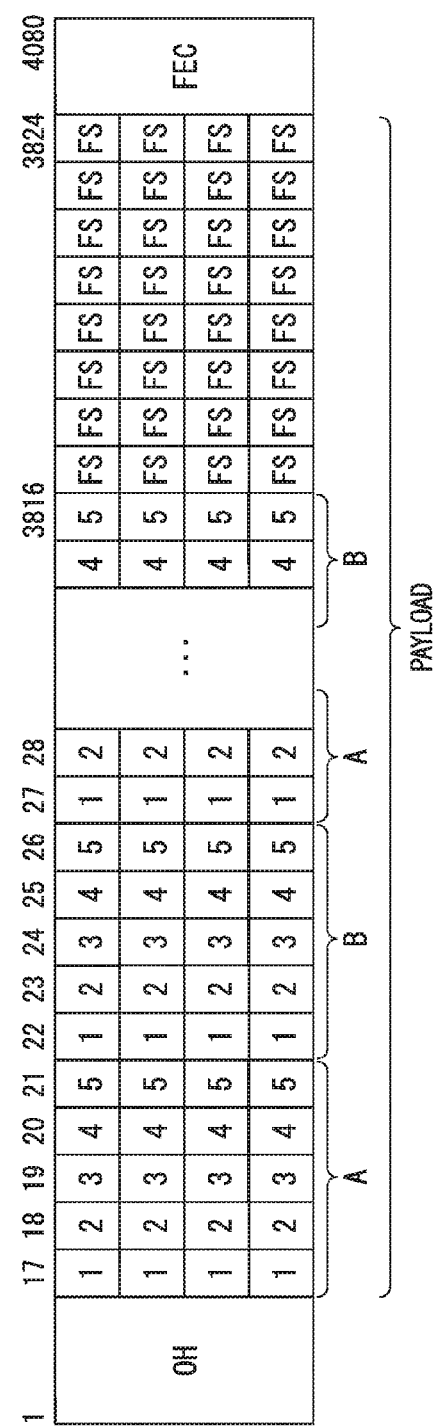
FIG. 23B is a diagram illustrating a frame configuration of a transport frame in accordance with the fourth embodiment.

FIG. 23A is a diagram illustrating a frame configuration of a 100 G transport frame and FIG. 23B is a diagram illustrating a frame configuration of a 50 G transport frame. The 100 G transport frame is a transport frame used in a 100 G-system interface and the 50 G transport frame is a transport frame used in a 50 G-system interface. In the following description, when 112 G is transferred by the 100 G transport frame, for example, this will be denoted as a 100 G transport frame (112 G).

As illustrated in FIGS. 23A and 23B, each of the 100 G transport frame and the 50 G transport frame is 4 rows (1 byte) by 4080 columns. An overhead (OH) is set in the 16 bytes of the first to sixteenth columns, a payload is set in 3808 bytes of 17th to 3824th columns, and FEC information is set in 256 bytes of 3825th to 4080th columns. In the 100 G transport frame and the 50 G transport frame, FS is set in the 3817th to 3824th bytes of the payload. In this example, for the sake of simplicity, an example in which the 17th to 3816th columns of the payload include ten 10 G TSs is illustrated, and the numbers in the payload indicate the TS numbers. The payload of the 100 G transport frame illustrated in FIG. 23A includes ten TSs of TS1 to TS10. A half of the ten TSs included in the payload of the 50 G transport frame illustrated in FIG. 23B is defined as a TS group A and the remaining half is defined as a TS group B. Five TSs of TS1 to TS5 are included in each of the TS groups A and B. It is to be noted that in the drawing, the TS group A and the TS group B are alternately arranged in the payload, but the arrangement of the TS groups A and B is not limited thereto. For example, the TS group A may be arranged in a first-half area of the payload and the TS group B may be arranged in a second-half area of the payload.

When mapping the client signal to the 100 G transport frame that is compliant with the OTU4, the mapping unit 1121 of the OTU4 framer maps the client signal to 50 G TSs (e.g., TS1 to TS5 in the 17th to 3816th columns of the 100 G transport frame of FIG. 23A) at predetermined positions in the payload. The dummy signal insertion unit 1122 sets a dummy signal, such as FS, in the remaining 50 G TSs (e.g., TS6 to TS10 in the 17th to 3816th columns illustrated in FIG. 23A) of the 100 G transport frame. By performing setting in this manner, it is possible to generate a transport frame with which 50 G data is transmitted while taking the format of the 100 G transport frame (OTU4) which can be transferred via the 100 G-system OTL4.10 interface.

The overhead inserting unit 1123 inserts an OH into the data output from the dummy signal insertion unit 1122 as the transport frame that is compliant with OTU4 and transmits the data having the OH inserted therein to the parallel signal transmitting unit 1124. The parallel signal transmitting unit 1124 transmits transport frames output from the overhead inserting unit 1123 concurrently to the digital signal processing unit 1013 of the DSP via the OTL4.10 interface. The parallel signal receiving unit 1131 of the DSP recovers the OTU4 transport frame received from the framer (the framing processing unit 1012) and transmits the recovered transport frame to the transmission-side rate conversion unit 1132.

Since the bit rate of the line signal is 50 G (56 G), it is not possible to perform transfer in the OTU4 format. Thus, the transmission-side rate conversion unit 1132 removes the dummy signal, such as FS, inserted by the OTU4 framer (the framing processing unit 1012) from the OTU4 transport frame recovered by the parallel signal receiving unit 1131 to generate a 50 G transport frame (56 G).

Figure 24:
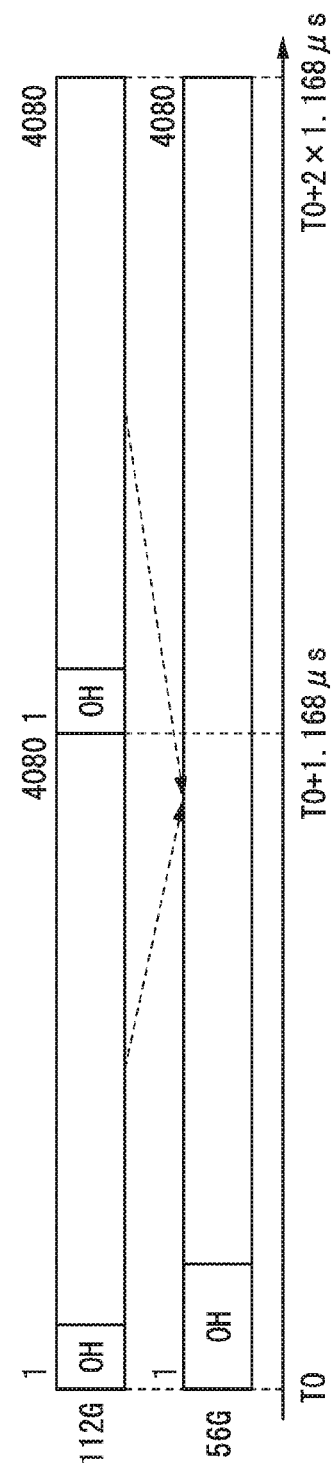
FIG. 24 is a diagram describing an outline of a transport frame conversion process of a transmission-side rate conversion unit in accordance with the fourth embodiment.

FIG. 24 is a diagram illustrating an outline of a conversion process of a transport frame by the transmission-side rate conversion unit 1132. The first 100 G transport frame corresponds to the signals from time T0 to time T0+1.168 microseconds (μs), and the subsequent second 100 G transport frame corresponds to the signals from time T0+1.168 μs to time T0+2×1.168 μs. On the other hand, the 50 G transport frame which is a transport frame used for 50 G-system signals corresponds to the signals from time T0 to time T0+2×1.168 μs, which correspond to one frame. The transmission-side rate conversion unit 1132 extracts the client signal from the 50 G TSs (5/10 TSs) at predetermined positions in the payload of each of two OTU4 100 G transport frames (112 G). The transmission-side rate conversion unit 1132 sets the extracted client signal at a predetermined position of the payload of the 50 G transport frame (56 G).

Figure 25:
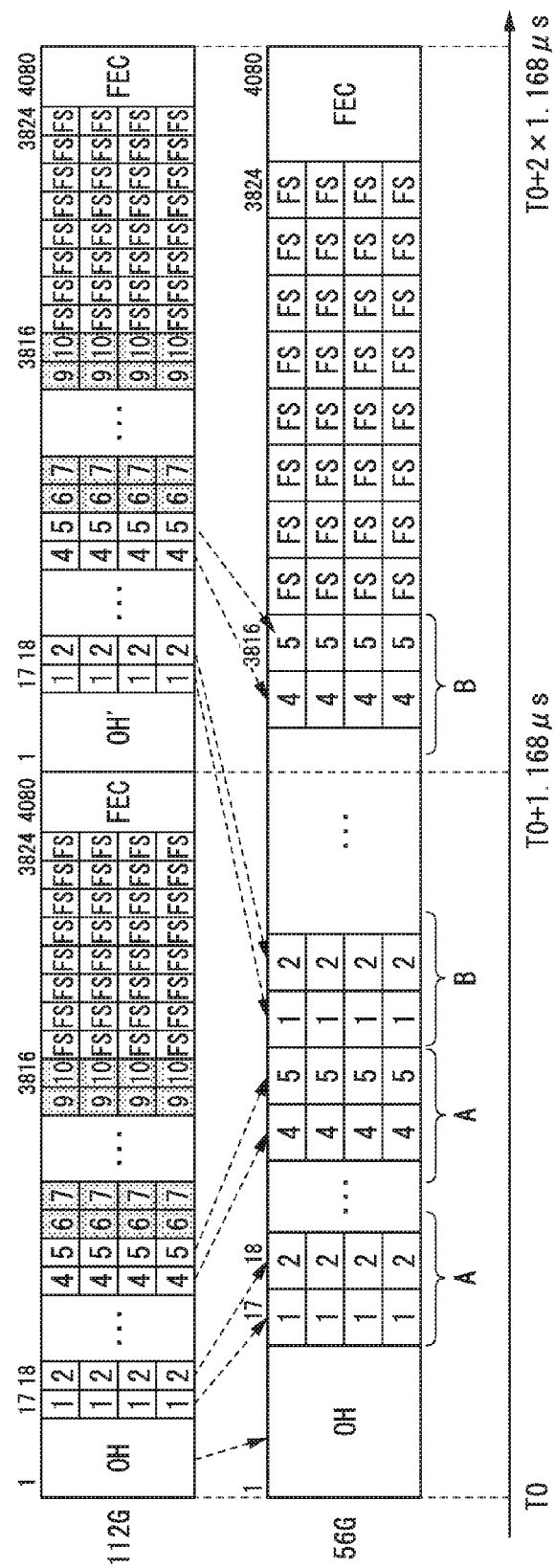
FIG. 25 is a diagram illustrating a transport frame conversion process executed by the transmission-side rate conversion unit in accordance with the fourth embodiment.

FIG. 25 is a diagram illustrating a process of the transmission-side rate conversion unit 1132 converting the 100 G transport frames (OTU4: 112 G) into the 50 G transport frame and illustrates the details of FIG. 24. It is to be noted that the hatched TSs in the 100 G transport frame (OTU4: 112 G) indicate that the dummy signal is set. The transmission-side rate conversion unit 1132 forms one 50 G transport frame (56 G) from two 100 G transport frames (112 G). Thus, the transmission-side rate conversion unit 1132 extracts the client signal from the 50 G TSs at predetermined positions (TS1 to TS5) of the payload in the first OTU4 100 G transport frame (112 G). The transmission-side rate conversion unit 1132 maps the extracted client signal to half of the TSs (TS1 to TS5 of the TS group A) at the predetermined positions of the payload of the 50 G transport frame (56 G). The reason why half of the TSs is used is to change the 100 G transport frames (112 G) to the 50 G transport frame (56 G).

Further, the transmission-side rate conversion unit 1132 extracts the 50 G TSs set at the predetermined positions (TS1 to TS5) of the payload in the second OTU4 100 G transport frame and extracts the client signal from the extracted TSs. The transmission-side rate conversion unit 1132 maps the extracted client signal to the remaining half of the TSs (TS1 to TS5 of the TS group B) of the payload in the 50 G transport frame (56 G).

The transmission-side rate conversion unit 1132 sets the OH of the first OTU4 frame in the OH of the 50 G transport frame (56 G) and removes the OH', which is the OH of the second OTU4 frame.

By mapping in this manner, the transmission-side rate conversion unit 1132 generates the 50 G transport frame (56 G) from the 100 G transport frames (OTU4: 112 G).

The transmission-side rate conversion unit 1132 outputs the generated 50 G transport frame to the error correction encoding unit 1133. The error correction encoding unit 1133 appends an error correction code to the 50 G transport frame and transmits the transport frame having the error correction code appended thereto to the digital signal transmission processing unit 1134. It is to be noted that the error correction encoding unit 1133 may be omitted.

The digital signal transmission processing unit 1134 performs an optical digital coherent process for long-distance transport on the 50 G transport frame and transmits the processed 50 G transport frame to the line signal transceiving unit 1014. It is to be noted that the digital signal transmission processing unit 1134 may be omitted.

The line signal transceiving unit 1014 performs E/O conversion on data of the 50 G transport frame output from the digital signal processing unit 1013 and transmits the optical signal obtained by the conversion to a network as a line signal. The transmitted data is received by the line signal transceiving unit 1014 of the opposing transponder 1001.

The line signal transceiving unit 1014 of the opposing transponder 1001 performs O/E conversion on the received data and then outputs the electrical signal obtained by the conversion to the DSP (the digital signal processing unit 1013). The digital signal reception processing unit 1135 of the digital signal processing unit 1013 performs signal equalization on the received data and outputs a 50 G transport frame. The error correction decoding unit 1136 performs an error correction process on the 50 G transport frame output from the digital signal reception processing unit 1135. The error correction decoding unit 1136 transmits the 50 G transport frame having been subjected to the error correction process to the reception-side rate conversion unit 1137.

The reception-side rate conversion unit 1137 performs conversion that is opposite to the conversion in the transmission-side rate conversion unit 1132 to generate 100 G transport frames (OTU4: 112 G) from the 50 G transport frame (56 G) output by the error correction decoding unit 1136. Specifically, the reception-side rate conversion unit 1137 maps half of the TSs (TS1 to TS5 of the TS group A) of the received 50 G transport frame (56 G) to the 50 G TSs (e.g., TS1 to TS5) included at predetermined positions of the payload of the first 100 G transport frame. The reception-side rate conversion unit 1137 inserts a dummy signal such as FS into the remaining 50 G TSs (e.g., TS6 to TS10) in the payload of the 100 G transport frame.

Further, the reception-side rate conversion unit 1137 maps the remaining half of the TSs (TS1 to TS5 of the TS group B) of the received 50 G transport frame (56 G) to the 50 G TSs (e.g., TS1 to TS5) included at the predetermined positions in the payload of the second 100 G transport frame. The reception-side rate conversion unit 1137 inserts a dummy signal such as FS into the remaining 50 G TSs (e.g., TS6 to TS10) of the payload of the second 100 G transport frame, similarly to the first frame.

The reception-side rate conversion unit 1137 copies the OH of the 50 G transport frame (56 G) to the OH of the OTU4 of the first 100 G transport frame as it is. The reception-side rate conversion unit 1137 may copy the OH of the 50 G transport frame to the OH of the OTU4 of the second 100 G transport frame as it is or may insert other data.

By forming the 100 G transport frames in this manner, two 100 G transport frames (OTU4) are recovered from one 50 G transport frame.

The reception-side rate conversion unit 1137 transmits the recovered two 100 G transport frames (OTU4: 112 G) to the parallel signal transmitting unit 1138. The parallel signal transmitting unit 1138 transmits the 100 G transport frames (OTU4: 112 G) to the OTU4 framer (the framing processing unit 1012) concurrently via the OTL4.10 interface between the DSP and the OTU4 framer.

The parallel signal receiving unit 1125 of the OTU4 framer recovers the 100 G transport frame (OTU4: 112 G) and transmits the recovered 100 G transport frame to the overhead extracting unit 1126. The overhead extracting unit 1126 performs a process relating to an overhead, such as error monitoring, on the recovered 100 G transport frame (OTU4: 112 G) and then transmits the processed 100 G transport frame to the dummy signal removing unit 1127. The dummy signal removing unit 1127 removes the dummy signal from the 50 G TSs (e.g., TS6 to TS10) included at predetermined positions in the payload of the 100 G transport frame (OTU4: 112 G). The dummy signal removing unit 1127 transmits the 100 G transport frame (OTU4: 112 G) from which the dummy signal is removed to the demapping unit 1128. The demapping unit 1128 extracts a client signal from the 100 G transport frame (OTU4: 112 G). It is to be noted that rather than removing the dummy signal, the demapping unit 1128 may recover the client signal directly from the 100 G transport frame (OTU4: 112 G). The demapping unit 1128 transmits the extracted 10 GE×5 client signals to the client signal transceiving unit 1011. The client signal transceiving unit 1011 outputs the client signals received from the framer (the framing processing unit 1012).

In accordance with the present embodiment, when the transmission-side transponder 1001 creates the 50 G transport frame to be transferred between transponders 1001, only the OH information of one of the two OTU4 transport frames used for transfer between the framer and the DSP is used and the OH of the other transport frame is removed. Thus, the present embodiment is suitable to a case in which it is not necessary to transfer the OH of the other transport frame.

<Fifth Embodiment>

A difference between the fourth and fifth embodiments is how the OH of the second OTU4 frame is transferred. In the present embodiment, part of the OH of the second OTU4 frame is transferred via FS (a fixed pattern setting area) in the payload of the transport frame transferred between transponders. Hereinafter, the difference from the fourth embodiment will be described mainly.

The transponder of the present embodiment has a configuration similar to that of the transponder 1001 of the fourth embodiment illustrated in FIG. 22. In the present embodiment, it is assumed that the framing processing unit 1012 is included in the OTU4 framer and the digital signal processing unit 1013 is included in the digital coherent signal processing LSI (DSP). The present embodiment illustrates an example of transfer of signals when the bit rate of the client signals is 52 G, OTL4.10 that is compliant with OTU4 of 112 G is used as the interface between the OTU4 framer and the DSP, and the bit rate of the line signal is 56 G.

The processes until the parallel signal receiving unit 1131 of the DSP outputs the recovered OTU4 frame to the transmission-side rate conversion unit 1132 after the 10 GE×5 (approximately 52 G) client signals are input to the transponder 1001 are the same as those of the fourth embodiment.

That is, the client signal transceiving unit 1011 of the transponder 1001 transmits the client signals to the framing processing unit 1012. The mapping unit 1121 of the framing processing unit 1012 maps the client signals to the 100 G transport frame that is compliant with OTU4 since the interface (OTL4.10) between the OTU4 framer and the DSP is 112 G that is compliant with OTU4.

When mapping the client signals to the 100 G transport frame that is compliant with the OTU4, the mapping unit 1121 of the OTU4 framer maps the client signals to 50 G TSs (e.g., TS1 to TS5 in the 17th to 3816th columns of the 100 G transport frame of FIG. 23A) at predetermined positions in the payload. The dummy signal insertion unit 1122 sets a dummy signal such as FS to the remaining 50 G TSs (e.g., TS6 to TS10 in the 17th to 3816th columns illustrated in FIG. 23A) of the 100 G transport frame and outputs the 100 G transport frame in which the dummy signal is set to the overhead inserting unit 1123.

The overhead inserting unit 1123 inserts an OH into the data output from the dummy signal insertion unit 1122 as the transport frame that is compliant with OTU4 and transmits the data having the OH inserted therein to the parallel signal transmitting unit 1124. The parallel signal transmitting unit 1124 transmits transport frames output from the overhead inserting unit 1123 concurrently to the digital signal processing unit 1013 of the DSP via the OTL4.10 interface. The parallel signal receiving unit 1131 of the DSP recovers the OTU4 transport frame received from the OTU4 framer (the framing processing unit 1012) and transmits the recovered transport frame to the transmission-side rate conversion unit 1132.

Since the bit rate of the line signal is 50 G (56 G), it is not possible to perform transfer in the OTU4 format. Thus, the transmission-side rate conversion unit 1132 removes the dummy signal such as FS inserted by the OTU4 framer (the framing processing unit 1012) from the OTU4 transport frame recovered by the parallel signal receiving unit 1131 to generate a 50 G transport frame (56 G).

Figure 26:
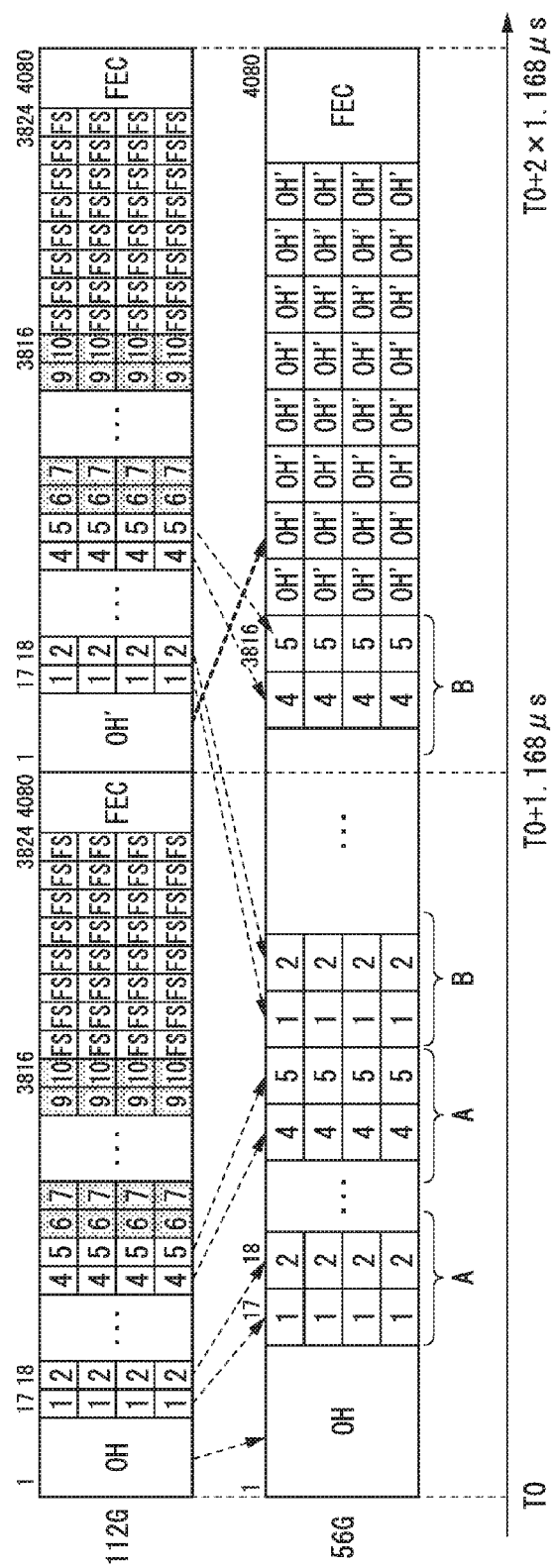
FIG. 26 is a diagram illustrating a transport frame conversion process executed by a transmission-side rate conversion unit in accordance with the fifth embodiment.

FIG. 26 is a diagram illustrating a process of the transmission-side rate conversion unit 1132 converting the 100 G transport frames (OTU4: 112 G) into the 50 G transport frame. Similarly to the fourth embodiment illustrated in FIGS. 24 and 25, the transmission-side rate conversion unit 1132 extracts the client signals from the 50 G TSs at predetermined positions (TS1 to TS5) of the payload in the first OTU4 100 G transport frame (112 G). The transmission-side rate conversion unit 1132 maps the extracted client signals to half of the TSs (TS1 to TS5 of the TS group A) at the predetermined positions of the payload in the 50 G transport frame (56 G).

Further, the transmission-side rate conversion unit 1132 extracts the 50 G TSs set at the predetermined positions (TS1 to TS5) of the payload in the second OTU4 100 G transport frame and extracts the client signals from the extracted TSs. The transmission-side rate conversion unit 1132 maps the extracted client signals to the remaining half of the TSs (TS1 to TS5 of the TS group B) of the payload in the 50 G transport frame (56 G).

The transmission-side rate conversion unit 1132 sets the OH of the first OTU4 frame in the OH of the 50 G transport frame (56 G). Moreover, the transmission-side rate conversion unit 1132 inserts part of the OH', which is the OH of the second OTU4 frame, into 4 rows by 8 columns of the 3817th to 3824th columns of the 50 G transport frame.

FIG. 27 is a diagram illustrating fields of an OH. The OH of the OTU4 has the field configuration of 4 rows by 16 columns as illustrated in the drawing. Thus, the transmission-side rate conversion unit 1132 inserts arbitrary data of 4 rows by 8 columns in the overhead (OH') of the OTU4 into the 3817th to 3824th columns of the 50 G transport frame. The inserted data of 4 rows by 8 columns may be programmably (arbitrarily) selected from the OH illustrated in the drawing.

The processes until the error correction decoding unit 1136 of the opposing transponder 1001 outputs the 50 G transport frame having been subjected to the error correction process to the reception-side rate conversion unit 1137 after the transmission-side rate conversion unit 1132 outputs the 50 G transport frame are the same as those of the fourth embodiment.

The transmission-side rate conversion unit 1132 outputs the generated 50 G transport frame to the error correction encoding unit 1133. The error correction encoding unit 1133 appends an error correction code to the 50 G transport frame and transmits the 50 G transport frame having the error correction code appended thereto to the digital signal transmission processing unit 1134. It is to be noted that the error correction encoding unit 1133 may be omitted.

The digital signal transmission processing unit 1134 performs an optical digital coherent process for long-distance transport on the 50 G transport frame and transmits the processed 50 G transport frame to the line signal transceiving unit 1014. It is to be noted that the digital signal transmission processing unit 1134 may be omitted.

The line signal transceiving unit 1014 performs E/O conversion on data of the 50 G transport frame output from the digital signal processing unit 1013 and transmits the optical signal obtained by the conversion to a network as a line signal. The transmitted data is received by the line signal transceiving unit 1014 of the opposing transponder 1001.

The line signal transceiving unit 1014 of the opposing transponder 1001 performs O/E conversion on the received data and then outputs the electrical signal obtained by the conversion to the DSP (the digital signal processing unit 1013). The digital signal reception processing unit 1135 of the digital signal processing unit 1013 performs signal equalization on the received data and outputs a 50 G transport frame. The error correction decoding unit 1136 performs an error correction process on the 50 G transport frame output from the digital signal reception processing unit 1135. The error correction decoding unit 1136 transmits the 50 G transport frame having been subjected to the error correction process to the reception-side rate conversion unit 1137.

The reception-side rate conversion unit 1137 performs conversion that is opposite to the conversion in the transmission-side rate conversion unit 1132 to generate 100 G transport frames (OTU4: 112 G) from a 50 G transport frame (56 G) output by the error correction decoding unit 1136. Specifically, the reception-side rate conversion unit 1137 maps half of the TSs (TS1 to TS5 of the TS group A) of the received 50 G transport frame (56 G) to the 50 G TSs (e.g., TS1 to TS5) included at predetermined positions of the payload in the first 100 G transport frame. The reception-side rate conversion unit 1137 inserts a dummy signal such as FS into the remaining 50 G TSs (e.g., TS6 to TS10) in the payload of the 100 G transport frame.

Further, the reception-side rate conversion unit 1137 maps the remaining half of the TSs (TS1 to TS5 of the TS group B) of the received 50 G transport frame (56 G) to the 50 G TSs (e.g., TS1 to TS5) included at the predetermined positions of the payload in the second 100 G transport frame. The reception-side rate conversion unit 1137 inserts a dummy signal such as FS into the remaining 50 G TSs (e.g., TS6 to TS10) into the payload of the second 100 G transport frame, similarly to the first frame.

The reception-side rate conversion unit 1137 copies the OH of the 50 G transport frame (56 G) to the OH of the OTU4 in the first 100 G transport frame as it is. The reception-side rate conversion unit 1137 sets the OH of the OTU4 recovered from the data inserted into the 3817th to 3824th columns of the 50 G transport frame in the OH of the OTU4 in the second 100 G transport frame. With respect to data of the OH lacking in information obtained from the 3817th to 3824th columns of the 50 G transport frame, the reception-side rate conversion unit 1137 may copy the corresponding data of the OH of the first OTU4 frame as it is or may insert other data.

By forming the 100 G transport frames in this manner, two 100 G transport frames (OTU4) are recovered from one 50 G transport frame.

The processes after the reception-side rate conversion unit 1137 transmits the recovered two 100 G transport frames (OTU4: 112 G) to the parallel signal transmitting unit 1138 are the same as those of the fourth embodiment.

That is, the parallel signal transmitting unit 1138 transmits the recovered 100 G transport frames (OTU4: 112 G) to the OTU4 framer (the framing processing unit 1012) concurrently via the OTL4.10 interface between the DSP and the OTU4 framer. The parallel signal receiving unit 1125 of the OTU4 framer recovers the 100 G transport frame (OTU4: 112 G). The overhead extracting unit 1126 performs a process relating to an overhead, such as error monitoring, on the recovered 100 G transport frame (OTU4: 112 G). The dummy signal removing unit 1127 removes the dummy signal from the 50 G TSs (e.g., TS6 to TS10) included at predetermined positions in the payload of the 100 G transport frame (OTU4: 112 G) having been subjected to the process relating to the overhead. The demapping unit 1128 extracts a client signals from the 100 G transport frame (OTU4: 112 G) from which the dummy signal is removed. It is to be noted that rather than removing the dummy signal, the demapping unit 1128 may directly recover the client signals from the 100 G transport frame (OTU4: 112 G). The demapping unit 1128 transmits the extracted 10 GE×5 client signals to the client signal transceiving unit 1011. The client signal transceiving unit 1011 outputs the client signals received from the framer (the framing processing unit 1012).

In accordance with the present embodiment, it is possible to transfer, using the FS, part of one of the OHs of OTU4 which was not used when the transmission-side transponder 1001 creates the 50 G transport frame to be transferred between transponders 1001. Thus, the present embodiment is suitable to a case in which it is only necessary for one of the OHs to be transferred for part of the OH and the FS is not used for other purposes.

<Sixth Embodiment>

A difference between the sixth and fourth embodiments is how the OH of the second OTU4 frame is transferred. In the present embodiment, part of the OH of the second OTU4 frame is transferred via TSs (data setting area) in the payload of the transport frame transferred between transponders. Hereinafter, the difference from the fourth embodiment will be described mainly.

The transponder of the present embodiment has a configuration similar to that of the transponder 1001 of the fourth embodiment illustrated in FIG. 22. In the present embodiment, it is assumed that the framing processing unit 1012 is included in the OTU4 framer and the digital signal processing unit 1013 is included in the digital coherent signal processing LSI (DSP). The present embodiment illustrates an example of transfer when the bit rate of the client signal is 41 G, an OTL4.10 interface that is compliant with OTU4 of 112 G is applied to the interface between the OTU4 framer and the DSP, and the bit rate of the line signal is 56 G.

It is assumed that 10 GE×4 (approximately 41 G) clients signal are input to the transponder 1001. The client signal transceiving unit 1011 of the transponder 1001 transmits the client signals to the framing processing unit 1012. The mapping unit 1121 of the framing processing unit 1012 maps the client signals to a transport frame corresponding to OTU4 since the interface (OTL4.10) between the OTU4 framer and the DSP is 112 G that is compliant with OTU4.

When mapping the client signal to the 100 G transport frame that is compliant with the OTU4, the mapping unit 1121 of the OTU4 framer maps the client signals to 40 G TSs (e.g., TS1 to TS4 in the 17th to 3816th columns of the 100 G transport frame of FIG. 23A) at predetermined positions in the payload. The dummy signal insertion unit 1122 sets a dummy signal such as FS in the remaining 60 G TSs (e.g., TS5 to TS10 in the 17th to 3816th columns illustrated in FIG. 23A) of the 100 G transport frame.

By setting the 100 G transport frame in this manner, it is possible to generate a frame with which 40 G data is transmitted while taking the format of the 100 G transport frame (OTU4) which can be transferred via the 100 G OTL4.10 interface.

The overhead inserting unit 1123 inserts an OH into the data output by the transport frame that is compliant with the OTU4 from the dummy signal insertion unit 1122 and transmits the data having the OH inserted therein to the parallel signal transmitting unit 1124. The parallel signal transmitting unit 1124 transmits transport frames output from the overhead inserting unit 1123 concurrently to the digital signal processing unit 1013 of the DSP via the OTL4.10 interface. The parallel signal receiving unit 1131 of the DSP recovers the OTU4 transport frame received from the OTU4 framer (the framing processing unit 1012) and transmits the recovered transport frame to the transmission-side rate conversion unit 1132.

Since the bit rate of the line signal is 50 G (56 G), it is not possible to perform transfer in the OTU4 format. Thus, the transmission-side rate conversion unit 1132 removes the dummy signal such as FS inserted by the OTU4 framer (the framing processing unit 1012) from the OTU4 transport frame recovered by the parallel signal receiving unit 1131 to generate a 50 G transport frame (56 G).

Figure 28:
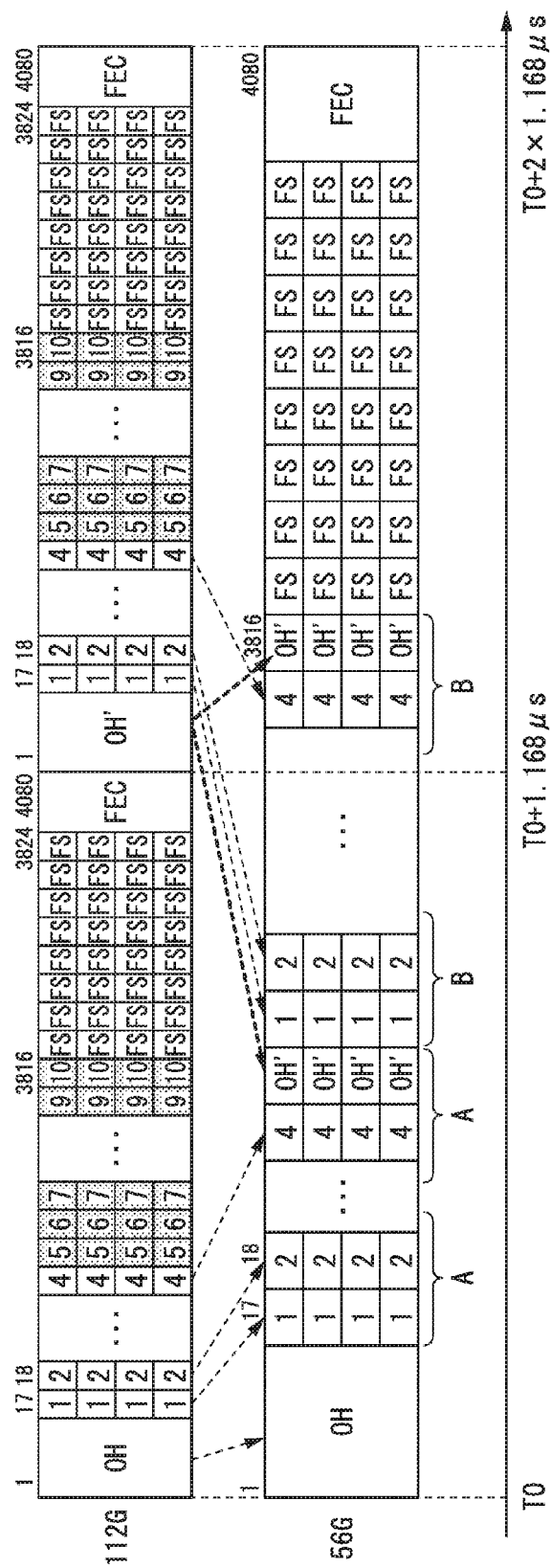
FIG. 28 is a diagram illustrating a transport frame conversion process executed by a transmission-side rate conversion unit in accordance with the sixth embodiment.

FIG. 28 is a diagram illustrating a process of the transmission-side rate conversion unit 1132 converting the 100 G transport frames (OTU4: 112 G) into the 50 G transport frame. The transmission-side rate conversion unit 1132 extracts the TSs in which the client signals are included from the 40 G TSs (TS1 to TS4) at predetermined positions of the payload in the first OTU4 100 G transport frame (112 G). The transmission-side rate conversion unit 1132 maps the extracted TSs in which the client signals are included to part of TSs (TS1 to TS4 of the TS group A) at the predetermined positions of the payload of the 50 G transport frame (56 G). The reason why half of the TSs of the TSs of the 50 G transport frame are used as the TSs to which the 40 G TSs are mapped is to change the 100 G transport frames (112 G) to the 50 G transport frame (56 G).

Further, the transmission-side rate conversion unit 1132 extracts the 40 G TSs set at the predetermined positions (TS1 to TS4) of the payload in the second OTU4 100 G transport frame and extracts the client signals from the extracted TSs. It is to be noted that rather than extracting the client signals from the TSs, the TSs may be mapped to the TSs of the 50 G transport frame as they are. The transmission-side rate conversion unit 1132 maps the extracted client signals to TSs (TS1 to TS4 of the TS group B) of the payload of the 50 G transport frame (56 G).

The transmission-side rate conversion unit 1132 sets the OH of the first OTU4 frame in the OH of the 50 G transport frame (56 G). Moreover, the transmission-side rate conversion unit 1132 inserts the OH', which is the OH of the second OTU4 frame, into the 10 G TSs of the payload of the 50 G transport frame (56 G) to which the client signal is not mapped. For example, the transmission-side rate conversion unit 1132 inserts the data of the OH of the second OTU4 frame into the data (32 bytes) corresponding to 4 rows by 8 columns from the start of the TSs (TS5 of the TS group A and TS5 of the TS group B of the 50 G transport frame) of the (16+5×n)th columns (n=1, 2, . . . ) in the range of 17th to 3816th columns and transfers part of the OH'. Moreover, the transmission-side rate conversion unit 1132 may insert the data of the OH' of the data (64 bytes) corresponding to 4 rows by 16 columns from the start of the TSs of the (16+5×n)th columns (n=1, 2, . . . ) and transfers the entire OH'.

By mapping in this manner, the transmission-side rate conversion unit 1132 generates the 50 G transport frame (56 G) from the 100 G transport frames (OTU4: 112 G).

The processes until the error correction decoding unit 1136 of the opposing transponder 1001 outputs the 50 G transport frame having been subjected to the error correction process to the reception-side rate conversion unit 1137 after the transmission-side rate conversion unit 1132 outputs the 50 G transport frame are the same as those of the fourth embodiment.

The transmission-side rate conversion unit 1132 outputs the generated 50 G transport frame to the error correction encoding unit 1133. The error correction encoding unit 1133 appends an error correction code to the 50 G transport frame and transmits the 50 G transport frame having the error correction code appended thereto to the digital signal transmission processing unit 1134. It is to be noted that the error correction encoding unit 1133 may be omitted.

The digital signal transmission processing unit 1134 performs an optical digital coherent process for long-distance transport on the 50 G transport frame and transmits the processed 50 G transport frame to the line signal transceiving unit 1014. It is to be noted that the digital signal transmission processing unit 1134 may be omitted.

The line signal transceiving unit 1014 performs E/O conversion on the 50 G transport frame data output from the digital signal processing unit 1013 and transmits the optical signal obtained by the conversion to a network as a line signal. The transmitted data is received by the line signal transceiving unit 1014 of the opposing transponder 1001.

The line signal transceiving unit 1014 of the opposing transponder 1001 performs O/E conversion on the received data and then outputs the electrical signal obtained by the conversion to the DSP (the digital signal processing unit 1013). The digital signal reception processing unit 1135 of the digital signal processing unit 1013 performs signal equalization on the received data and outputs a 50 G transport frame. The error correction decoding unit 1136 performs an error correction process on the 50 G transport frame output from the digital signal reception processing unit 1135. The error correction decoding unit 1136 transmits the 50 G transport frame having been subjected to the error correction process to the reception-side rate conversion unit 1137.

The reception-side rate conversion unit 1137 generates 100 G transport frames (OTU4: 112 G) from the 50 G transport frame (56 G) output by the error correction decoding unit 1136. Specifically, the reception-side rate conversion unit 1137 maps half of the TSs (TS1 to TS5 of the TS group A) of the received 50 G transport frame (56 G) to the 50 G TSs (e.g., TS1 to TS5) included at predetermined positions of the payload of the first 100 G transport frame. The reception-side rate conversion unit 1137 inserts a dummy signal such as FS into the remaining 50 G TSs (e.g., TS6 to TS10) of the payload of the 100 G transport frame.

Further, the reception-side rate conversion unit 1137 maps the remaining half of the TSs (TS1 to TS5 of the TS group B) of the received 50 G transport frame (56 G) to the 50 G TSs (e.g., TS1 to TS5) included at the predetermined positions of the payload of the second 100 G transport frame. The reception-side rate conversion unit 1137 inserts a dummy signal such as FS into the remaining 50 G TSs (e.g., TS6 to TS10) of the payload of the second 100 G transport frame, similarly to the first frame.

The reception-side rate conversion unit 1137 copies the OH of the 50 G transport frame (56 G) to the OH of the OTU4 of the first 100 G transport frame as it is.

When the OH' data corresponding to 4 rows by 8 columns was transferred via the TSs, the reception-side rate conversion unit 1137 reads the OH' data from the TSs of the 50 G transport frame (56 G) and recovers the OH to be set in the OTU4 of the second frame. The reception-side rate conversion unit 1137 inserts the recovered OH data of the OTU4 into the second 100 G transport frame. With respect to the data of the OH lacking in the information obtained from the TSs of the 50 G transport frame (56 G), the reception-side rate conversion unit 1137 may copy the corresponding data of the OH of the first OTU4 frame as it is or may insert other data.

It is to be noted that when the OH' data of 4 rows by 16 columns was transferred via the TSs, the reception-side rate conversion unit 1137 inserts the OH' data of the OTU4 recovered from the TSs of the 50 G transport frame as the OH of the second OTU4 frame.

By forming the 100 G transport frames in this manner, two 100 G transport frames (OTU4) are recovered from one 50 G transport frame.

The reception-side rate conversion unit 1137 transmits the recovered two 100 G transport frames (OTU4: 112 G) to the parallel signal transmitting unit 1138. The parallel signal transmitting unit 1138 transmits the recovered 100 G transport frames (OTU4: 112 G) to the OTU4 framer (the framing processing unit 1012) concurrently via the OTL4.10 interface between the DSP and the OTU4 framer.

The parallel signal receiving unit 1125 of the OTU4 framer recovers the 100 G transport frame (OTU4: 112 G). The overhead extracting unit 1126 performs a process relating to an overhead such as error monitoring on the recovered 100 G transport frame (OTU4: 112 G). The dummy signal removing unit 1127 removes the dummy signal from the 60 G TSs (e.g., TS5 to TS10 illustrated in FIG. 28) included at predetermined positions in the payload of the 100 G transport frame (OTU4: 112 G) having been subjected to the process relating to an overhead. The demapping unit 1128 extracts client signals (10 GE×4) from the TS1 to TS4 the 100 G transport frames (OTU4: 112 G) from which the dummy signal is removed. It is to be noted that rather than removing the dummy signal, the demapping unit 1128 may directly recover the client signals from the 100 G transport frame (OTU4: 112 G). The demapping unit 1128 transmits the extracted client signals (10 GE×4) to the client signal transceiving unit 1011. The client signal transceiving unit 1011 outputs the client signals received from the framer (the framing processing unit 1012).

In accordance with the present embodiment, it is possible to transfer part of or the entirety of one of the OHs of OTU4 which was not used when the transmission-side transponder 1001 creates the 50 G transport frame to be transferred between transponders 1001 using the TSs in the payload. Thus, the present embodiment is suitable to a case in which it is only necessary for one of the OHs to be transferred for part of the OH and a vacant area is present in the TSs.

<Seventh Embodiment>

A difference between the seventh and fourth embodiments is how the OH of the second OTU4 frame is transferred. In the present embodiment, part of the OH of the second OTU4 frame is transmitted in place of the stuff of GMP in the payload of the transport frame transmitted between transponders. Hereinafter, the difference from the fourth embodiment will be described mainly.

The transponder of the present embodiment has a configuration similar to that of the transponder 1001 of the fourth embodiment illustrated in FIG. 22. In the present embodiment, it is assumed that the framing processing unit 1012 is included in the OTU4 framer and the digital signal processing unit 1013 is included in the digital coherent signal processing LSI (DSP). The present embodiment illustrates an example of transfer of signals when the bit rate of the client signal is 52 G, an OTL4.10 interface that is compliant with OTU4 of 112 G is used as the interface between the OTU4 framer and the DSP, and the bit rate of the line signal is 56 G.

The processes until the parallel signal receiving unit 1131 of the DSP outputs the recovered OTU4 frame to the transmission-side rate conversion unit 1132 after 10 GE×5 (approximately 52 G) client signals are input to the transponder 1001 are the same as those of the fourth embodiment.

That is, the client signal transceiving unit 1011 of the transponder 1001 transmits the client signals to the framing processing unit 1012. The mapping unit 1121 of the framing processing unit 1012 maps the client signals to a 100 G transport frame that is compliant with OTU4, since the interface (OTL4.10) between the OTU4 framer and the DSP is 112 G that is compliant with OTU4.

When mapping the client signals to the 100 G transport frame that is compliant with the OTU4, the mapping unit 1121 of the OTU4 framer maps the client signals to 50 G TSs (e.g., TS1 to TS5 in the 17th to 3816th columns of the 100 G transport frame of FIG. 23A) at predetermined positions in the payload. The dummy signal insertion unit 1122 sets a dummy signal such as FS in the remaining 50 G TSs (e.g., TS6 to TS10 in the 17th to 3816th columns illustrated in FIG. 23A) of the 100 G transport frame and outputs the 100 G transport frame in which the dummy signal is set to the overhead inserting unit 1123.

The overhead inserting unit 1123 inserts an OH into the data output by the transport frame that is compliant with the OTU4 from the dummy signal insertion unit 1122 and transmits the data having the OH inserted therein to the parallel signal transmitting unit 1124. The parallel signal transmitting unit 1124 transmits transport frames output from the overhead inserting unit 1123 concurrently to the digital signal processing unit 1013 of the DSP via the OTL4.10 interface. The parallel signal receiving unit 1131 of the DSP recovers the OTU4 transport frame received from the OTU4 framer (the framing processing unit 1012) and transmits the recovered transport frame to the transmission-side rate conversion unit 1132.

Since the bit rate of the line signal is 50 G (56 G), it is not possible to perform transfer in the OTU4 format. Thus, the transmission-side rate conversion unit 1132 removes the dummy signal such as FS inserted by the OTU4 framer (the framing processing unit 1012) from the OTU4 transport frame recovered by the parallel signal receiving unit 1131 to generate a 50 G transport frame (56 G).

Figure 29:
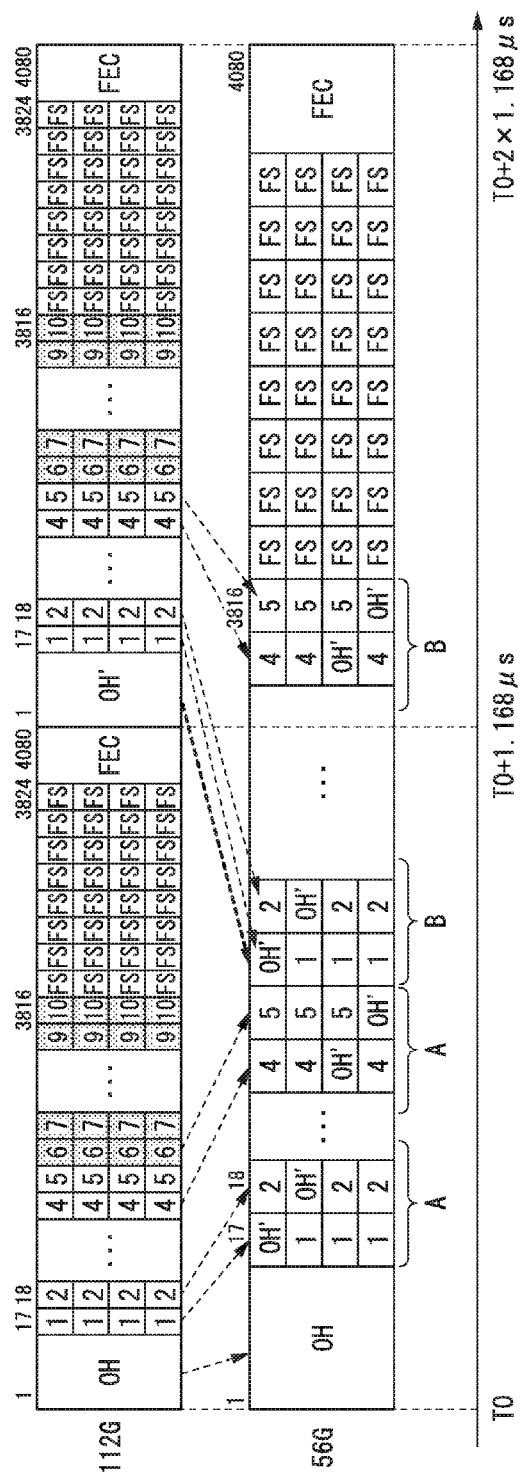
FIG. 29 is a diagram illustrating a transport frame conversion process executed by a transmission-side rate conversion unit in accordance with the seventh embodiment.

FIG. 29 is a diagram illustrating a process of the transmission-side rate conversion unit 1132 converting 100 G transport frames (OTU4: 112 G) into a 50 G transport frame. Similarly to the fourth embodiment illustrated in FIGS. 24 and 25, the transmission-side rate conversion unit 1132 extracts the client signals from the 50 G TSs at predetermined positions (TS1 to TS5) of the payload in the first OTU4 100 G transport frame (112 G). The transmission-side rate conversion unit 1132 maps the extracted client signals to half of the TSs (TS1 to TS5 of the TS group A) at the predetermined positions of the payload of the 50 G transport frame (56 G).

Further, the transmission-side rate conversion unit 1132 extracts the 50 G TSs set at the predetermined positions (TS1 to TS5) of the payload in the second OTU4 100 G transport frame and extracts the client signals from the extracted TSs. The transmission-side rate conversion unit 1132 maps the extracted client signals to the remaining half of the TSs (TS1 to TS5 of the TS group B) of the payload in the 50 G transport frame (56 G).

The transmission-side rate conversion unit 1132 sets the OH of the first OTU4 frame in the OH of the 50 G transport frame (56 G). Moreover, the transmission-side rate conversion unit 1132 inserts the OH', which is the OH of the second OTU4 frame, into areas of the TSs of the 50 G transport frame (56 G) in which the stuff of GMP is inserted.

Figure 30:
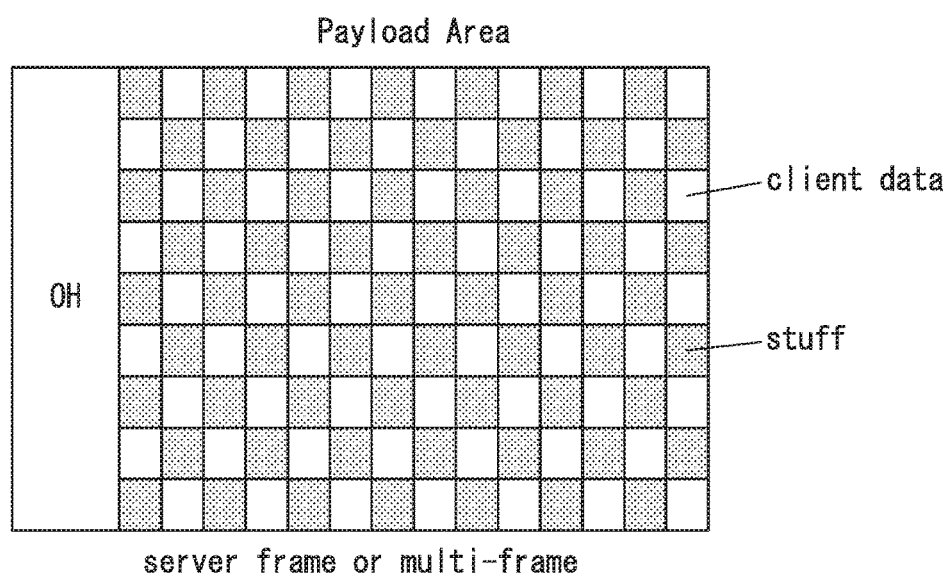
FIG. 30 is a diagram illustrating the setting of the stuff of a general mapping procedure (GMP).

FIG. 30 is a diagram illustrating the setting of the stuff of GMP. As illustrated in the drawing, client data and stuff are set in a payload area. The area in which the stuff of GMP is inserted is the same as the area described in ITU-T Recommendation G.709 Annex D. In GMP, when the client data is mapped to a payload, stuff blocks are inserted to adjust the rate. The transmission-side rate conversion unit 1132 inserts data of OH', which is the OH of the second OTU4 frame, to the stuff blocks of the payload.

The processes until the error correction decoding unit 1136 of the opposing transponder 1001 outputs the 50 G transport frame having been subjected to the error correction process to the reception-side rate conversion unit 1137 after the transmission-side rate conversion unit 1132 outputs the 50 G transport frame are the same as those of the fourth embodiment.

The transmission-side rate conversion unit 1132 outputs the generated 50 G transport frame to the error correction encoding unit 1133. The error correction encoding unit 1133 appends an error correction code to the 50 G transport frame and transmits the transport frame having the error correction code appended thereto to the digital signal transmission processing unit 1134. It is to be noted that the error correction encoding unit 1133 may be omitted.

The digital signal transmission processing unit 1134 performs an optical digital coherent process for long-distance transport on the 50 G transport frame and transmits the processed 50 G transport frame to the line signal transceiving unit 1014. It is to be noted that the digital signal transmission processing unit 1134 may be omitted.

The line signal transceiving unit 1014 performs E/O conversion on data of the 50 G transport frame output from the digital signal processing unit 1013 and transmits the optical signal obtained by the conversion to a network as a line signal. The transmitted data is received by the line signal transceiving unit 1014 of the opposing transponder 1001.

The line signal transceiving unit 1014 of the opposing transponder 1001 performs O/E conversion on the received data and then outputs the electrical signal obtained by the conversion to the DSP (the digital signal processing unit 1013). The digital signal reception processing unit 1135 of the digital signal processing unit 1013 performs signal equalization on the received data and outputs a 50 G transport frame. The error correction decoding unit 1136 performs an error correction process on the 50 G transport frame output from the digital signal reception processing unit 1135. The error correction decoding unit 1136 transmits the 50 G transport frame having been subjected to the error correction process to the reception-side rate conversion unit 1137.

The reception-side rate conversion unit 1137 performs conversion that is opposite to the conversion in the transmission-side rate conversion unit 1132 to generate 100 G transport frames (OTU4: 112 G) from the 50 G transport frame (56 G) output by the error correction decoding unit 1136. Specifically, the reception-side rate conversion unit 1137 maps half of the TSs (TS1 to TS5 of the TS group A) of the received 50 G transport frame (56 G) to the 50 G TSs (e.g., TS1 to TS5) included at predetermined positions of the payload of the first 100 G transport frame. The reception-side rate conversion unit 1137 inserts a dummy signal such as FS into the remaining 50 G TSs (e.g., TS6 to TS10) of the payload of the 100 G transport frame.

Further, the reception-side rate conversion unit 1137 maps the remaining half of the TSs (TS1 to TS5 of the TS group B) of the received 50 G transport frame (56 G) to the 50 G TSs (e.g., TS1 to TS5) included at the predetermined positions of the payload of the second 100 G transport frame. The reception-side rate conversion unit 1137 inserts a dummy signal such as FS into the remaining 50 G TSs (e.g., TS6 to TS10) of the payload of the second 100 G transport frame, similarly to the first frame.

The reception-side rate conversion unit 1137 copies the OH of the 50 G transport frame (56 G) to the OH of the OTU4 of the first 100 G transport frame as it is. The reception-side rate conversion unit 1137 obtains the positions of the TSs in the 50 G transport frame into which the stuff blocks of GMP are inserted and recovers the OH to be set in the second OTU4 frame from the data at those positions. The reception-side rate conversion unit 1137 inserts the recovered OH of the OTU4 into the second 100 G transport frame. With respect to the data of the OH lacking in the information obtained from the stuff blocks of the 50 G transport frame (56 G), the reception-side rate conversion unit 1137 may copy the corresponding data of the OH of the first OTU4 frame as it is or may insert other data.

By forming the 100 G transport frame in this manner, two 100 G transport frames (OTU4) are recovered from one 50 G transport frame.

The processes after the reception-side rate conversion unit 1137 transmits the recovered two 100 G transport frames (OTU4: 112 G) to the parallel signal transmitting unit 1138 are the same as those of the fourth embodiment.

That is, the parallel signal transmitting unit 1138 transmits the recovered 100 G transport frame (OTU4: 112 G) to the OTU4 framer (the framing processing unit 1012) concurrently via the OTL4.10 interface between the DSP and the OTU4 framer. The parallel signal receiving unit 1125 of the OTU4 framer recovers the 100 G transport frame (OTU4: 112 G). The overhead extracting unit 1126 performs a process relating to an overhead such as error monitoring on the recovered 100 G transport frame (OTU4: 112 G). The dummy signal removing unit 1127 removes the dummy signal from the 50 G TSs (e.g., TS6 to TS10) included at predetermined positions in the payload of the 100 G transport frame (OTU4: 112 G) having been subjected to the process relating to an overhead. The demapping unit 1128 extracts client signals from the 100 G transport frame (OTU4: 112 G) from which the dummy signal is removed. It is to be noted that rather than removing the dummy signal, the demapping unit 1128 may directly recover the client signals from the 100 G transport frame (OTU4: 112 G). The demapping unit 1128 transmits the extracted 10 GE×5 client signals to the client signal transceiving unit 1011. The client signal transceiving unit 1011 outputs the client signals received from the framer (the framing processing unit 1012).

In accordance with the present embodiment, it is possible to transfer part of one of the OHs of OTU4 which was not used when the transmission-side transponder 1001 creates the 50 G transport frame to be transferred between transponders 1001 using the stuff of GMP. Thus, the present embodiment is suitable to a case in which it is only necessary for one of the OHs to be transferred for part of the OH and the stuff of GMP is not used for other purposes.

<Eighth Embodiment>

A difference between the eighth and fourth embodiments is how the OH of the second OTU4 frame is transferred. In the present embodiment, the OH of the second OTU4 frame is transferred from a transmission-side transponder to a reception-side transponder via an out-of-band. Hereinafter, the difference from the fourth embodiment will be described mainly.

Figure 31:
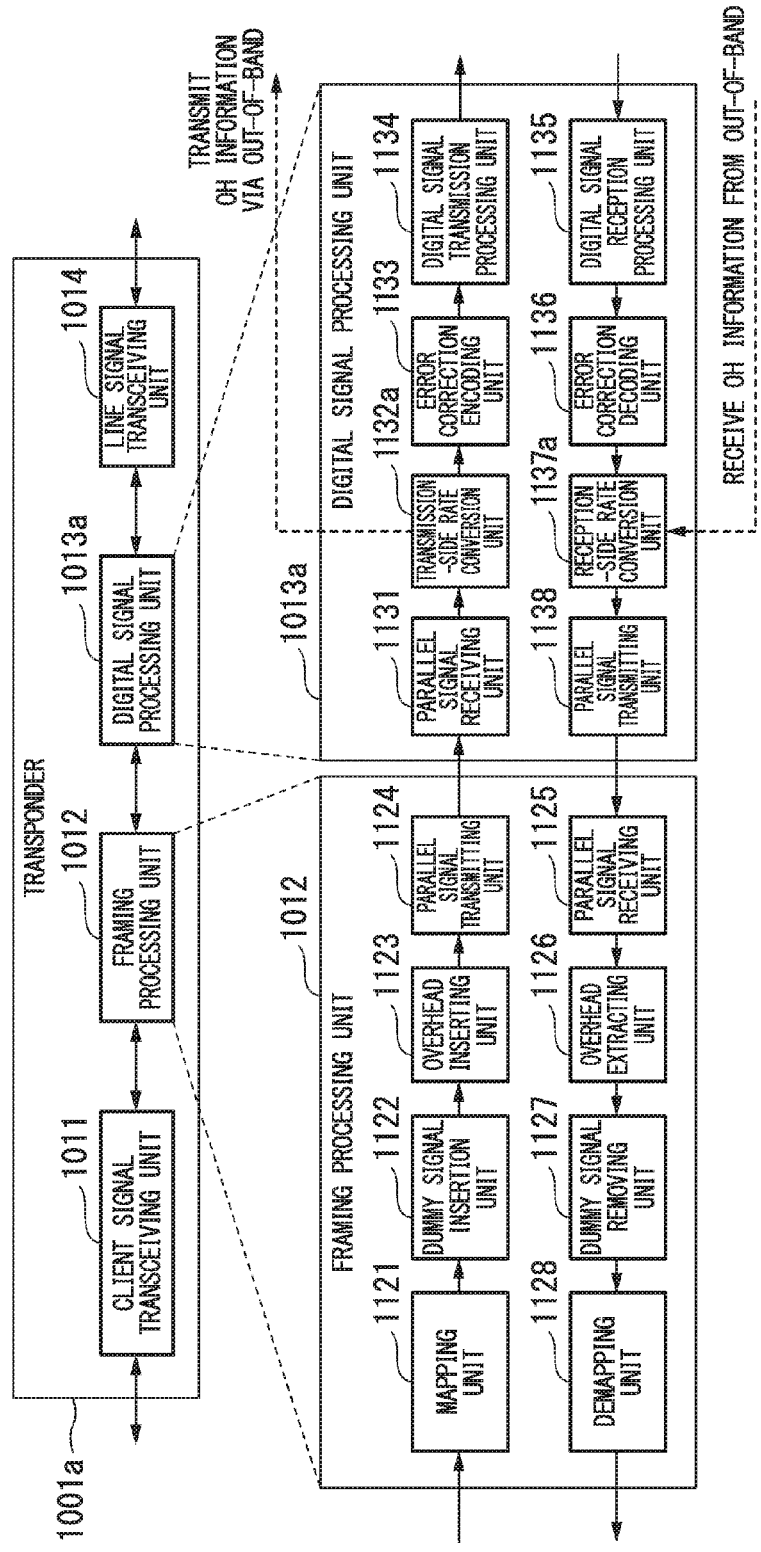
FIG. 31 is a functional block diagram illustrating a configuration of a transponder in accordance with the eighth embodiment.

FIG. 31 is a functional block diagram illustrating a configuration of a transponder 1001a in accordance with the eighth embodiment. In the drawing, the same portions as those of the transponder 1001 of the fourth embodiment illustrated in FIG. 22 will be denoted by the same reference numerals, and the description thereof will be omitted. As illustrated in the drawing, the transponder 1001a is configured to include a client signal transceiving unit 1011, a framing processing unit 1012, a digital signal processing unit 1013a, and a line signal transceiving unit 1014. In the present embodiment, it is assumed that the framing processing unit 1012 is included in the OTU4 framer and the digital signal processing unit 1013a is included in the digital coherent signal processing LSI (DSP).

The digital signal processing unit 1013a is configured to include a parallel signal receiving unit 1131, a transmission-side rate conversion unit 1132a, an error correction encoding unit 1133, a digital signal transmission processing unit 1134, a digital signal reception processing unit 1135, an error correction decoding unit 1136, a reception-side rate conversion unit 1137a, and a parallel signal transmitting unit 1138.

The transmission-side rate conversion unit 1132a forms a transport frame in accordance with a line-side rate from the transport frame recovered by the parallel signal receiving unit 1131 and outputs the formed transport frame to the error correction encoding unit 1133. The transmission-side rate conversion unit 1132a transmits the overhead of the second transport frame recovered by the parallel signal receiving unit 1131 to the reception-side transponder 1001a via an out-of-band such as an optical supervisory channel (OSC).

The reception-side rate conversion unit 1137a forms a transport frame that can be transferred to the framing processing unit 1012 from the transport frame having been subjected to the error correction encoding by the error correction decoding unit 1136 and outputs the formed transport frame to the parallel signal transmitting unit 1138. In this case, the reception-side rate conversion unit 1137a sets the OH received from the transmission-side transponder 1001a via the out-of-band such as the OSC in the second transport frame.

The present embodiment illustrates an example of transfer when the bit rate of the client signal is 52 G, an OTL4.10 interface that is compliant with OTU4 of 112 G is used as the interface between the OTU4 framer and the DSP, and the bit rate of the line signal is 56 G.

The processes until the parallel signal receiving unit 1131 of the DSP outputs the recovered OTU4 frame to the transmission-side rate conversion unit 1132*a* after the 10 GE×5 (approximately 52 G) client signals are input to the transponder 1001*a* are the same as those of the fourth embodiment.

That is, the client signal transceiving unit 1011 of the transponder 1001*a* transmits the client signals to the framing processing unit 1012. The mapping unit 1121 of the framing processing unit 1012 maps the client signals to the transport frame that is compliant with OTU4 since the interface (OTL4.10 ) between the OTU4 framer and the DSP is 112 G that is compliant with OTU4.

When mapping the client signals to the 100 G transport frame that is compliant with the OTU4, the mapping unit 1121 of the OTU4 framer maps the client signals to 50 G TSs (e.g., TS1 to TS5 in the 17th to 3816th columns of the 100 G transport frame of FIG. 23A) at predetermined positions in the payload. The dummy signal insertion unit 1122 sets a dummy signal such as FS in the remaining 50 G TSs (e.g., TS6 to TS10 in the 17th to 3816th columns illustrated in FIG. 23A) of the 100 G transport frame.

The overhead inserting unit 1123 inserts an OH into the data output by the transport frame that is compliant with the OTU4 from the dummy signal insertion unit 1122 and transmits the data having the OH inserted therein to the parallel signal transmitting unit 1124. The parallel signal transmitting unit 1124 transmits transport frames output from the overhead inserting unit 1123 concurrently to the digital signal processing unit 1013*a* of the DSP via the OTL4.10 interface. The parallel signal receiving unit 1131 of the DSP recovers the OTU4 transport frame received from the OTU4 framer (the framing processing unit 1012) and transmits the recovered transport frame to the transmission-side rate conversion unit 1132*a*.

Since the bit rate of the line signal is 50 G (56 G), it is not possible to perform transfer in the OTU4 format. Thus, the transmission-side rate conversion unit 1132*a* removes the dummy signal such as FS inserted by the OTU4 framer (the framing processing unit 1012) from the OTU4 transport frame recovered by the parallel signal receiving unit 1131 to generate a 50 G transport frame.

Figure 32:
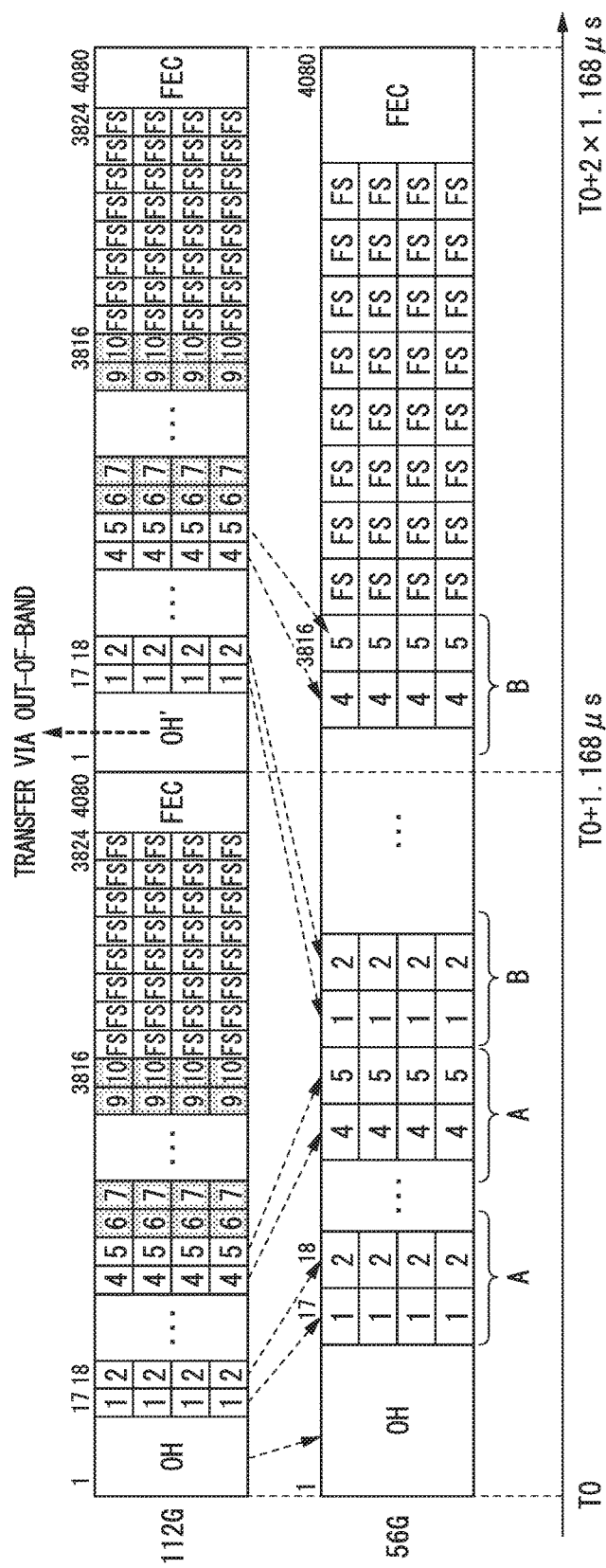
FIG. 32 is a diagram illustrating a transport frame conversion process executed by a transmission-side rate conversion unit in accordance with the eighth embodiment.

FIG. 32 is a diagram illustrating a process of the transmission-side rate conversion unit 1132*a* converting 100 G transport frames (OTU4: 112 G) into a 50 G transport frame. Similarly to the fourth embodiment illustrated in FIGS. 24 and 25, the transmission-side rate conversion unit 1132*a* extracts the client signals from the 50 G TSs at predetermined positions (TS1 to TS5) of the payload in the first OTU4 100 G transport frame (112 G). The transmission-side rate conversion unit 1132*a* maps the extracted client signals to half of the TSs (TS1 to TS5 of the TS group A) at the predetermined positions of the payload in the 50 G transport frame (56 G).

Further, the transmission-side rate conversion unit 1132*a* extracts the 50 G TSs set at the predetermined positions (TS1 to TS5) of the payload in the second OTU4 100 G transport frame and extracts the client signals from the extracted TSs. The transmission-side rate conversion unit 1132*a* maps the extracted client signals to the remaining half of the TSs (TS1 to TS5 of the TS group B) of the payload in the 50 G transport frame (56 G).

It is to be noted that as illustrated in the drawing, the transmission-side rate conversion unit 1132*a* sets the OH of the first OTU4 frame in the OH of the 50 G transport frame (56 G). Moreover, the transmission-side rate conversion unit 1132*a* transfers part of the OH', which is the OH of the second OTU4 frame, to the opposing reception-side transponder 1001*a* via an out-of-band (e.g., an OSC).

The processes until the error correction decoding unit 1136 of the opposing transponder 1001*a* outputs the 50 G transport frame having been subjected to the error correction process to the reception-side rate conversion unit 1137*a* after the transmission-side rate conversion unit 1132*a* outputs the 50 G transport frame are the same as those of the fourth embodiment.

The transmission-side rate conversion unit 1132*a* outputs the generated 50 G transport frame to the error correction encoding unit 1133. The error correction encoding unit 1133 appends an error correction code to the 50 G transport frame and transmits the 50 G transport frame having the error correction code appended thereto to the digital signal transmission processing unit 1134. It is to be noted that the error correction encoding unit 1133 may be omitted.

The digital signal transmission processing unit 1134 performs an optical digital coherent process for long-distance transport on the 50 G transport frame and transmits the processed 50 G transport frame to the line signal transceiving unit 1014. It is to be noted that the digital signal transmission processing unit 1134 may be omitted.

The line signal transceiving unit 1014 performs E/O conversion on data of the 50 G transport frame output from the digital signal processing unit 1013*a* and transmits the optical signal obtained by the conversion to a network as a line signal. The transmitted data is received by the line signal transceiving unit 1014 of the opposing transponder 1001*a*.

The line signal transceiving unit 1014 of the opposing transponder 1001*a* performs O/E conversion on the received data and then outputs the electrical signal obtained by the conversion to the DSP (the digital signal processing unit 1013*a*). The digital signal reception processing unit 1135 of the digital signal processing unit 1013*a* performs signal equalization on the received data and outputs a 50 G transport frame. The error correction decoding unit 1136 performs an error correction process on the 50 G transport frame output from the digital signal reception processing unit 1135. The error correction decoding unit 1136 transmits the 50 G transport frame having been subjected to the error correction process to the reception-side rate conversion unit 1137*a*.

The reception-side rate conversion unit 1137*a* generates 100 G transport frames (OTU4: 112 G) from the 50 G transport frame (56 G) output by the error correction decoding unit 1136. Specifically, the reception-side rate conversion unit 1137*a* maps half of the TSs (TS1 to TS5 of the TS group A) of the received 50 G transport frame (56 G) to the 50 G TSs (e.g., TS1 to TS5) included at predetermined positions of the payload of the first 100 G transport frame. The reception-side rate conversion unit 1137*a* inserts a dummy signal such as FS to the remaining 50 G TSs (e.g., TS6 to TS10) of the payload of the 100 G transport frame.

Further, the reception-side rate conversion unit 1137*a* maps the remaining half of the TSs (TS1 to TS5 of the TS group B) of the received 50 G transport frame (56 G) to the 50 G TSs (e.g., TS1 to TS5) included at the predetermined positions of the payload of the second 100 G transport frame. The reception-side rate conversion unit 1137*a* inserts a dummy signal such as FS into the remaining 50 G TSs (e.g., TS6 to TS10) of the payload of the second 100 G transport frame, similarly to the first frame.

The reception-side rate conversion unit 1137*a* copies the OH of the 50 G transport frames (56 G) to the OH of the OTU4 of the first 100 G transport frame as it is. Further, the reception-side rate conversion unit 1137*a* recovers the OH to be set in the second OTU4 frame from the data received by the transmission-side transponder 1001*a* via an out-of-band. It is to be noted that with respect to the deficient OH data, the reception-side rate conversion unit 1137*a* may copy the corresponding data of the OH of the first OTU4 frame as it is or may insert other data. The reception-side rate conversion unit 1137*a* inserts the recovered OH' data of the OTU4 into the second 100 G transport frame.

By forming the 100 G transport frames in this manner, two 100 G transport frames (OTU4) are recovered from one 50 G transport frame.

The processes after the reception-side rate conversion unit 1137*a* transmits the recovered two 100 G transport frames (OTU4: 112 G) to the parallel signal transmitting unit 1138 are the same as those of the fourth embodiment.

That is, the parallel signal transmitting unit 1138 transmits the recovered 100 G transport frame (OTU4: 112 G) to the OTU4 framer (the framing processing unit 1012) concurrently via the OTL4.10 interface between the DSP and the OTU4 framer. The parallel signal receiving unit 1125 of the OTU4 framer recovers the 100 G transport frame (OTU4: 112 G). The overhead extracting unit 1126 performs a process relating to an overhead such as error monitoring on the recovered 100 G transport frame (OTU4: 112 G). The dummy signal removing unit 1127 removes the dummy signal from the 50 G TSs (TS6 to TS10 in FIG. 32) included at predetermined positions in the payload of the 100 G transport frame (OTU4: 112 G) having been subjected to the process relating to the overhead. The demapping unit 1128 extracts client signals (10 GE×5) from the TSs (e.g., TS1 to TS5) of the 100 G transport frame (OTU4: 112 G) from which the dummy signal is removed. It is to be noted that rather than removing the dummy signal, the demapping unit 1128 may directly recover the client signals from the 100 G transport frame (OTU4: 112 G). The demapping unit 1128 transmits the extracted client signals (10 GE×5) to the client signal transceiving unit 1011. The client signal transceiving unit 1011 outputs the client signals received from the framer (the framing processing unit 1012).

In accordance with the present embodiment, part of one of the OHs of the OTU4 which was not used when the transmission-side transponder 1001 creates the 50 G transport frame to be transferred between transponders 1001 is transferred using the out-of-band (e.g., an OSC). Thus, the present invention is suitable to a case in which it is only necessary for one of the OHs to be transferred for part of the OH and transfer via the OSC is possible.

<Ninth Embodiment>

In the ninth embodiment, the OH of the second OTU4 frame which was not used when the transmission-side transponder creates a transport frame to be transferred between transponders is transmitted to the reception-side transponder using a combination of at least one of the methods of the fourth to eighth embodiments. It is to be noted that part of the OH of the second OTU4 frame may be transferred or the entire OH may be transferred.

Figure 33:
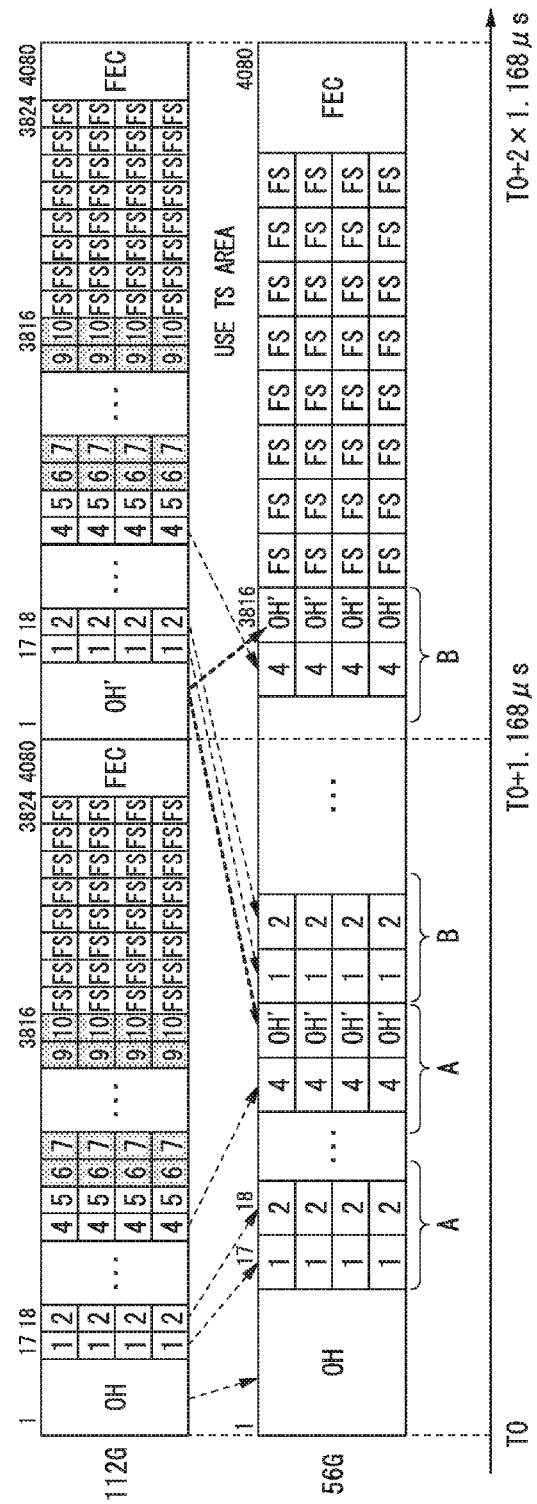
FIG. 33 is a diagram illustrating transfer of all items of information of an overhead (OH) of a second frame in accordance with the ninth embodiment.

FIG. 33 is a diagram illustrating transfer of all items of information of the OH of the second frame. The drawing illustrates an example in which the sixth embodiment is applied and the OH is transferred via TSs. As illustrated in the drawing, the transmission-side rate conversion unit 1132 of the transponder 1001 sets the overhead (OH') of the second OTU4 frame in the 10 G TSs among the TSs of the TS groups A and B of the 50 G transport frame.

It is to be noted that the transmission-side rate conversion unit 1132 or 1132*a* of the transmission-side transponder 1001 or 1001*a* may divide the overhead OH' of the second frame and transfer the divided overheads to the reception-side transponder 1001 or 1001*a* using an arbitrary combination of the methods of the fourth to eighth embodiments.

The present embodiment enables the fourth to eighth embodiments to be combined with each other and can transfer part of or the entirety of one of the OHs of the OTU4 which was not used when the transmission-side transponder creates the 50 G transport frame to be transferred between transponders to the reception-side transponder. Thus, the present embodiment is suitable to a case in which it is desired to transfer the entire OH.

<Tenth Embodiment>

In the tenth embodiment, frame rate conversion and transfer with a fixed frame rate are used in combination. The present embodiment illustrates an example in which, when a line-side bit rate is 150 G, a 50 G transport frame created by frame rate conversion and a 100 G transport frame having a fixed rate are transferred in combination.

Figure 34:
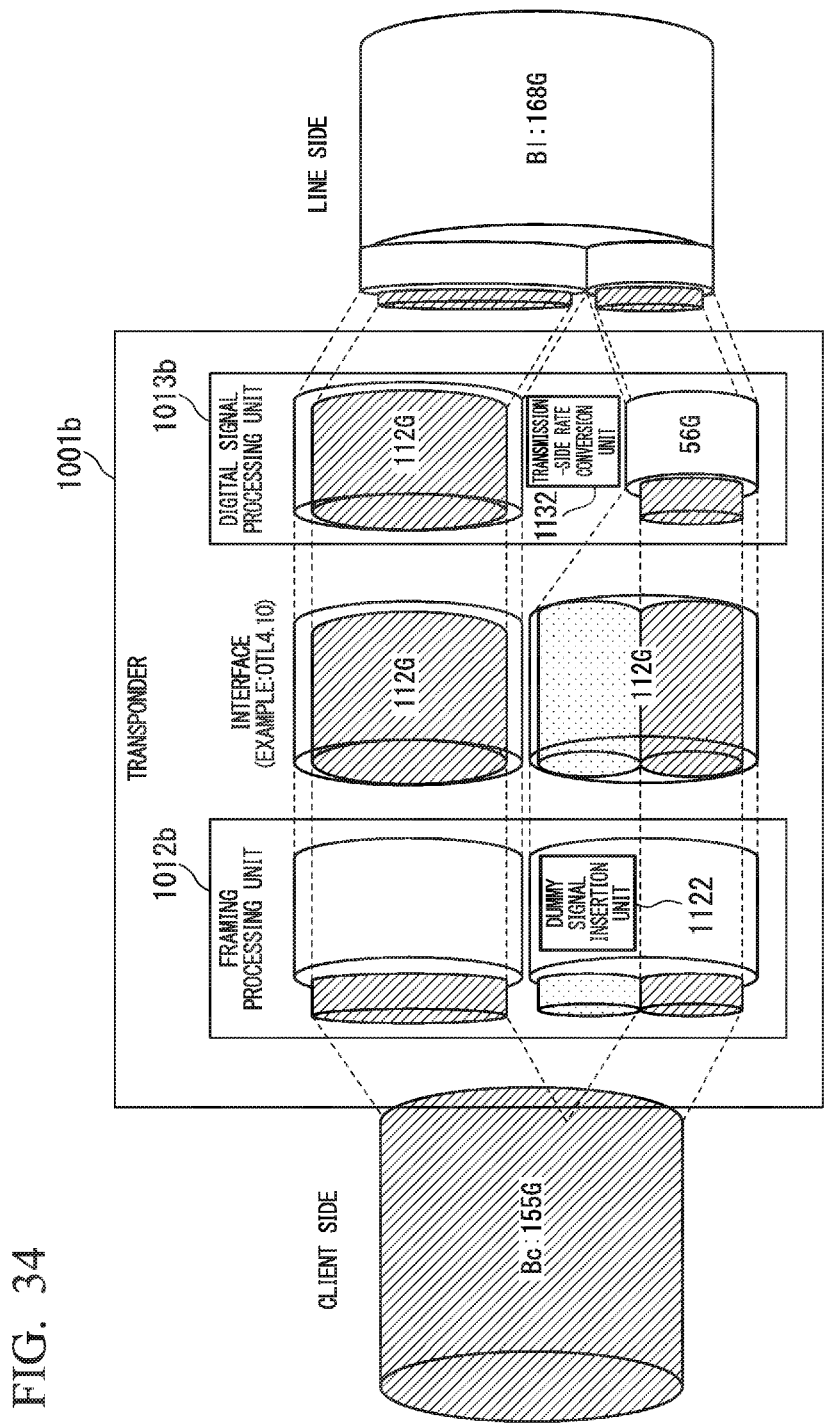
FIG. 34 is a diagram illustrating an outline of a frame transfer process in a transmission-side transponder in accordance with the tenth embodiment.

FIG. 34 is a diagram illustrating an outline of a frame transfer process in a transmission-side transponder 1001*b* in accordance with the tenth embodiment. The transponder 1001*b* of the present embodiment transfers a 155 G client signal using two OTL4.10 (112 G) interfaces between the framer (a framing processing unit 1012*b*) and the DSP (a digital signal processing unit 1013*b*).

For transfer of signals from the framer to the DSP, the framing processing unit 1012*b* (framer) of the transponder 1001*b* forms two 100 G transport frames (112 G). The framing processing unit 1012*b* accommodates the 100 G (103 G) client signal in the 155 G client signal in the 100 G transport frame, as in the conventional art. As for the remaining 52 G client signal, similarly to the fourth to ninth embodiments, the dummy signal insertion unit 1122 inserts a dummy signal into the TSs when the framing processing unit 1012*b* forms the payload of the 100 G transport frame.

The transmission-side rate conversion unit 1132 of the digital signal processing unit 1013*b* (DSP) removes the dummy signal from the 100 G transport frame in which the 52 G client signal is set to form a 50 G transport frame. The digital signal processing unit 1013*b* multiplexes the 100 G transport frame (112 G) with the 50 G transport frame (56 G) and transfers the multiplexed transport frames to the reception-side transponder 1001*b* with 168 G.

In the DSP of the reception-side transponder 1001*b*, the digital signal processing unit 1013*b* separates the received 168 G signal into a 100 G transport frame (112 G) and a 50 G transport frame (56 G). The digital signal processing unit 1013*b* transfers the separated 100 G transport frame to the framer using the OTL4.10 (112 G) interface, and the framing processing unit 1012*b* of the framer recovers the 103 G client signal from the 100 G transport frame and outputs the recovered client signal.

Moreover, similarly to the fourth to ninth embodiments, the digital signal processing unit 1013*b* inserts the dummy signal into the payload of the 50 G transport frame (56 G) to form a 100 G transport frame (112 G). In the framer of the reception-side transponder 1001*b*, the framing processing unit 1012*b* removes the dummy signal from the transport frame to recover the 52 G client signal and outputs the recovered client signal.

Figure 35:
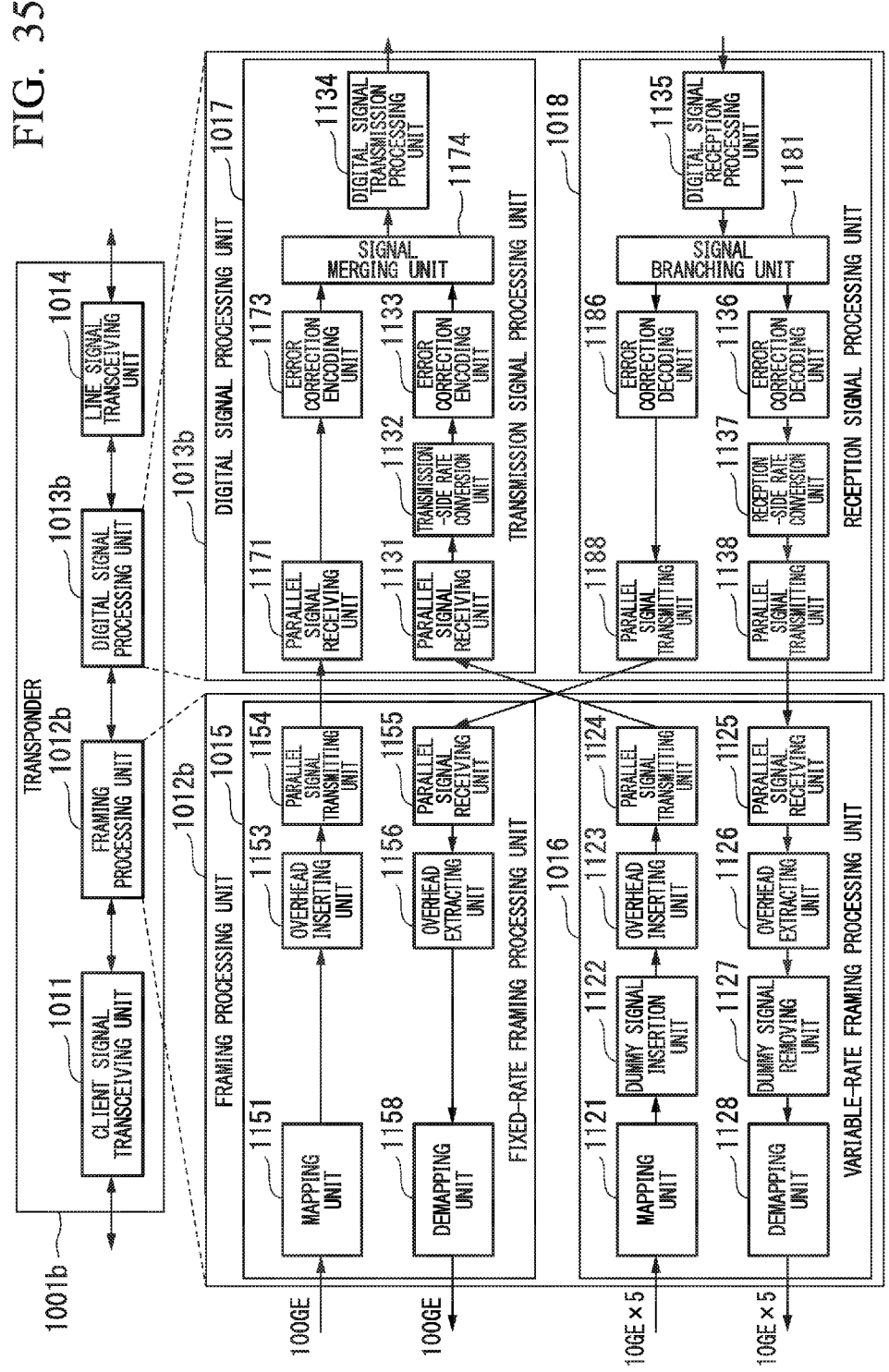
FIG. 35 is a functional block diagram illustrating a configuration of the transponder in accordance with the tenth embodiment.

FIG. 35 is a functional block diagram illustrating a configuration of the transponder 1001*b* in accordance with the tenth embodiment. In the drawing, the same portions as those of the transponder 1001 of the fourth embodiment illustrated in FIG. 22 will be denoted by the same reference numerals, and the description thereof will be omitted. The transponder 1001*b* is configured to include a client signal transceiving unit 1011, a framing processing unit 1012b, a digital signal processing unit 1013b, and a line signal transceiving unit 1014. In the present embodiment, it is assumed that the framing processing unit 1012b is included in the OTU4 framer and the digital signal processing unit 1013b is included in the digital coherent signal processing LSI (DSP). The framing processing unit 1012b is configured to include a fixed-rate framing processing unit 1015 and a variable-rate framing processing unit 1016. The fixed-rate framing processing unit 1015 performs a process of framing the 100 G transport frame without converting the transfer rate. The fixed-rate framing processing unit 1015 is configured to include a mapping unit 1151, an overhead inserting unit 1153, a parallel signal transmitting unit 1154, a parallel signal receiving unit 1155, an overhead extracting unit 1156, and a demapping unit 1158.

The mapping unit 1151 maps a 100 GE client signal transmitted from the client signal transceiving unit 1011 to a transport frame that is compliant with an interface between the framer and the DSP and outputs the transport frame obtained by the mapping to the overhead inserting unit 1153. The overhead inserting unit 1153 inserts overhead information into the transport frame mapped by the mapping unit 1151 and outputs the transport frame having the overhead information inserted therein to the parallel signal transmitting unit 1154. The parallel signal transmitting unit 1154 transfers transport frames into which overheads are inserted by the overhead inserting unit 1153 from the framing processing unit 1012b to the digital signal processing unit 1013b concurrently via the interface between the framer and the DSP.

The parallel signal receiving unit 1155 sets the signal transferred from the digital signal processing unit 1013b via the interface between the framer and the DSP in the transport frame and outputs the transport frame in which this signal is set to the overhead extracting unit 1156. The overhead extracting unit 1156 extracts the overhead of the transport frame output from the parallel signal receiving unit 1155 and performs a process relating to an overhead. The demapping unit 1158 recovers the 100 GE client signal from the transport frame and transmits the recovered client signal to the client signal transceiving unit 1011.

The variable-rate framing processing unit 1016 performs a framing process which converts the transfer rate. The variable-rate framing processing unit 1016 is configured to include a mapping unit 1121, a dummy signal insertion unit 1122, an overhead inserting unit 1123, a parallel signal transmitting unit 1124, a parallel signal receiving unit 1125, an overhead extracting unit 1126, a dummy signal removing unit 1127, and a demapping unit 1128.

The digital signal processing unit 1013b is configured to include a transmission signal processing unit 1017 and a reception signal processing unit 1018.

The transmission signal processing unit 1017 is configured to include a parallel signal receiving unit 1171, an error correction encoding unit 1173, a parallel signal receiving unit 1131, a transmission-side rate conversion unit 1132, an error correction encoding unit 1133, a signal merging unit 1174, and a digital signal transmission processing unit 1134. The parallel signal receiving unit 1171 recovers the transport frame from the signal transmitted from the fixed-rate framing processing unit 1015 via the interface between the framer and the DSP and outputs the recovered transport frame to the error correction encoding unit 1173. The error correction encoding unit 1173 appends an error correction code to the transport frame recovered by the parallel signal receiving unit 1171 and outputs the transport frame having the error correction code appended thereto to the signal merging unit 1174. The signal merging unit 1174 merges a 50 G transport frame output from the error correction encoding unit 1133 and a 100 G transport frame output from the error correction encoding unit 1173.

The reception signal processing unit 1018 is configured to include a digital signal reception processing unit 1135, a signal branching unit 1181, an error correction decoding unit 1186, a parallel signal transmitting unit 1188, an error correction decoding unit 1136, a reception-side rate conversion unit 1137, and a parallel signal transmitting unit 1138. The signal branching unit 1181 demultiplexes a 100 G transport frame and a 50 G transport frame obtained by the digital signal reception processing unit 1135 performing a signal equalization process on the signal transferred from the line signal transceiving unit 1014. The signal branching unit 1181 outputs the 100 G transport frame to the error correction decoding unit 1186 and outputs the 50 G transport frame to the error correction decoding unit 1136. The error correction decoding unit 1186 outputs a transport frame obtained by performing error correction decoding on the transport frame output from the signal branching unit 1181 to the parallel signal transmitting unit 1188. The parallel signal transmitting unit 1188 transfers transport frames having been subjected to the error correction decoding by the error correction decoding unit 1186 to the fixed-rate framing processing unit 1015 of the framing processing unit 1012b concurrently via the interface between the framer and the DSP.

The tenth embodiment illustrates an example of transfer when the bit rate of the client signal is 155 G, an OTL4.10 interface that is compliant with OTU4 of 112 G is used as the interface between the OTU4 framer and the DSP, and the bit rate of the line signal is 168 G is.

It is assumed that 100 GE (approximately 103 G) and 10 GE×5 (approximately 52 G) client signals are input to the transponder 1001b. The client signal transceiving unit 1011 transmits the 100 GE (approximately 103 G) client signal to the fixed-rate framing processing unit 1015 of the framing processing unit 1012b and transmits the 10 GE×5 (approximately 52 G) client signal to the variable-rate framing processing unit 1016.

The mapping units 1151 and 1121 of the framing processing unit 1012b map the client signals to the 100 G transport frames, which are transport frames that are compliant with the OTU4, since the interface (OTL4.10) between the OTU4 frame and the DSP is 112 G that is compliant with OTU4. The mapping unit 1151 maps the 100 GE (103 G) client signal to the 100 G transport frame that is compliant with OTU4 in the same manner as the conventional art and outputs the 100 G transport frame to which the client signal is mapped to the overhead inserting unit 1153. The overhead inserting unit 1153 inserts an OH into the 100 G transport frame output from the mapping unit 1151 and transmits the 100 G transport frame having the OH inserted therein to the parallel signal transmitting unit 1154. The parallel signal transmitting unit 1154 transmits the 100 G transport frame output from the overhead inserting unit 1153 to the digital signal processing unit 1013b of the DSP via the OTL4.10 interface.

On the other hand, the mapping unit 1121 maps the 10 GE×5 (52 G) client signal to the 100 G transport frame that is compliant with OTU4, similarly to the fourth embodiment. When mapping the client signal to the 100 G transport frame, the mapping unit 1121 maps the client signal to 50 G TSs (e.g., TS1 to TS5 in the 17th to 3816th columns of the 100 G transport frame of FIG. 23A) at predetermined positions in the payload. The dummy signal insertion unit 1122 sets a dummy signal such as FS in the remaining 50 G TSs (e.g., TS6 to TS10 in the 17th to 3816th columns of the 100 G transport frame illustrated in FIG. 23A) of the 100 G transport frame. By setting the 100 G transport frame in this manner, it is possible to generate a frame with which 50 G data is transmitted while taking the format of the 100 G transport frame (OTU4) which can be transferred via the 100 G OTL4.10 interface.

The overhead inserting unit 1123 inserts an OH into the data output by the transport frame that is compliant with the OTU4 from the dummy signal insertion unit 1122 and transmits the data having the OH inserted therein to the parallel signal transmitting unit 1124. The parallel signal transmitting unit 1124 transmits transport frames output from the overhead inserting unit 1123 concurrently to the digital signal processing unit 1013b of the DSP via the OTL4.10 interface.

Since the bit rate of the line signal is 150 G (168 G), it is not possible to perform transfer in the format of two OTU4s. Thus, the digital signal processing unit 1013b removes the dummy signal such as the FS inserted by the OTU4 framer (the framing processing unit 1012b) from the OTU4 in which the 10 GEx5 (52 G) client signal is included to generate a 50 G transport frame (56 G). The digital signal processing unit 1013b does not perform a process relating to rate conversion on the OTU4 in which the 100 GE client signal is included.

That is, the parallel signal receiving unit 1171 recovers the OTU4 transport frame received from the parallel signal transmitting unit 1154 and outputs the recovered OTU4 transport frame to the error correction encoding unit 1173 as a 100 G transport frame. The error correction encoding unit 1173 appends an error correction code to the 100 G transport frame output by the parallel signal receiving unit 1171 and outputs the 100 G transport frame having the error correction code appended thereto to the signal merging unit 1174. On the other hand, the parallel signal receiving unit 1131 recovers the OTU4 transport frame received from the parallel signal transmitting unit 1124 and outputs the recovered OTU4 transport frame to the transmission-side rate conversion unit 1132 as a 100 G transport frame. The transmission-side rate conversion unit 1132 generates a 50 G transport frame from the 100 G transport frames (OTU4: 112 G) similarly to the fourth embodiment illustrated in FIGS. 24 and 25.

Specifically, the transmission-side rate conversion unit 1132 extracts a client signal from the 50 G TSs (TS1 to TS5) at predetermined positions of the payload in the first OTU4 100 G transport frame (112 G). The transmission-side rate conversion unit 1132 maps the extracted client signal to half of the TSs (TS1 to TS5 of the TS group A) at the predetermined positions of the payload of the 50 G transport frame (56 G). Further, the transmission-side rate conversion unit 1132 extracts the 50 G TSs set in the predetermined positions (TS1 to TS5) of the payload in the second OTU4 100 G transport frame and extracts the client signal from the extracted TSs. The transmission-side rate conversion unit 1132 maps the extracted client signal to the remaining half of the TSs (TS1 to TS5 of the TS group B) of the payload of the 50 G transport frame (56 G). The transmission-side rate conversion unit 1132 sets the OH of the first OTU4 frame in the OH of the 50 G transport frame (56 G) and removes the overhead of the second OTU4 frame.

The transmission-side rate conversion unit 1132 outputs the generated 50 G transport frame to the error correction encoding unit 1133. The error correction encoding unit 1133 appends an error correction code to the 50 G transport frame and outputs the 50 G transport frame having the error correction code appended thereto to the signal merging unit 1174. It is to be noted that the error correction encoding units 1133 and 1173 may be omitted.

The signal merging unit 1174 multiplexes the 100 G transport frame (OTU4: 112 G) output from the error correction encoding unit 1173 (or the parallel signal receiving unit 1171) with the 50 G transport frame (56 G) output from the error correction encoding unit 1133 (or the transmission-side rate conversion unit 1132) to obtain a 168 G signal. The signal merging unit 1174 outputs the multiplexed signal to the digital signal transmission processing unit 1134. The digital signal transmission processing unit 1134 performs an optical digital coherent process for long-distance transport on the 168 G signal multiplexed by the signal merging unit 1174 and transmits the processed 168 G signal to the line signal transceiving unit 1014. It is to be noted that the digital signal transmission processing unit 1134 may be omitted.

The line signal transceiving unit 1014 performs E/O conversion on data of the 50 G transport frame output from the digital signal processing unit 1013b and transmits the optical signal obtained by the conversion to a network as a line signal. The transmitted data is received by the line signal transceiving unit 1014 of the opposing transponder 1001b.

The line signal transceiving unit 1014 of the opposing transponder 1001b performs O/E conversion on the received data and then transmits the electrical signal obtained by the conversion to the digital signal reception processing unit 1135 of the DSP (the digital signal processing unit 1013b). The digital signal reception processing unit 1135 performs signal equalization on the received data and outputs a 168 G signal. The signal branching unit 1181 divides the 168 G signal output from the digital signal reception processing unit 1135 into a 100 G transport frame (OTU4: 112 G) and a 50 G transport frame (56 G). The signal branching unit 1181 transmits the 100 G transport frame (OTU4: 112 G) to the error correction decoding unit 1186 and transmits the 50 G transport frame (56 G) to the error correction decoding unit 1136.

The error correction decoding unit 1186 performs an error correction process on the 100 G transport frame (OTU4: 112 G) and outputs the 100 G transport frame having been subjected to the error correction process to the parallel signal transmitting unit 1188. The parallel signal transmitting unit 1188 transmits 100 G transport frames (OTU4: 112 G) to the fixed-rate framing processing unit 1015 of the OTU4 framer concurrently via the OTL4.10 interface between the DSP and the OTU4 framer.

On the other hand, the error correction decoding unit 1136 performs an error correction process on the 50 G transport frame (56 G) and transmits the 50 G transport frame having been subjected to the error correction process to the reception-side rate conversion unit 1137. The reception-side rate conversion unit 1137 performs a reception-side rate conversion process on the 50 G transport frame, similarly to the fourth embodiment.

Specifically, the reception-side rate conversion unit 1137 maps half of the TSs (TS1 to TS5 of the TS group A) of the received 50 G transport frame (56 G) to the 50 G TSs (e.g., TS1 to TS5) included at predetermined positions of the payload of the first 100 G transport frame. The reception-side rate conversion unit 1137 inserts a dummy signal such as FS into the remaining 50 G TSs (e.g., TS6 to TS10) of the payload of the 100 G transport frame.

Further, the reception-side rate conversion unit 1137 maps the remaining half of the TSs (TS1 to TS5 of the TS group B) of the received 50 G transport frame (56 G) to the 50 G TSs (e.g., TS1 to TS5) included at predetermined positions of the payload of the second 100 G transport frame. The reception-side rate conversion unit 1137 inserts a dummy signal such as FS into the remaining 50 G TSs (e.g., TS6 to TS10) of the payload of the second 100 G transport frame, similarly to the first frame.

The reception-side rate conversion unit 1137 copies the OH of the 50 G transport frame (56 G) to the OH of the OTU4 of the first 100 G transport frame as it is. The reception-side rate conversion unit 1137 may copy the OH of the 50 G transport frame to the OH of the OTU4 of the second OTU4 100 G transport frame as it is or may insert other data.

By doing so, two 100 G transport frames (OTU4) are recovered from one 50 G transport frame.

The reception-side rate conversion unit 1137 transmits the recovered two 100 G transport frames (OTU4: 112 G) to the parallel signal transmitting unit 1138. The parallel signal transmitting unit 1138 transmits the 100 G transport frames (OTU4: 112 G) to the variable-rate framing processing unit 1016 of the OTU4 framer concurrently via the OTL4.10 interface between the DSP and the OTU4 framer.

In the fixed-rate framing processing unit 1015 of the OTU4 framer, the parallel signal receiving unit 1155 recovers the 100 G transport frame (OTU4: 112 G) in which the 100 GE client signal is set and transmits the recovered 100 G transport frame to the overhead extracting unit 1156. The overhead extracting unit 1156 performs a process relating to an overhead such as error monitoring and outputs the processed 100 G transport frame to the demapping unit 1158. The demapping unit 1158 extracts the client signal from the 100 G transport frame (OTU4: 112 G) and transmits the recovered client signal 100 GE to the client signal transceiving unit 1011.

On the other hand, in the variable-rate framing processing unit 1016 of the OTU4 framer, the parallel signal receiving unit 1125 recovers the 100 G transport frame (OTU4: 112 G) in which the 10 GE×5 (52 G) client signals are included and transmits the recovered 100 G transport frame to the overhead extracting unit 1126. The overhead extracting unit 1126 performs a process relating to an overhead such as error monitoring on the recovered 100 G transport frame (OTU4: 112 G) and then transmits the processed 100 G transport frame to the dummy signal removing unit 1127. The dummy signal removing unit 1127 removes the dummy signal from the 50 G TSs (e.g., TS6 to TS10) included at predetermined positions in the payload of the 100 G transport frame (OTU4: 112 G). The dummy signal removing unit 1127 transmits the 100 G transport frame (OTU4: 112 G) from which the dummy signal is removed to the demapping unit 1128. The demapping unit 1128 extracts the client signals from the 100 G transport frame (OTU4: 112 G). It is to be noted that rather than removing the dummy signal, the demapping unit 1128 may recover the client signals directly from the 100 G transport frame (OTU4: 112 G). The demapping unit 1128 transmits the extracted 10 GE×5 client signals to the client signal transceiving unit 1011.

It is to be noted that in the present embodiment, the management based on the OH of the OTU in 150 G transfer may be performed using the OH of the 100 G transport frame only, the OH of the 50 G transport frame only, and both OHs of the 100 G transport frame and the 50 G transport frame. That is, the transponder 1001*b* may set the OH obtained from the 100 G transport frame in the transport frame used when performing 150 G transfer, may set the OH obtained from the 50 G transport frame in the transport frame, and may set the OHs in the transport frame based on both the OH obtained from the 100 G transport frame and the OH obtained from the 50 G transport frame.

In accordance with the present embodiment, it is possible to multiplex and transfer the 50 G transport frame and the conventional 100 G transport frame. The present embodiment is suitable when performing 8 QAM 150 G transfer.

<Eleventh Embodiment>

The present embodiment relates to framing when the line-side is 33.6 G.

A transponder of the present embodiment has a configuration similar to that of the transponder 1001 of the fourth embodiment illustrated in FIG. 22. In the present embodiment, it is assumed that the framing processing unit 1012 is provided in the OTU4 framer and the digital signal processing unit 1013 is provided in the digital coherent signal processing LSI (DSP). The present embodiment illustrates an example of transfer when the bit rate of the client signal is 31 G, an OTL4.10 interface that is compliant with OTU4 of 112 G is used as the interface between the OTU4 framer and the DSP, and the bit rate of the line signal is 33.6 G.

It is assumed that 10 GE×3 (approximately 31 G) client signals are input to the transponder 1001. The client signal transceiving unit 1011 transmits the client signals to the framing processing unit 1012. The mapping unit 1121 of the framing processing unit 1012 maps the client signals to a 100 G transport frame, which is a transport frame that is compliant with OTU4, since the interface (OTL4.10) between the OTU4 framer and the DSP is 112 G that is compliant with OTU4. In this case, the mapping unit 1121 of the OTU4 framer maps the client signals to 30 G TSs (e.g., TS1 to TS3 in the 17th to 3816th columns of the 100 G transport frame of FIG. 23A) at predetermined positions in the payload. The dummy signal insertion unit 1122 inserts a dummy signal such as FS into the remaining 70 G TSs (e.g., TS4 to TS10 in the 17th to 3816th columns of FIG. 23A) of the 100 G transport frame. With the above setting, it is possible to generate a frame with which 30 G data is transmitted while taking the format of the 100 G transport frame (OTU4) which can be transferred via the 100 G OTL4.10 interface.

The overhead inserting unit 1123 inserts an OH into the data output by the transport frame that is compliant with the OTU4 from the dummy signal insertion unit 1122 and transmits the data having the OH inserted therein to the parallel signal transmitting unit 1124. The parallel signal transmitting unit 1124 transmits transport frames output from the overhead inserting unit 1123 concurrently to the digital signal processing unit 1013 of the DSP via the OTL4.10 interface. The parallel signal receiving unit 1131 of the DSP recovers the OTU4 transport frame received from the framer (the framing processing unit 1012) and transmits the recovered transport frame to the transmission-side rate conversion unit 1132.

Since the bit rate of the line signal is 30 G (33.6 G), it is not possible to perform transfer in the OTU4 format. Thus, the transmission-side rate conversion unit 1132 removes the dummy signal such as FS inserted by the OTU4 framer (the framing processing unit 1012) from the OTU4 transport frame recovered by the parallel signal receiving unit 1131 to generate a 30 G transport frame (33.6 G) used for 30 G-system signals.

Figure 36:
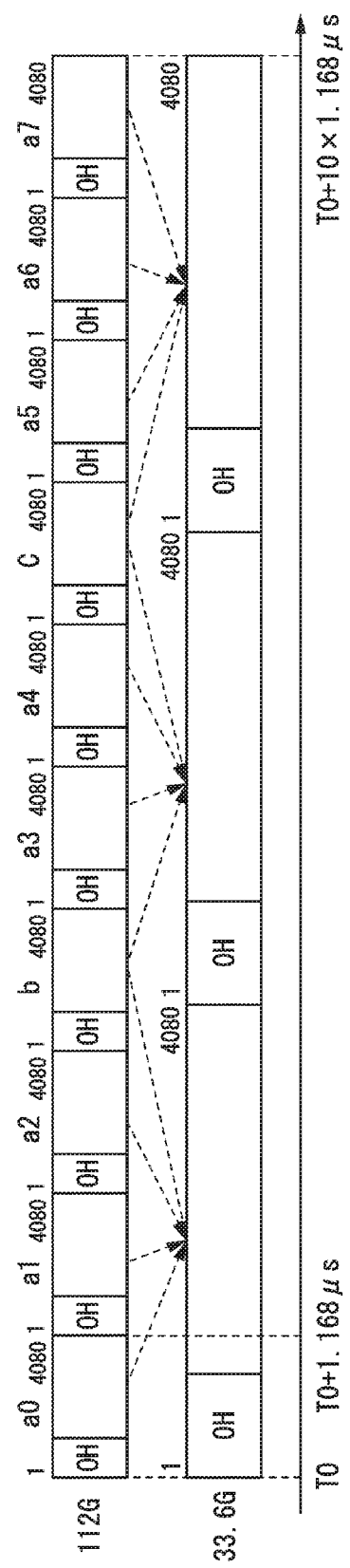
FIG. 36 is a diagram describing an outline of a transport frame conversion process in a transmission-side rate conversion unit in accordance with the eleventh embodiment.

FIG. 36 is a diagram describing an outline of a conversion process of a transport frame by the transmission-side rate conversion unit 1132.

Ten 100 G transport frames from time T0 to time T0+10× 1.168 microseconds (μs) correspond to three 30 G transport frames. The ten 100 G transport frames are denoted by numbers a0, a1, a2, b, a3, a4, c, a5, a6, and a7.

The transmission-side rate conversion unit 1132 sets payloads of the first to third 100 G transport frames (frame numbers a0, a1, and a2) and part of a payload of the fourth 100 G transport frame (frame number b) in a payload of the first 30 G transport frame. Further, the transmission-side rate conversion unit 1132 sets the remaining portion of the payload of the fourth 100 G transport frame (frame number b), payloads of the fifth and sixth 100 G transport frames (frame numbers a3 and a4), and part of a payload of the seventh 100 G transport frame (frame number c) in a payload of the second 30 G transport frame. The transmission-side rate conversion unit 1132 sets the remaining portion of the payload of the seventh 100 G transport frame (frame number c) and payloads of the eighth to tenth 100 G transport frames (frame numbers a5, a6, and a7) in a payload of the third 30 G transport frame.

Figure 37:
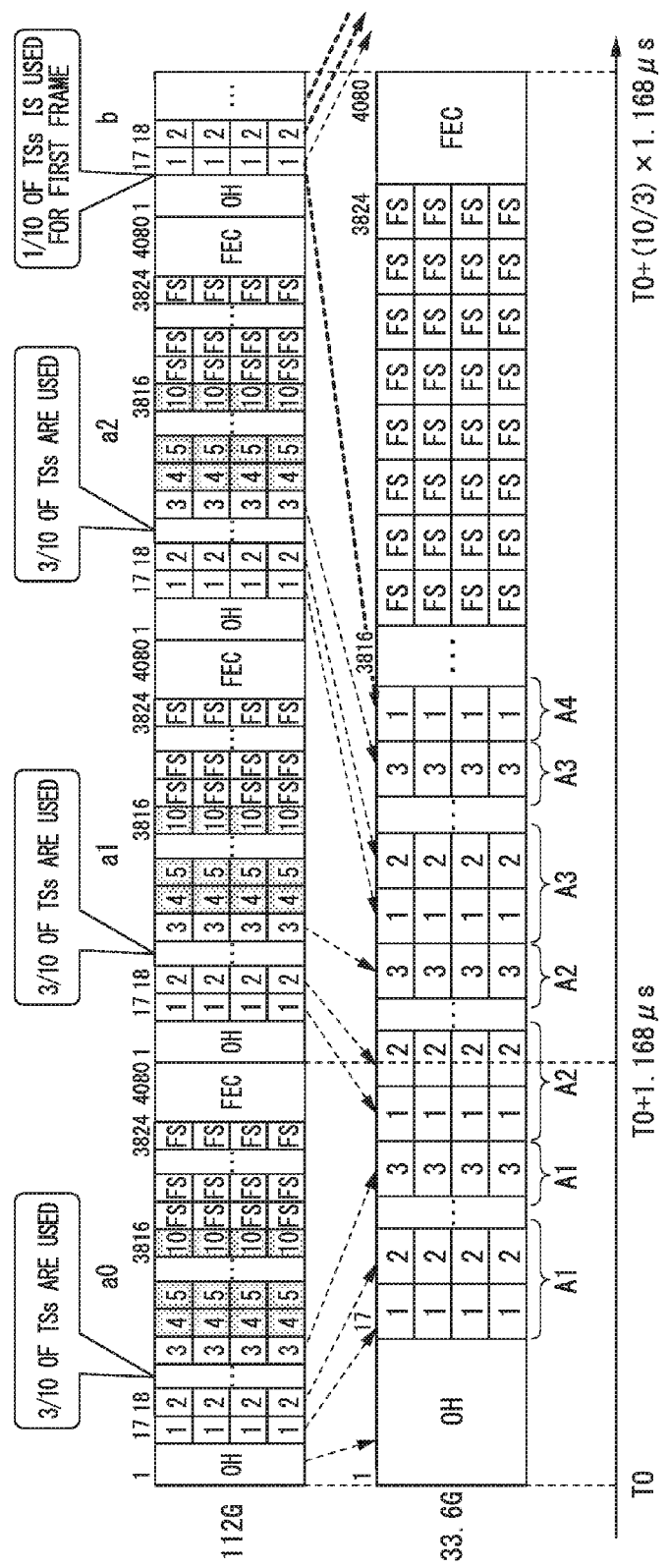
FIG. 37 is a diagram illustrating the transport frame conversion process executed by the transmission-side rate conversion unit in accordance with the eleventh embodiment.
Figure 38:
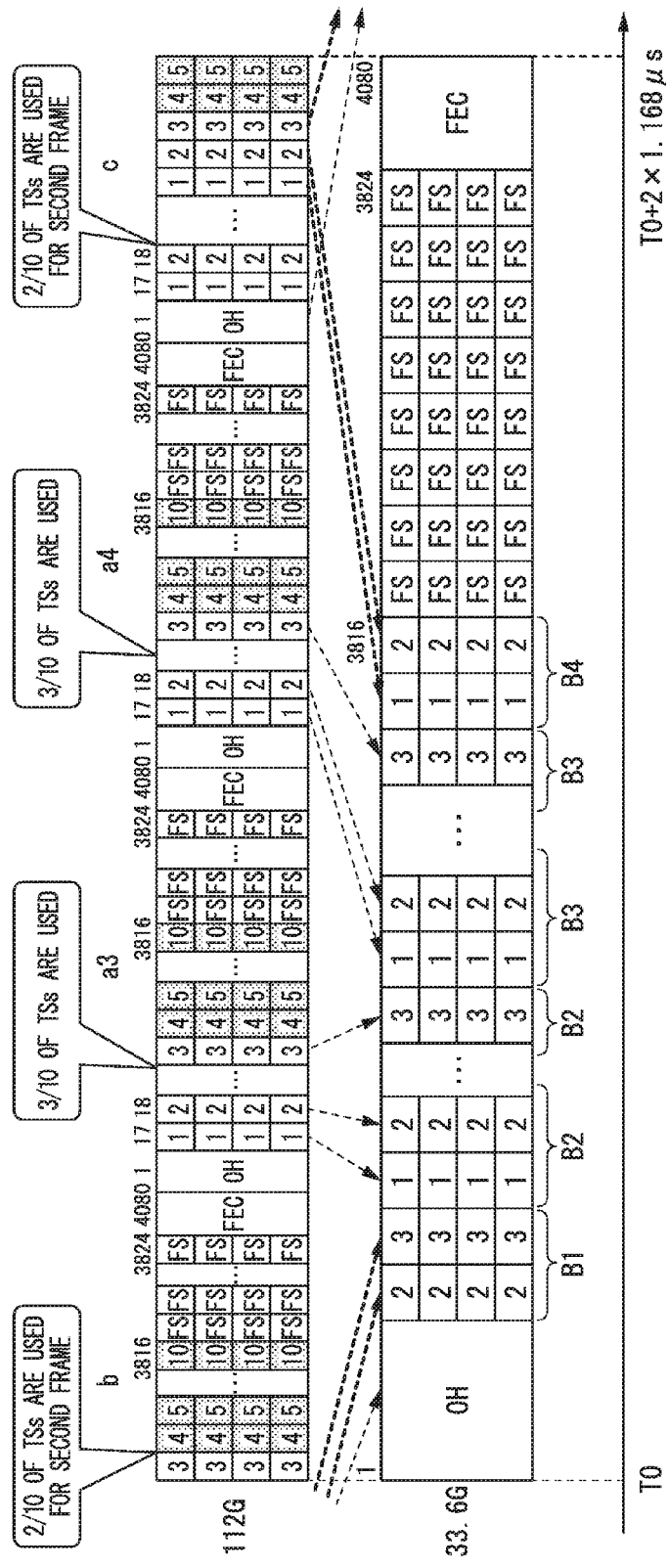
FIG. 38 is a diagram illustrating the transport frame conversion process executed by the transmission-side rate conversion unit in accordance with the eleventh embodiment.
Figure 39:
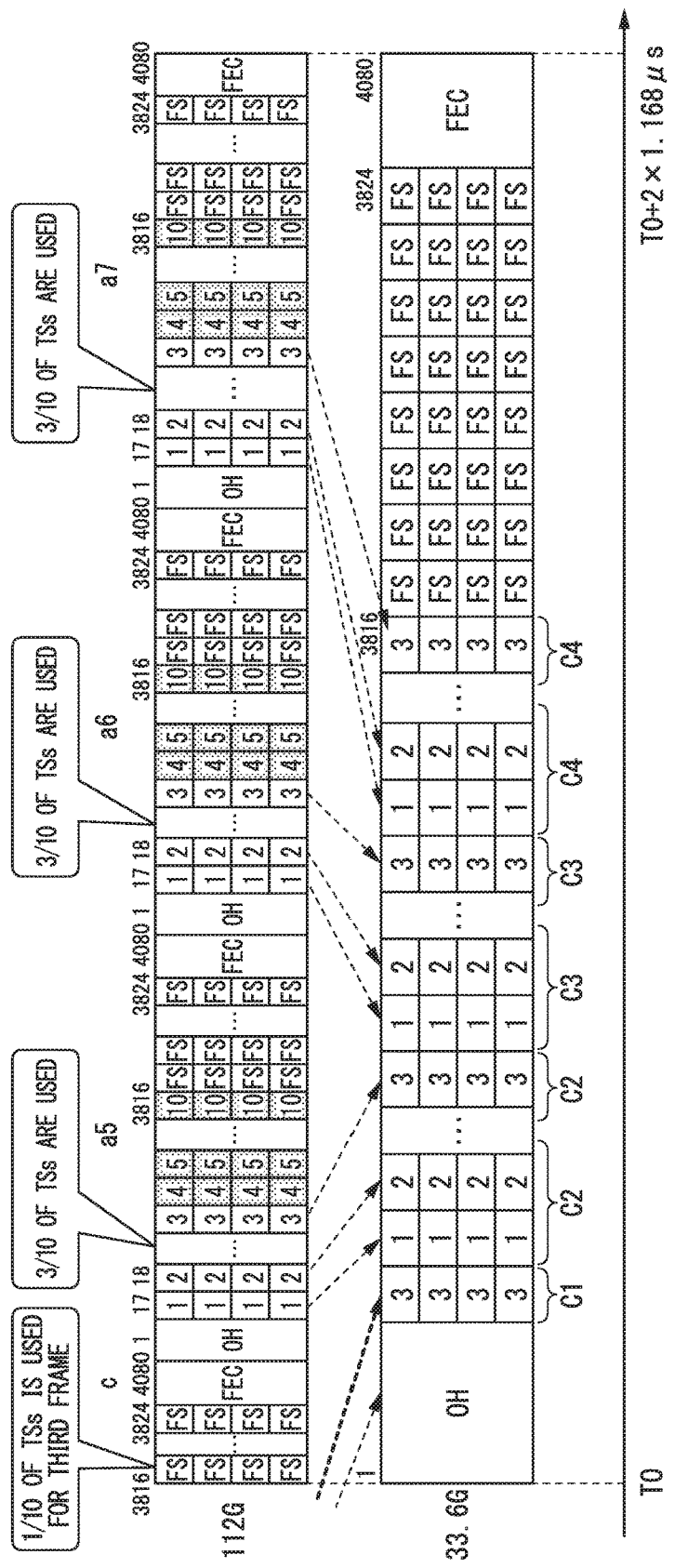
FIG. 39 is a diagram illustrating the transport frame conversion process executed by the transmission-side rate conversion unit in accordance with the eleventh embodiment.

FIGS. 37 to 39 are diagrams illustrating a process of the transmission-side rate conversion unit 1132 converting 100 G transport frames (OTU4: 112 G) into 30 G transport frames (33.6 G) and illustrate the details of FIG. 36.

In FIG. 37, the transmission-side rate conversion unit 1132 extracts the client signals from the 30 G TSs at predetermined positions (TS1 to TS3) of the payload in the first OTU4 100 G transport frame (112 G) (frame number a0). The transmission-side rate conversion unit 1132 maps the extracted client signals to three TSs (TS group A1) among the ten TSs of the payload of the 30 G transport frame (33.6 G). The reason why 3/10 TSs are used is to change the 100 G transport frames (112 G) to the 30 G transport frames (33.6 G).

Further, the transmission-side rate conversion unit 1132 extracts the client signals from the 30 G TSs at predetermined positions (TS1 to TS3) of the payload in the second OTU4 100 G transport frame (112 G) (frame number a1). The transmission-side rate conversion unit 1132 maps the extracted client signals to three TSs (TS group A2) among the ten TSs of the payload of the 30 G transport frame (33.6 G). The transmission-side rate conversion unit 1132 maps the extracted client signals to three TSs (TS group A3) among the ten TSs of the payload of the 30 G transport frame (33.6 G), similarly for the payload in the third OTU4 100 G transport frame (112 G) (frame number a2).

The transmission-side rate conversion unit 1132 extracts the client signals from the 30 G TSs at predetermined positions (TS1 to TS3) of the payload in the fourth OTU4 100 G transport frame (112 G) (frame number b). The transmission-side rate conversion unit 1132 sets 1/3 of the extracted signals in 1/10 TSs (TS group A4) of the payload of the first 30 G transport frame (33.6 G). The transmission-side rate conversion unit 1132 sets the remaining 2/3 client signals in the 2/10 TSs (TS group B1) of the payload of the second 30 G transport frame as illustrated in FIG. 38.

The transmission-side rate conversion unit 1132 extracts the clients signal from the 30 G TSs at predetermined positions (TS1 to TS3) of the payload in each of the fifth and sixth OTU4 100 G transport frames (112 G) (frame numbers a3 and a4). The transmission-side rate conversion unit 1132 maps the extracted client signals to the 3/10 TSs (each of TS groups B2 and B3) of the payload of the 30 G transport frame (33.6 G).

The transmission-side rate conversion unit 1132 extracts the client signals from the 30 G TSs at predetermined positions (TS1 to TS3) of the payload in the seventh OTU4 100 G transport frame (112 G) (frame number c). The transmission-side rate conversion unit 1132 sets 2/3 of the extracted client signals in the 2/10 TSs (TS group B4) of the payload of the second 30 G transport frame (33.6 G). The transmission-side rate conversion unit 1132 sets the remaining 1/3 client signals in the 1/10 TSs (TS group C1) of the payload of the third 30 G transport frame as illustrated in FIG. 39.

The transmission-side rate conversion unit 1132 extracts the client signals from the 30 G TSs at predetermined positions (TS1 to TS3) of the payload in each of the eighth, ninth, and tenth OTU4 100 G transport frames (112 G) (frame numbers a5, a6, and a7). The transmission-side rate conversion unit 1132 maps the extracted client signals to 3/10 TSs (each of TS groups C2, C3, and C4) of the payload of the 30 G transport frame (33.6 G).

The transmission-side rate conversion unit 1132 sets the OH of the first 100 G transport frame (112 G) (frame number a0) in the OH of the first 30 G transport frame (33.6 G), sets the OH of the fourth 100 G transport frame (112 G) (frame number b) in the OH of the second 30 G transport frame (33.6 G), and sets the OH of the seventh 100 G transport frame (112 G) (frame number c) in the OH of the third 30 G transport frame (33.6 G).

The transmission-side rate conversion unit 1132 removes the OTU4 OHs of the second, third, fifth, sixth, eighth, ninth, and tenth frames.

With the above setting, the transmission-side rate conversion unit 1132 generates the 30 G transport frames (33.6 G) from the 100 G transport frames (OTU4: 112 G).

The processes until the error correction decoding unit 1136 of the opposing transponder 1001 outputs the 30 G transport frame having been subjected to the error correction process to the reception-side rate conversion unit 1137 after the transmission-side rate conversion unit 1132 outputs the 30 G transport frame are the same as those of the fourth embodiment.

The transmission-side rate conversion unit 1132 outputs the generated 30 G transport frame to the error correction encoding unit 1133. The error correction encoding unit 1133 appends an error correction code to the 30 G transport frame and transmits the 30 G transport frame having the error correction code appended thereto to the digital signal transmission processing unit 1134. It is to be noted that the error correction encoding unit 1133 may be omitted.

The digital signal transmission processing unit 1134 performs an optical digital coherent process for long-distance transport on the 30 G transport frame and transmits the processed 30 G transport frame to the line signal transceiving unit 1014. It is to be noted that the digital signal transmission processing unit 1134 may be omitted.

The line signal transceiving unit 1014 performs E/O conversion on data of the 30 G transport frame output from the digital signal processing unit 1013 and transmits the optical signal obtained by the conversion to a network as a line signal. The transmitted data is received by the line signal transceiving unit 1014 of the opposing transponder 1001.

The line signal transceiving unit 1014 of the opposing transponder 1001 performs O/E conversion on the received data and then outputs the electrical signal obtained by the conversion to the DSP (the digital signal processing unit 1013). The digital signal reception processing unit 1135 of the digital signal processing unit 1013 performs signal equalization on the received data and outputs a 30 G transport frame. The error correction decoding unit 1136 performs an error correction process on the 30 G transport frame output from the digital signal reception processing unit 1135. The error correction decoding unit 1136 transmits the 30 G transport frame having been subjected to the error correction process to the reception-side rate conversion unit 1137.

The reception-side rate conversion unit 1137 generates 100 G transport frames (OTU4: 112 G) from 30 G transport frames (33.6 G) output by the error correction decoding unit 1136. Specifically, the reception-side rate conversion unit 1137 maps the 3/10 TSs (TS group A1) of the first 30 G transport frame (33.6 G) to the 30 G TSs (e.g., TS1 to TS3) included at predetermined positions of the payload of the first 100 G transport frame. The reception-side rate conversion unit 1137 inserts a dummy signal such as FS into the remaining 70 G TSs (e.g., TS4 to TS10) of the payload of the 100 G transport frame.

Further, the reception-side rate conversion unit 1137 maps the 3/10 TSs (TS group A2) of the first 30 G transport frame (33.6 G) to the 30 G TSs (e.g., TS1 to TS3) included at the predetermined positions of the payload of the second 100 G transport frame. The reception-side rate conversion unit 1137 inserts a dummy signal such as FS into the remaining 70 G TSs (e.g., TS4 to TS10) of the payload of the second 100 G transport frame.

Similarly, the reception-side rate conversion unit 1137 performs a mapping process that is opposite to the transmission-side rate conversion unit 1132 to recover ten 100 G transport frames (OTU4) from three 30 G transport frames.

For example, the reception-side rate conversion unit 1137 extracts the 1/10 TSs (TS group A4) of the first 30 G transport frame (33.6 G) and the 2/10 TSs (TS group B1) of the second 30 G transport frame (33.6 G). The reception-side rate conversion unit 1137 maps these extracted TSs to the 30 G TSs (e.g., TS1 to TS3) included at predetermined positions of the payload of the fourth 100 G transport frame. The reception-side rate conversion unit 1137 inserts a dummy signal such as FS into the remaining 70 G TSs (e.g., TS4 to TS10) of the payload of the second 100 G transport frame.

It is to be noted that the reception-side rate conversion unit 1137 copies the OH of the first 30 G transport frame (33.6 G) to the OH of the first OTU4 frame as it is. The reception-side rate conversion unit 1137 may copy the OH of the first 30 G transport frame to the OHs of the second, third, and fourth OTU4 frames as it is or may insert other data. The reception-side rate conversion unit 1137 copies the OH of the second 30 G transport frame to the OH of the fifth OTU4 frame as it is. The reception-side rate conversion unit 1137 may copy the OH of the second 30 G transport frame to the OHs of the sixth and seventh OTU4 frames as it is or may insert other data. The reception-side rate conversion unit 1137 copies the OH of the third 30 G transport frame to the OH of the eighth OTU4 frame as it is. The reception-side rate conversion unit 1137 may copy the OH of the third 30 G transport frame to the OHs of the ninth and tenth OTU4 frames as it is or may insert other data.

The reception-side rate conversion unit 1137 transmits the recovered ten 100 G transport frames (OTU4: 112 G) to the parallel signal transmitting unit 1138. The parallel signal transmitting unit 1138 transmits the recovered 100 G transport frames (OTU4: 112 G) to the OTU4 framer (the framing processing unit 1012) concurrently via the OTL4.10 interface between the DSP and the OTU4 framer. The parallel signal receiving unit 1125 of the OTU4 framer recovers the 100 G transport frame (OTU4: 112 G). The overhead extracting unit 1126 performs a process relating to an overhead such as error monitoring on the recovered 100 G transport frame (OTU4: 112 G). The dummy signal removing unit 1127 removes the dummy signal set in the 70 G TSs (e.g., TS4 to TS10) at the predetermined positions of the payload from the 100 G transport frame (OTU4: 112 G) having been subjected to the process relating to the overhead. The demapping unit 1128 extracts the client signals from the 100 G transport frame (OTU4: 112 G) from which the dummy signal is removed. It is to be noted that rather than removing the dummy signal, the demapping unit 1128 may directly recover the client signals from the 100 G transport frame (OTU4: 112 G). The demapping unit 1128 transmits the extracted 10 GE×3 client signals to the client signal transceiving unit 1011. The client signal transceiving unit 1011 outputs the client signals received from the framer (the framing processing unit 1012).

In accordance with the present embodiment, it is possible to flexibly perform transfer with a rate (30 G) other than 50 G. The present embodiment is suitable to a case in which it is necessary to perform transfer with a flexible rate due to the advent of a new modulation scheme and a change in the speed of an ADC/DAC.

It is to be noted that the mapping unit 1121, the dummy signal insertion unit 1122, the transmission-side rate conversion units 1132 and 1132a, the reception-side rate conversion units 1137 and 1137a, and the dummy signal removing unit 1127 identify a dummy signal to be removed and the setting position (TSs) of the dummy signal in any one of the following methods.

(1) TSs at the same position are always identified as a dummy signal. The mapping unit 1121 and the reception-side rate conversion units 1137 and 1137a do not set a client signal in predetermined TSs in which the dummy signal is to be set.

(2) Setting values having the same pattern is always used for the dummy signal. The transmission-side rate conversion unit 1132 and the dummy signal removing unit 1127 identify and remove the dummy signal based on the setting values of the TSs.

(3) The position or the pattern of the dummy signal is transferred using an OH of a frame. The overhead inserting unit 1123 sets dummy signal identification information which indicates the TSs in which the dummy signal is set by the dummy signal insertion unit 1122 or the pattern of the dummy signal in the OH. The transmission-side rate conversion units 1132 and 1132a, the reception-side rate conversion units 1137 and 1137a, and the dummy signal removing unit 1127 identify the dummy signal in the payload based on the dummy signal identification information set in the OH.

(4) The position or the pattern of the dummy signal is transferred using FS in a payload. The dummy signal insertion unit 1122 sets dummy signal identification information which indicates the TSs in which the dummy signal is set or the pattern of the dummy signal in FS of the payload. The transmission-side rate conversion units 1132 and 1132a, the reception-side rate conversion units 1137 and 1137a, and the dummy signal removing unit 1127 identify the dummy signal in the payload based on the dummy signal identification information set in the FS.

(5) The position or the pattern of a dummy signal is transferred using a TS in a payload. The dummy signal insertion unit 1122 sets dummy signal identification information which indicates the TSs in which the dummy signal is set or the pattern of the dummy signal in the TS of the payload. The transmission-side rate conversion units 1132 and 1132a, the reception-side rate conversion units 1137 and 1137a, and the dummy signal removing unit 1127 identify the dummy signal in the payload based on the dummy signal identification information set in the TS.

(6) The position or the pattern of the dummy signal is transferred using stuff of GMP in a payload. The dummy signal insertion unit 1122 sets dummy signal identification information which indicates the TSs in which the dummy signal is set or the pattern of the dummy signal in the stuff of GMP in the payload. The transmission-side rate conversion units 1132 and 1132a, the reception-side rate conversion units 1137 and 1137a, and the dummy signal removing unit 1127 identify the dummy signal in the payload based on the dummy signal identification information set in the stuff of GMP.

(7) During activation of the transponders 1001, 1001a, and 1001b, an insertion side and a removal side (the mapping unit 1121, the dummy signal insertion unit 1122, the transmission-side rate conversion units 1132 and 1132a, the reception-side rate conversion units 1137 and 1137a, and the dummy signal removing unit 1127) set the position or the pattern of the dummy signal.

In accordance with the above-described fourth to eleventh embodiments, it is possible to perform framing that can handle the bit rate of a line signal while satisfying the existing conditions on the interface between the framer and the DSP. In particular, these embodiments are advantageous in that it is possible to cope with 150 G-based transport using the 8QAM modulation scheme.

It is to be noted that although the above-described fourth to eleventh embodiments describe examples in which OTU4 is employed between the framer and the DSP, other hierarchies such as OTU1, OTU2, OTU2e, OTU3, and OTU3e may be used and a hierarchy which is standardized in the future may be applied.

Moreover, although the above-described fourth to eleventh embodiments describe the OTN frame by way of example, the present application is not limited thereto, and other frames, such as a synchronous digital hierarchy (SDH) frame, may be used.

Next, in twelfth to sixteenth embodiments below, the first application example illustrated in FIG. 19 will be described in further detail.

<Twelfth Embodiment>

Figure 40:
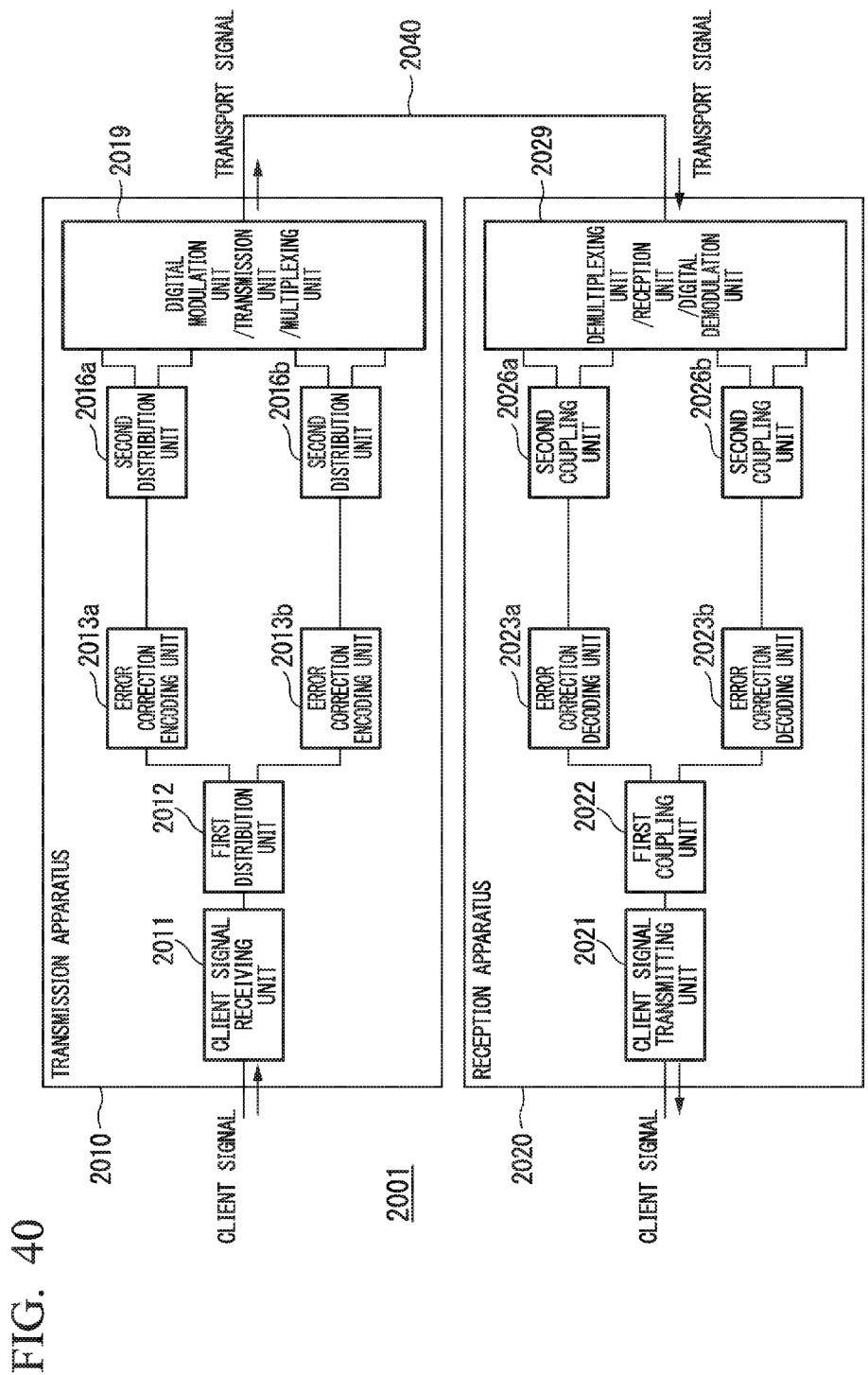
FIG. 40 is a block diagram illustrating a multi-carrier optical transport system in accordance with a twelfth embodiment of the present invention.

FIG. 40 is a schematic block diagram illustrating a configuration of a multi-carrier optical transport system 2001 in accordance with the twelfth embodiment of the present invention. The configuration of the multi-carrier optical transport system 2001 is basically the same as that of the multi-carrier optical transport system 701 illustrated in FIG. 19.

The multi-carrier optical transport system 2001 includes a transmission apparatus 2010, a reception apparatus 2020, and an optical transmission path 2040 that connects the transmission apparatus 2010 and the reception apparatus 2020. In the transmission apparatus 2010, a client signal receiving unit 2011 receives a client signal such as 100 GbE (100 Gbit/s Ethernet (registered trademark)) or OTU4 from an external apparatus connected to the transmission apparatus 2010. Moreover, when the received client signal is an OTU4 frame, the client signal receiving unit 2011 outputs the received client signal as it is. When the received client signal is 100 GbE, the client signal receiving unit 2011 maps the received client signal to an OTU4 frame and outputs the OTU4 frame to which the client signal is mapped. A first distribution unit 2012 divides the OTU4 frame signal output by the client signal receiving unit 2011 into blocks. Here, when the signal is divided into the blocks, the first distribution unit 2012 selects a value which is the value of a divisor of the size of the OTU4 frame and which is equal to or larger than the number of bytes of an overhead element required for a functional unit performing signal processing with reference to the divided signals to detect a frame structure of the OTU4 frame as the size of the divided blocks. For example, in the case of the OTU4 frame, the frame size is 16320 bytes. The divisors of 16320 are 1, 2, 3, 4, 5, 6, 8, 10, 12, 15, 16, 17, 20, . . . , 4080, 5440, 8160, and 16320, and these values are the candidates for a block size. An example of the process of the functional unit that performs signal processing with reference to the distributed signals is an error correction encoding process by error correction encoding units 2013a and 2013b illustrated in FIG. 40. In this process, when a frame structure is detected using FAS bytes only, the first distribution unit 2012 selects a value equal to or larger than 6 bytes, which is the length of the FAS bytes, as the block size. The first distribution unit 2012 divides the OTU4 frame signal into blocks based on the value selected as the block size.

An example of dividing a frame into blocks is as illustrated in FIGS. 10A to 10E. Moreover, the first distribution unit 2012 distributes the divided blocks into two signals SC#1 and SC#2 corresponding to subcarriers in accordance with a round-robin scheme. Here, when the number of the blocks is an even number, FASs at the start of OTU4 frames are distributed to only one lane, and thus lane rotation is performed every frame, and distribution is performed so that the FASs are distributed to two lanes. It is to be noted that the lane rotation involves changing a distribution starting lane every frame. When the number of the blocks is an odd number, the FASs are alternately distributed to two lanes even when the lane rotation is not performed. The error correction encoding units 2013a and 2013b append error correction codes to the signals distributed by the first distribution unit 2012. Here, the error correction encoding units 2013a and 2013b append the error correction codes using an RS (255, 239) defined in the ITU-T Recommendation of Non-Patent Document 1, another encoding scheme having the same redundancy of approximately 7% as the RS (255, 239), or another encoding scheme having a different redundancy (e.g., approximately 20%) from the RS (255, 239).

Second distribution units 2016a and 2016b distribute the signals to which the error correction codes are appended by the error correction encoding units 2013a and 2013b into two signals so as to correspond to X and Y-polarization waves. That is, since the signal is distributed into the signals SC#1 and SC#2 corresponding to subcarriers by the first distribution unit 2012, and the signals are further distributed so as to correspond to the X and Y-polarization waves by the second distribution units 2016a and 2016b, the OTU4 frame signal is distributed to four lanes of SC#1X, SC#1Y, SC#2X, and SC#2Y polarization waves. Moreover, similarly to the first distribution unit 2012, the second distribution units 2016a and 2016b distribute the signals based on the frame size of the signals output by the error correction encoding units 2013a and 2013b and the number of bytes of the overhead element required for a functional unit performing signal processing with reference to the distributed signals to detect the frame structure. For example, in a digital modulation process of a digital modulation unit included in a digital modulation unit/transmission unit/multiplexing unit 2019 connected to the second distribution units 2016a and 2016b, a frame structure may be detected and then a training sequence for estimating chromatic dispersion or the like of a transmission path may be appended. In this case, when the frame structure is detected using the FAS bytes, the second distribution units 2016a and 2016b select a value equal to or larger than 6 bytes, which is the length of the FAS bytes, as the block size and distribute the signals. In the digital modulation unit/transmission unit/multiplexing unit 2019, the digital modulation unit performs modulation in accordance with a 2SC-DP-BPSK scheme on the signals of the SC#1X, SC#1Y, SC#2X, and SC#2Y polarization waves distributed by the second distribution units 2016$a$ and 2016$b$ to multiplex the signals, a transmitting unit transmits the modulated signals, and a multiplexing unit performs wavelength-division multiplexing on the transmitted signals to generate a transport signal. This transport signal is transported through the optical transmission path 2040 over a long distance.

In a demultiplexing unit/reception unit/digital demodulation unit 2029 of the reception apparatus 2020, a demultiplexing unit demultiplexes an optical signal (the transport signal), a receiving unit reads the demultiplexed signals, and a digital demodulation unit performs demodulation on the read signals. As a result, the demultiplexing unit/reception unit/digital demodulation unit 2029 outputs four signals corresponding to the SC#1X, SC#1Y, SC#2X, and SC#2Y polarization waves. Second coupling units 2026$a$ and 2026$b$ detect FAS bytes from two signal blocks of the X and Y-polarization waves. Moreover, the second coupling units 2026$a$ and 2026$b$ perform reordering and de-skewing on the two signal blocks using the detected FAS bytes to reproduce original signals and output the reproduced signals. Error correction decoding units 2023$a$ and 2023$b$ perform an error correction process on the signals output from the second coupling units 2026$a$ and 2026$b$. A first coupling unit 2022 detects FAS bytes from the two signal blocks output from the error correction decoding units 2023$a$ and 2023$b$. Moreover, the first coupling unit 2022 performs reordering and de-skewing on the two signal blocks using the detected FAS bytes to reproduce an original signal having the OTU4 frame structure and outputs the reproduced signal. A client signal transmitting unit 2021 outputs the OTU4 frame signal output by the first coupling unit 2022 as it is, or converts the OTU4 frame signal into a 100 GbE signal and outputs the 100 GbE signal.

With the above configuration of the twelfth embodiment, signals are distributed while maintaining the overhead element (e.g., the area of the FAS bytes) required for the first distribution unit 2012 and the second distribution units 2016$a$ and 2016$b$ to detect the frame structure. As a result, it is possible to detect the frame structure even in the distributed signals output by the first distribution unit 2012 and the second distribution units 2016$a$ and 2016$b$. Thus, it is possible to perform signal processing which uses the frame structure such as an error correction encoding process after the signals are distributed. As a result, it is possible to increase the degree of freedom in the layout of circuit elements in such a way that circuit elements that perform the signal processing can be divided and disposed at a subsequent stage of the distribution units. Moreover, functions which cannot be achieved with a single device due to a constraint on the circuit scale can be achieved with a plurality of divided devices.

It is to be noted that in the above configuration of the twelfth embodiment, the functional unit that refers to the signals distributed by the first distribution unit 2012 and the second distribution units 2016$a$ and 2016$b$ may detect the frame structure by referring to both the FAS bytes and a multi-frame alignment signal (MFAS) byte, rather than the FAS bytes only. In this case, the first distribution unit 2012 and the second distribution units 2016$a$ and 2016$b$ select a value equal to or larger than 7 bytes, which is the length of the FAS+MFAS bytes, as the block size. Moreover, when the functional unit that refers to the distributed signals uses one row of the frame structure having 4 rows by 4080 columns in addition to the FAS bytes and the MFAS byte as its processing units, a value equal to or larger than 4080 bytes is selected as the block size. Moreover, when a value equal to or larger than 7 bytes, which is the length of the FAS+MFAS bytes, is selected, the first coupling unit 2022 and the second coupling units 2026$a$ and 2026$b$ of the reception apparatus 2020 may detect the MFAS byte in addition to the FAS bytes when coupling the two signal blocks and perform reordering and de-skewing on the two signal blocks using the detected FAS and MFAS bytes to reproduce the original signal.

Moreover, in the second distribution units 2016$a$ and 2016$b$, even when a value exceeding the block size used for the first distribution unit 2012 to perform division into the blocks is selected, it is not possible to detect the frame structure using an overhead element corresponding to the selected value. For example, when the first distribution unit 2012 selects 6 bytes of the FAS bytes as the block size, even if the second distribution units 2016$a$ and 2016$b$ select 7 bytes of the FAS+MFAS bytes as the block size, since the first distribution unit 2012 does not perform the division so as to maintain the information of the MFAS byte, the pattern of the MFAS bytes is not maintained in the signals distributed by the second distribution units 2016$a$ and 2016$b$. Thus, the value of the block size selectable by the second distribution units 2016$a$ and 2016$b$ is a value equal to or smaller than the block size selected by the first distribution unit 2012. As a result, the block size selected by the first distribution unit 2012 needs to be selected by taking the number of bytes of the overhead element required for a functional unit performing signal processing by referring to the signals distributed by the second distribution units 2016$a$ and 2016$b$ to detect the frame structure into consideration.

Moreover, in the above configuration of the twelfth embodiment, the error correction encoding units 2013$a$ and 2013$b$ that perform error correction encoding and the digital modulation unit of the digital modulation unit/transmission unit/multiplexing unit 2019 that appends the training sequence for estimating the chromatic dispersion or the like of the transmission path have been described as an example of the functional unit that performs signal processing by referring to the distributed signals. Examples of the signal processing which uses the frame structure include processes such as scrambling, inserting and deleting a training sequence for digital signal processing or the like, and accessing overhead information, in addition to the processing of such functional units.

Moreover, in the above configuration of the twelfth embodiment, an OTU4 frame of which standard frame size is 16320 bytes has been described as an example of a frame of a signal. However, the frame configuration is not limited to that of this embodiment, and an OTU4V signal or the like having a different frame size than the OTU4 frame may be applied. In this case, a value which is a divisor of the frame size and which is equal to or larger than the number of bytes of an overhead element required for a functional unit performing signal processing by referring to the distributed signals to detect a frame structure is selected as the block size.

Figure 41:
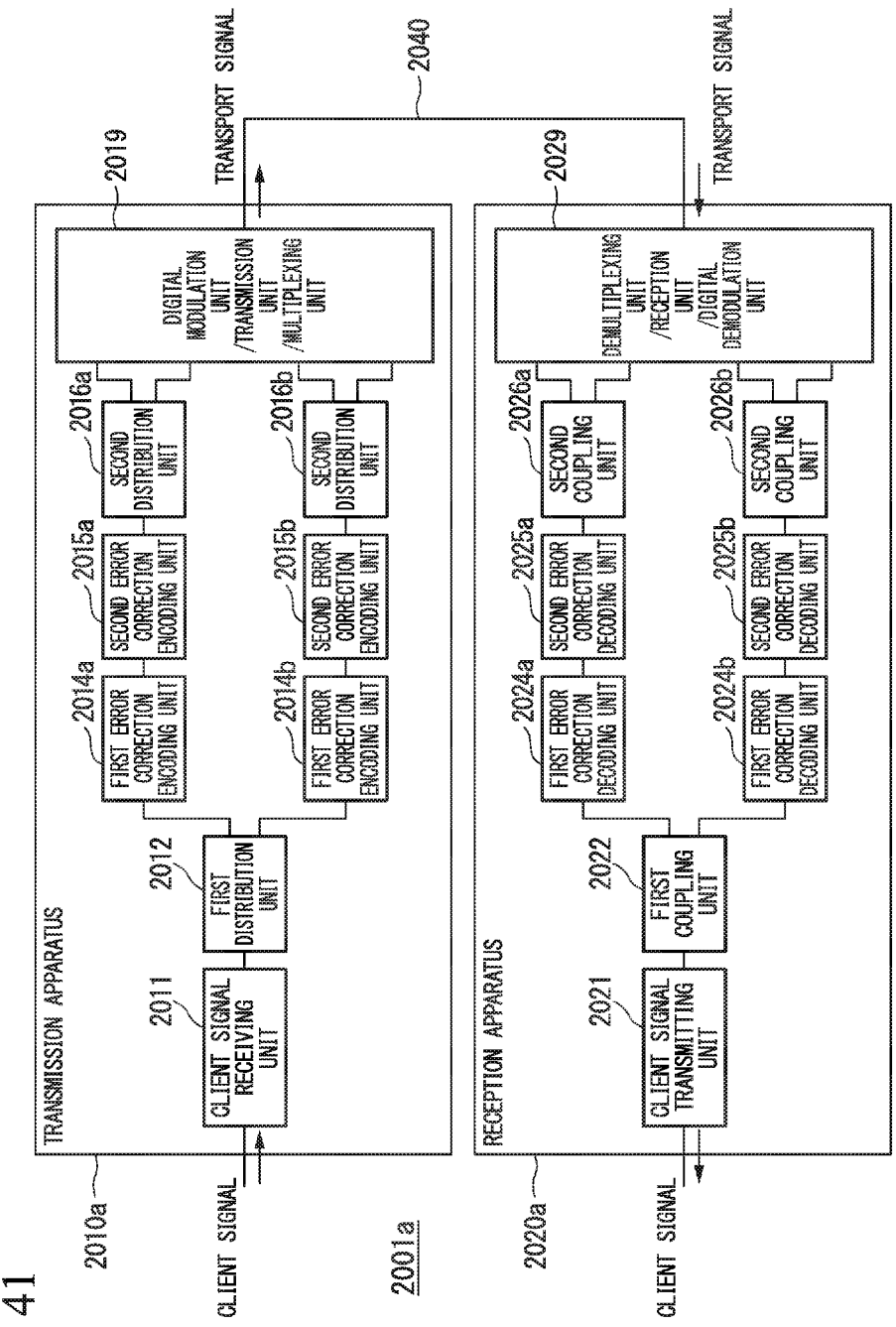
FIG. 41 is a block diagram illustrating a modified example of the multi-carrier optical transport system in accordance with the twelfth embodiment.

Moreover, as a modified example of the twelfth embodiment, as in a multi-carrier optical transport system 2001$a$ illustrated in FIG. 41, functional units that perform an error correction encoding process may be divided into a plurality of stages like first error correction encoding units 2014$a$ and 2014$b$ and second error correction encoding units 2015$a$ and 2015$b$.

Figure 42:
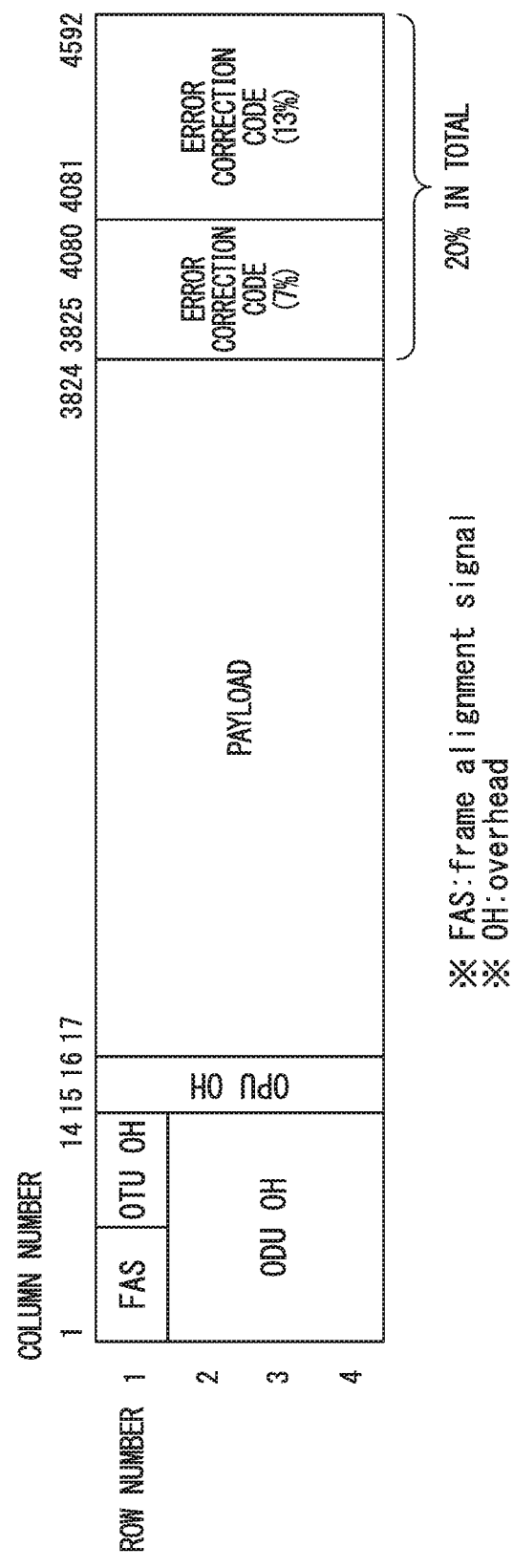
FIG. 42 is a diagram illustrating a technique of appending an error correction code in accordance with the modified example of the twelfth embodiment.

In the configuration of FIG. 41, the first error correction encoding units 2014a and 2014b perform hard decision-forward error correction (HD-FEC) with a redundancy of approximately 7% and the second error correction encoding units 2015a and 2015b perform soft decision-forward error correction (SD-FEC) with a redundancy of approximately 13%. As a result, it is possible to perform error correction encoding with a redundancy of approximately 20% in total. Specifically, this error correction encoding is a process of forming a frame having 4592 columns as illustrated in FIG. 42, for example. First, the first error correction encoding units 2014a and 2014b each append an error correction code with a redundancy of approximately 7% to an area of 3825th to 4080th columns of the frame. Then, the second error correction encoding units 2015a and 2015b each append an error correction code with a redundancy of approximately 13% to an area of 4081st to 4592nd columns of the frame. It is to be noted that an accurate redundancy of this example is calculated as follows. For the FEC with the redundancy of approximately 7%, since an error correction code of $4\times(4080-3824)$ bytes is appended to $4\times3824$-byte data, the redundancy is $4\times(4080-3824)/(4\times3824)=6.7\%$. Moreover, for the FEC with the redundancy of approximately 13%, since an error correction code of $4\times(4592-4080)$ bytes is appended to $4\times3824$-byte data, the redundancy is $4\times(4592-4080)/(4\times3824)=13.4\%$. Both redundancies are summed to be a total redundancy of 20.1%. Moreover, in this case, the entire frame size is $4\times4592=18368$ bytes. Thus, the second distribution units 2016a and 2016b select the block size from among the divisors of 18368 (i.e., 1, 2, 4, 7, 8, 14, 16, 28, 32, . . . , 4592, 9184, 18368) while taking the fact that the digital modulation unit/transmission unit/multiplexing unit 2019 detects the frame structure into consideration.

It is to be noted that the reception apparatus 2020a includes two stages of decoding units which are second error correction decoding units 2025a and 2025b and first error correction decoding units 2024a and 2024b so as to correspond to the configuration of the transmission apparatus 2010a.

When the error correction process is performed in a plurality of stages and error correction encoding is performed in a concatenated manner as in the modified example of the twelfth embodiment, it is possible to achieve an error correction performance having a high redundancy of approximately 20% in total in addition to the advantages obtained by the configuration of the twelfth embodiment illustrated in FIG. 40. Moreover, since the functional units of the error correction encoding are divided into two, it is possible to increase the degree of freedom of the layout of the circuit elements.

<Thirteenth Embodiment>

Figure 43:
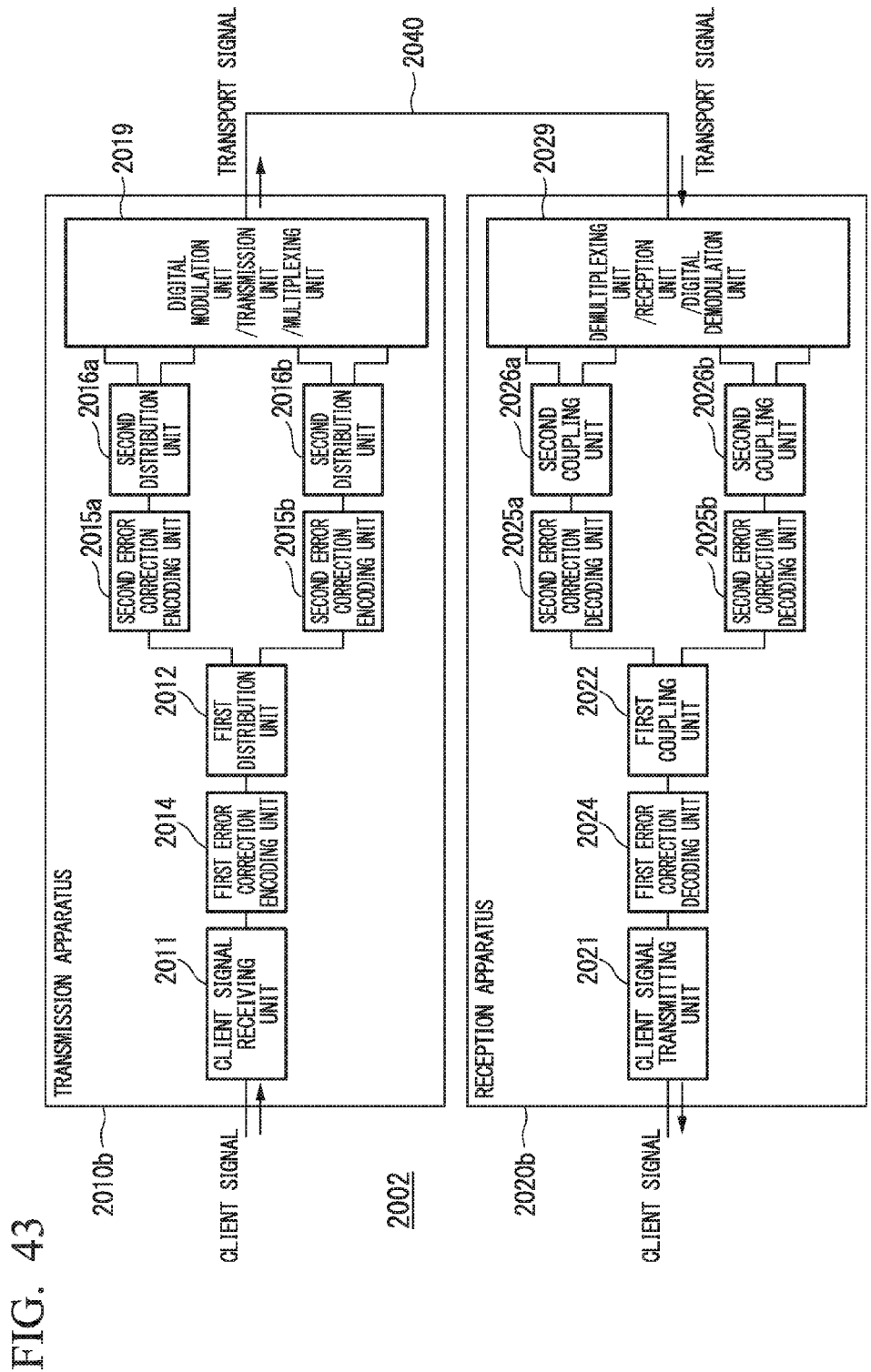
FIG. 43 is a diagram illustrating a multi-carrier optical transport system in accordance with a thirteenth embodiment of the present invention.

Next, the thirteenth embodiment of the present invention will be described. FIG. 43 is a schematic block diagram illustrating a multi-carrier optical transport system 2002 in accordance with the thirteenth embodiment of the present invention. The multi-carrier optical transport system 2002 also performs transport of 100 Gbit/s in accordance with the 2SC-DP-BPSK scheme, similarly to the multi-carrier optical transport system of the twelfth embodiment. In FIG. 43, the same configurations as those of the twelfth embodiment will be denoted by the same reference numerals. Hereinafter, the configurations different from those of the multi-carrier optical transport system 2001a illustrated in FIG. 41, which is the modified example of the twelfth embodiment, will be described. The multi-carrier optical transport system 2002 includes two stages of error correction encoding units and two stages of error correction decoding units (i.e., first and second error correction encoding units and first and second error correction decoding units), similarly to the multi-carrier optical transport system 2001a. However, the multi-carrier optical transport system 2002 is different from the multi-carrier optical transport system 2001a in that a first error correction encoding unit 2014 is disposed before the first distribution unit 2012 and a first error correction decoding unit 2024 is disposed after the first coupling unit 2022. Moreover, also in the multi-carrier optical transport system 2002, the first error correction encoding unit 2014 performs HD-FEC with a redundancy of approximately 7% and the second error correction encoding units 2015a and 2015b perform SD-FEC with a redundancy of approximately 13%, for example, similarly to the multi-carrier optical transport system 2001a.

Figure 44:
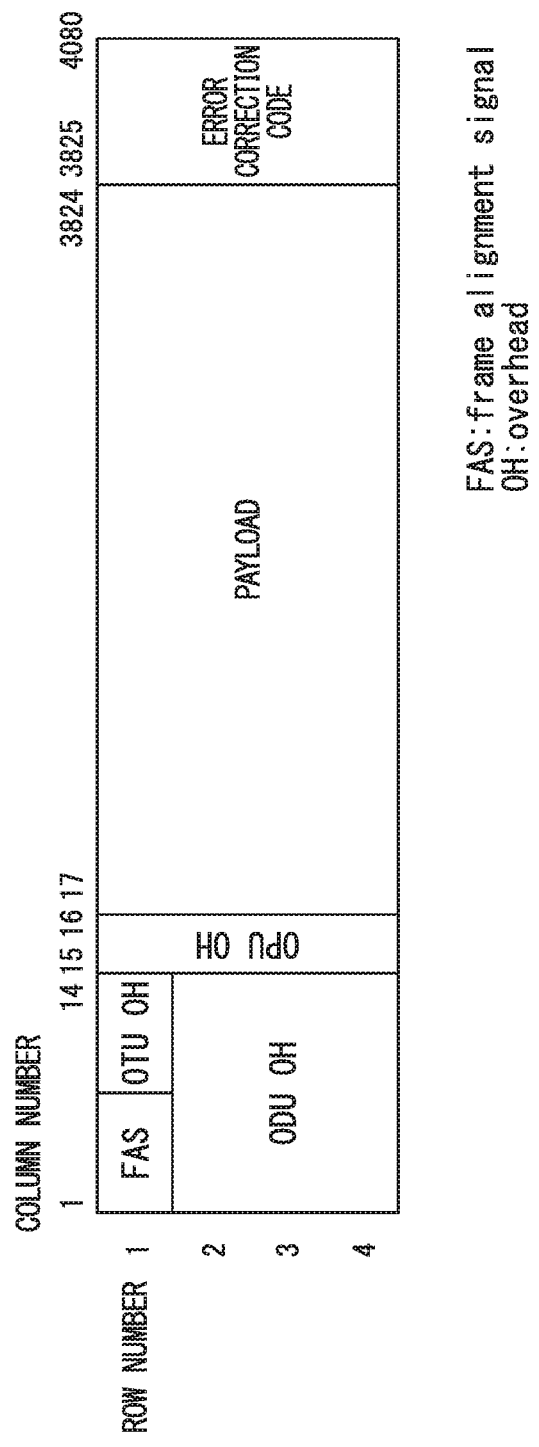
FIG. 44 is a diagram illustrating a configuration of an OTU frame.
Figure 45:
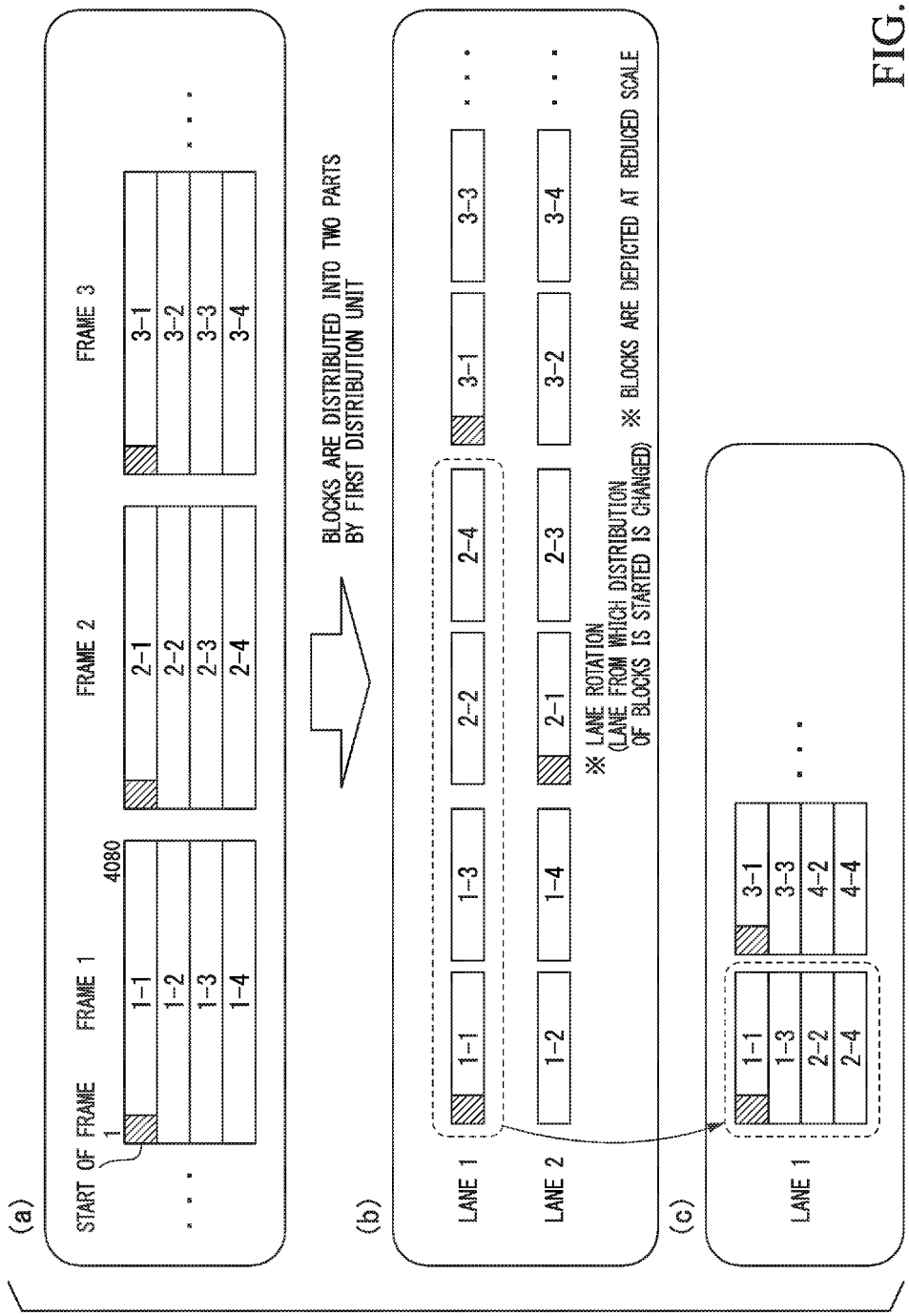
FIG. 45 is a diagram (first example) illustrating a technique of appending an error correction code in accordance with the thirteenth embodiment.

A process of appending an error correction code by the multi-carrier optical transport system 2002 of the thirteenth embodiment will be described. In FIG. 43, the client signal receiving unit 2011 outputs an OTU frame illustrated in FIG. 44. However, in the output signal, the error correction code has not yet been written to an error correction code area of 3825th to 4080th columns. The first error correction encoding unit 2014 writes an error correction code to the error correction code area of the 3825th to 4080th columns of the OTU frame output by the client signal receiving unit 2011. As illustrated in FIG. 45(a), the first distribution unit 2012 divides a frame of 4 rows by 4080 columns in units of 4080 bytes (i.e., division into blocks is performed so that one row corresponds to one block). Here, the divided blocks of frame 1 are referred to as blocks 1-1, 1-2, 1-3, and 1-4. In the subsequent frames, similarly, the divided blocks of frame 2 are referred to as blocks 2-1, 2-2, 2-3, and 2-4, and the divided blocks of frame 3 are referred to as blocks 3-1, 3-2, 3-3, and 3-4. When a frame is output from the first error correction encoding unit 2014 to the first distribution unit 2012, the transport order in the frame is such that the first byte to the 4080th byte of the first row are first transported and then the first byte to the 4080th byte of the second row are transported. This is repeated for each frame. The first distribution unit 2012 distributes the signal having a frame structure illustrated in FIG. 45(a) to two lanes on a block-by-block basis as illustrated in FIG. 45(b). For example, the blocks 1-1, 1-2, 1-3, and 1-4 of frame 1 are alternately distributed in the order of lane 1 and lane 2.

Figure 46:
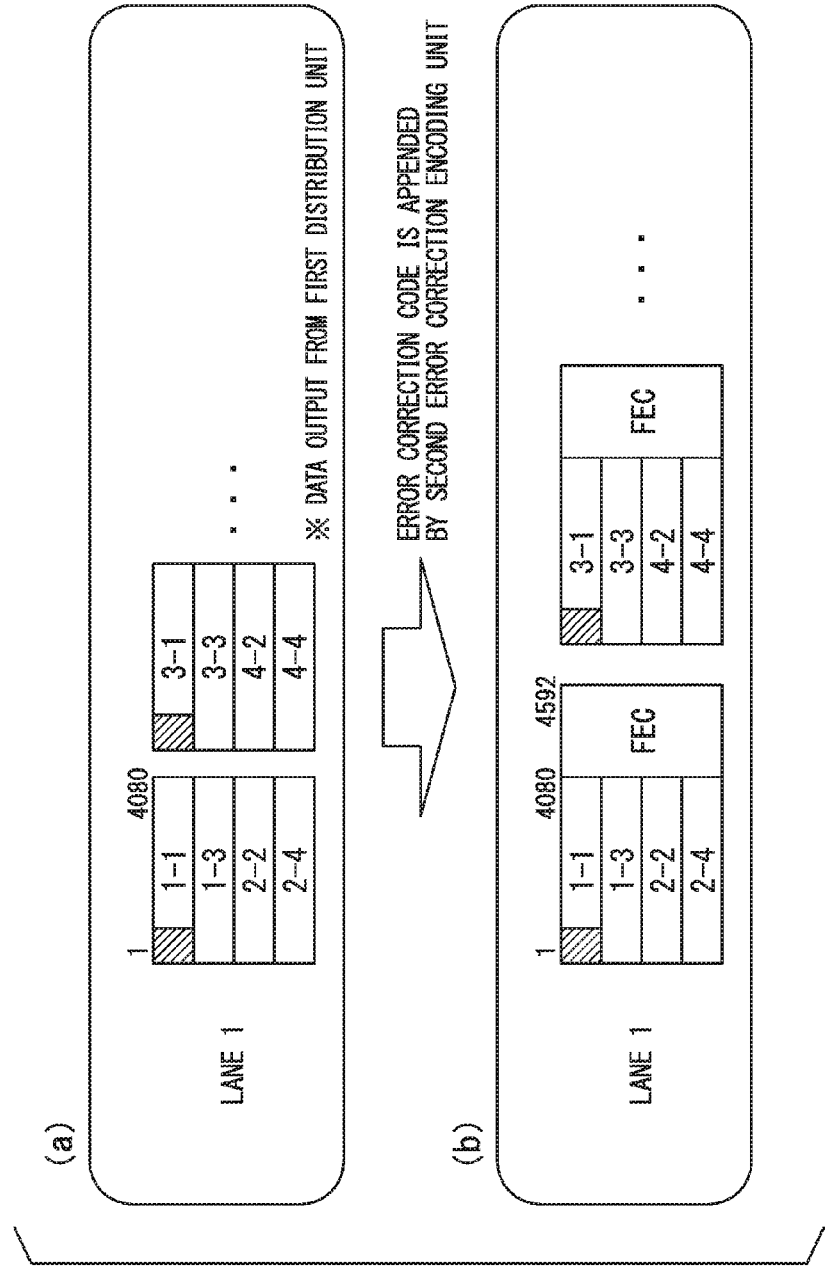
FIG. 46 is a diagram (second example) illustrating a method of appending an error correction code in accordance with the thirteenth embodiment.

When distribution of blocks of one frame ends, the first distribution unit 2012 performs lane rotation (i.e., performs distribution while changing the distribution starting lane of the blocks). For example, blocks 2-1, 2-2, 2-3, and 2-4 of frame 2 are alternately distributed in the order of lane 2 and lane 1. As a result, areas of the overhead element at the start of the frames indicated by back slashes in the blocks illustrated in FIGS. 45(a) and 45(b) appear in the two lanes. Focusing on the signals of one lane of the distributed blocks, when a block including an overhead element and blocks before a block including the next overhead element (e.g., the blocks 1-1, 1-3, 2-2, and 2-4 surrounded by broken lines of lane 1 in FIG. 45(b)) are regarded as a group, this can be regarded as a signal having such a frame structure as illustrated in FIG. 45(c). The second error correction encoding units 2015a and 2015b regard the signals illustrated in FIG. 46(a) (which is a duplication of FIG. 45(c)) output from the first distribution unit 2012 as signals having a frame structure of 4 rows by 4080 columns, append areas of 4081st to 4592nd columns as illustrated in FIG. 46(b), and write error correction codes to the areas.

In the above configuration of the thirteenth embodiment, signals are distributed while maintaining the overhead element (e.g., areas of the FAS and MFAS bytes) required for the first distribution unit 2012 and the second distribution units 2016*a* and 2016*b* to detect the frame structure, similarly to the twelfth embodiment. As a result, it is possible to detect the frame structure even in the distributed signals output by the first distribution unit 2012 and the second distribution units 2016*a* and 2016*b*. Thus, it is possible to perform signal processing which uses the frame structure such as an error correction encoding process after the signals are distributed. As a result, it is possible to increase the degree of freedom in the layout of circuit elements in such a way that circuit elements that perform the signal processing can be divided and disposed at a subsequent stage of the distribution units. Moreover, functions which cannot be achieved with a single device due to a constraint on the circuit scale can be achieved by dividing the circuit elements into a plurality of chips.

Moreover, in the above configuration of the thirteenth embodiment, the first error correction encoding unit 2014 is disposed before the first distribution unit 2012 and the second error correction encoding units 2015*a* and 2015*b* are disposed after the first distribution unit 2012. Moreover, the first error correction encoding unit 2014 performs HD-FEC with a redundancy of approximately 7%, and the second error correction encoding units 2015*a* and 2015*b* perform SD-FEC with a redundancy of approximately 13%. When the two error correction encoding processes are concatenated in this manner, it is possible to achieve a performance having a high redundancy of approximately 20% in total.

Moreover, in the above configuration of the thirteenth embodiment, the first error correction decoding unit 2024 of the reception apparatus 2020*b* performs an error correction process on the entire signal (in the above example, on the entire 100 Gbit/s signal). In contrast, the second error correction decoding units 2025*a* and 2025*b* perform an error correction process on two branched signals (in the above example, 50 Gbit/s signals). Thus, even when the bit error rate of one of the two 50 G signals deteriorates, since the first error correction decoding unit 2024 at a subsequent stage further performs error correction on the 100 Gbit/s signal obtained by merging the two 50 G signals, it is possible to provide a higher error correction performance and to improve the signal quality.

<Fourteenth Embodiment>

Figure 47:
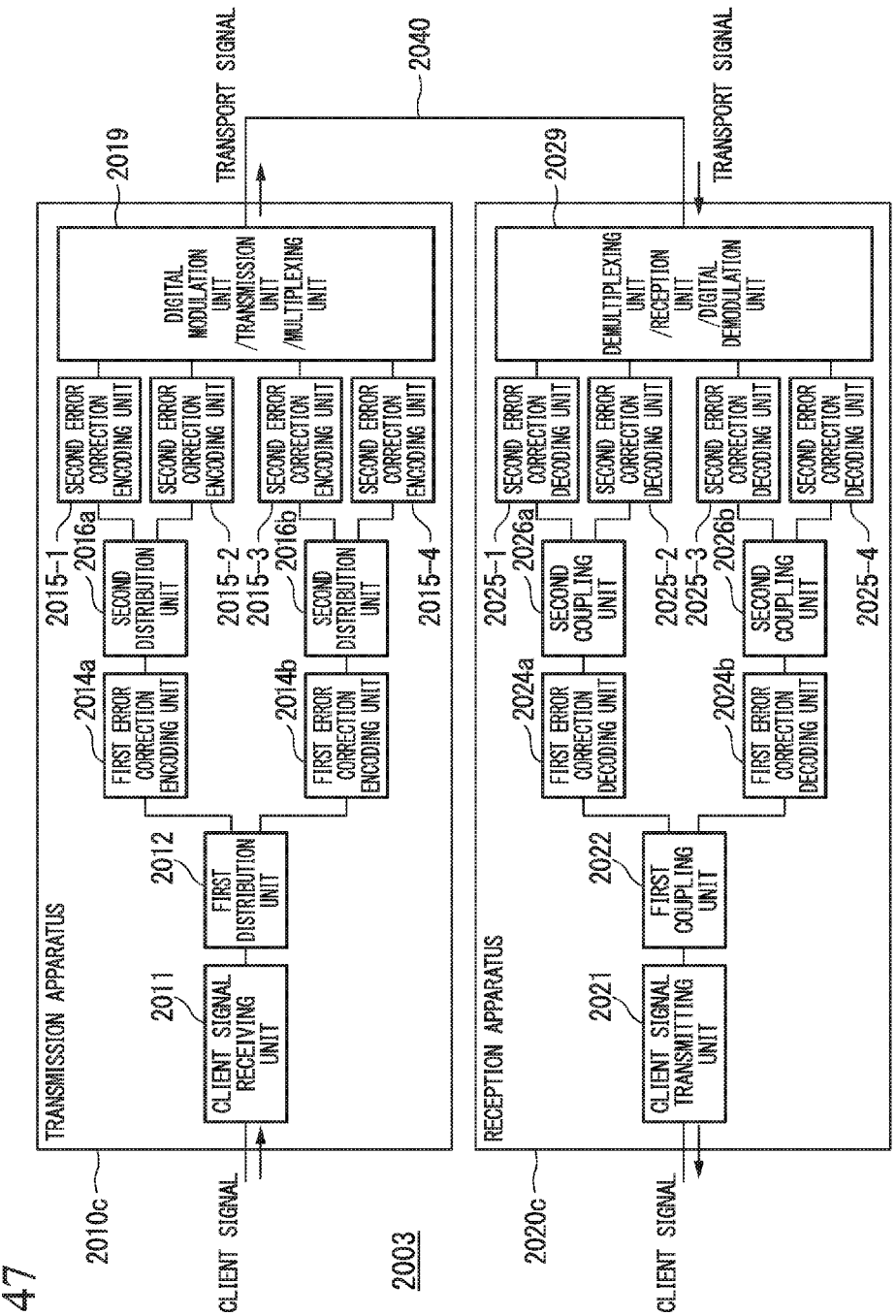
FIG. 47 is a diagram illustrating a multi-carrier optical transport system in accordance with a fourteenth embodiment of the present invention.

Next, the fourteenth embodiment of the present invention will be described. FIG. 47 is a schematic block diagram illustrating a multi-carrier optical transport system 2003 in accordance with the fourteenth embodiment of the present invention. The multi-carrier optical transport system 2003 also performs transport with the rate of 100 Gbit/s in accordance with the 2SC-DP-BPSK scheme, similarly to the multi-carrier optical transport systems of the twelfth and thirteenth embodiments. In FIG. 47, the same configurations as those of the twelfth and thirteenth embodiments will be denoted by the same reference numerals. Hereinafter, the configurations different from those of the multi-carrier optical transport system 2001*a* illustrated in FIG. 41, which is the modified example of the twelfth embodiment, will be described. The multi-carrier optical transport system 2003 also includes two stages of error correction encoding units and two stages of error correction decoding units (i.e., first and second error correction encoding units and first and second error correction decoding units), similarly to the multi-carrier optical transport system 2001*a*. However, the multi-carrier optical transport system 2003 is different from the multi-carrier optical transport system 2001*a* in that second error correction encoding units 2015-1 and 2015-2 and second error correction encoding units 2015-3 and 2015-4 are disposed after the second distribution units 2016*a* and 2016*b*. Moreover, the multi-carrier optical transport system 2003 is different from the multi-carrier optical transport system 2001*a* in that second error correction decoding units 2025-1 and 2025-2 and second error correction decoding units 2025-3 and 2025-4 of a reception apparatus 2020*c* are disposed before the second coupling units 2026*a* and 2026*b* so as to correspond to the configuration of a transmission apparatus 2010*c*. Also in the configuration of the fourteenth embodiment, the first error correction encoding units 2014*a* and 2014*b* perform HD-FEC with a redundancy of approximately 7% and the second error correction encoding units 2015-1, 2015-2, 2015-3, and 2015-4 perform SD-FEC with a redundancy of approximately 13%, for example, similarly to the multi-carrier optical transport system 2001*a*.

A process of dividing a signal into blocks and appending an error correction code by the multi-carrier optical transport system 2003 in accordance with the fourteenth embodiment will be described. First, the first distribution unit 2012 divides a signal into blocks having a block size of 4080 bytes and distributes the obtained block signals to two lanes. This distribution process is the same as the above process described with reference to FIGS. 45(*a*) and 45(*b*). With the distribution process, signals illustrated in FIG. 45(*c*) are supplied to the first error correction encoding units 2014*a* and 2014*b*. The blocks 1-1, 1-3, 2-2, and 2-4, which is the configuration of the first signal in FIG. 45(*c*), have the same size as the signal of each frame of FIG. 45(*a*), and the 3825th to 4080th columns thereof are an error correction code area. The first error correction encoding units 2014*a* and 2014*b* each write an error correction code to this area. The second distribution units 2016*a* and 2016*b* each select a value equal to or larger than 6 bytes, which is the size of the FAS bytes, as the size of divided blocks, for example, divide the signal into blocks, and distribute signals of the obtained blocks. By distributing the signals in this manner, signals which have a frame size of 4×4080 bytes and in which FASs, each of which is the start of a frame, appear periodically in the lanes distributed by the second distribution units 2016*a* and 2016*b* are obtained. The second error correction encoding units 2015-1, 2015-2, 2015-3, and 2015-4 each append an area of the 4081st to 4592nd columns to the signals and write an error correction code having a redundancy of approximately 13% to the area.

In the above configuration of the fourteenth embodiment, signals are distributed while maintaining the configuration of the overhead element (e.g., areas of the FAS and MFAS bytes) required for the first distribution unit 2012 and the second distribution units 2016*a* and 2016*b* to detect the frame structure, similarly to the twelfth and thirteenth embodiments. As a result, it is possible to detect the frame structure even in the distributed signals output by the first distribution unit 2012 and the second distribution units 2016*a* and 2016*b*. Thus, it is possible to perform signal processing which uses the frame structure such as an error correction encoding process after the signals are distributed. As a result, circuit elements that perform the signal processing can be divided and disposed at a subsequent stage of the distribution units. In the fourteenth embodiment, since the second error correction encoding unit is divided into four units, it is possible to achieve a more flexible arrangement than in the multi-carrier optical transport system 2001*a*. By increasing the degree of freedom of the layout in this manner, functions which cannot be achieved with a single device due to a constraint on the circuit scale can be achieved by dividing the circuit elements into a plurality of chips.

Moreover, in the above configuration of the fourteenth embodiment, the first error correction encoding units 2014*a* and 2014*b* are disposed after the first distribution unit 2012, and the second error correction encoding units 2015-1 and 2015-2 and the second error correction encoding units 2015-3 and 2015-4 are disposed after the second distribution units 2016*a* and 2016*b*. Moreover, the first error correction encoding units 2014*a* and 2014*b* perform HD-FEC with a redundancy of approximately 7%, and the second error correction encoding units 2015-1, 2015-2, 2015-3, and 2015-4 perform SD-FEC with a redundancy of approximately 13%. When the two error correction encoding processes are concatenated in this manner, it is possible to achieve a performance having a high redundancy of approximately 20% in total.

Moreover, as the above configurations of the twelfth, thirteenth, and fourteenth embodiments, a configuration in which the first distribution unit 2012 and the second distribution units 2016*a* and 2016*b* each distribute signals to two has been described, but the number of distributions may be larger than two. For example, when N subcarriers are used rather than 2 subcarriers, the first distribution unit 2012 distributes signals to N. Moreover, for example, when DP-QPSK or DP-16 QAM, each of which is another multi-level modulation scheme, is used as a modulation scheme, rather than DP-BPSK, the number of distributions of the second distribution units 2016*a* and 2016*b* may be larger than two.

<Fifteenth Embodiment>

Figure 48:
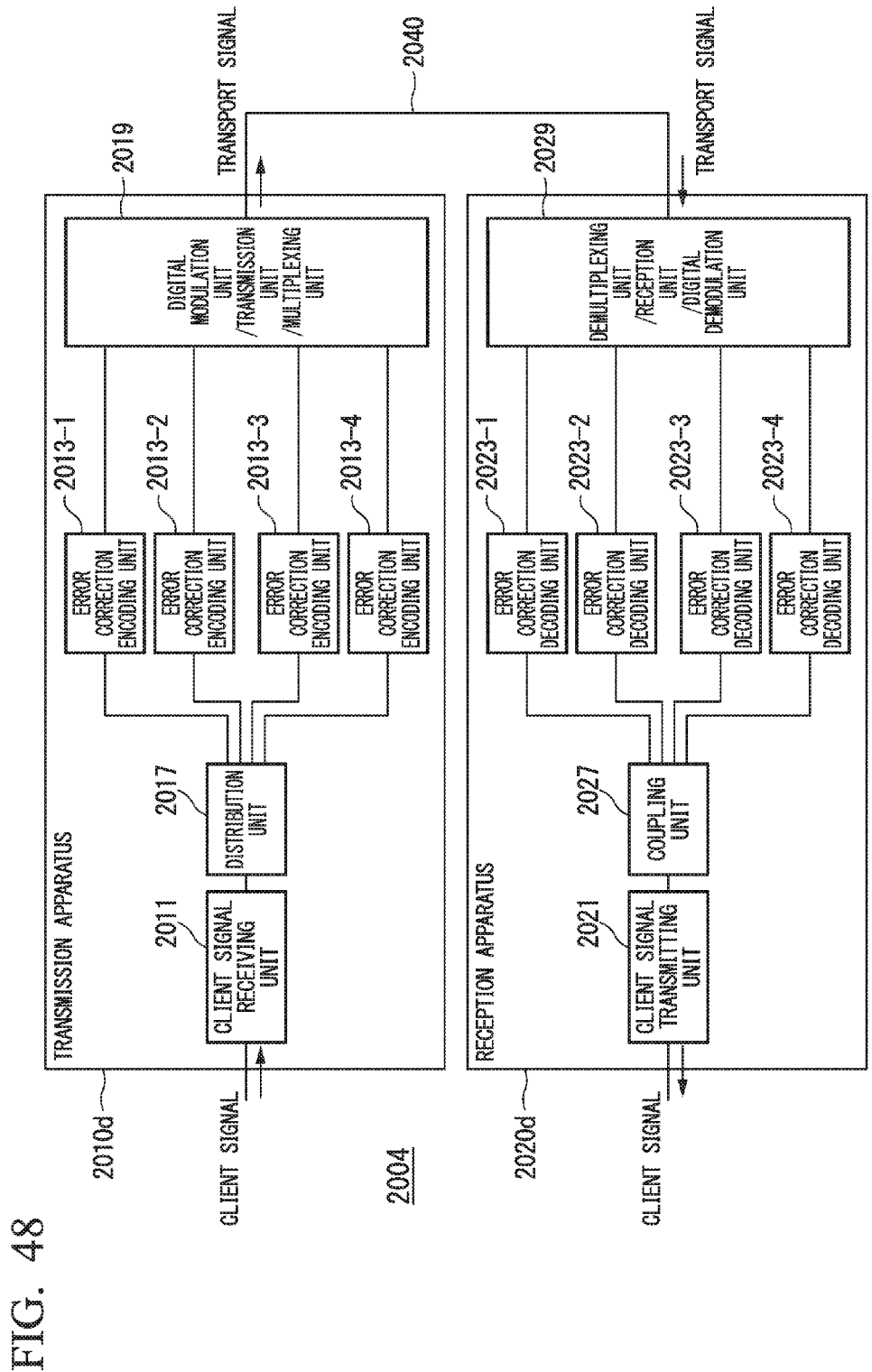
FIG. 48 is a diagram illustrating a multi-carrier optical transport system in accordance with a fifteenth embodiment of the present invention.

Next, the fifteenth embodiment of the present invention will be described. FIG. 48 is a schematic block diagram of a multi-carrier optical transport system 2004 in accordance with the fifteenth embodiment of the present invention. The multi-carrier optical transport system 2004 also performs transport with the rate of 100 Gbit/s in accordance with the 2SC-DP-BPSK scheme, similarly to the multi-carrier optical transport systems of the twelfth, thirteenth, and fourteenth embodiments. In FIG. 48, the same configurations as those of the twelfth, thirteenth, and fourteenth embodiments will be denoted by the same reference numerals. Hereinafter, the configurations different from those of the multi-carrier optical transport system 2001 of the twelfth embodiment illustrated in FIG. 40 will be described. The multi-carrier optical transport system 2001 is configured to include the first distribution unit 2012, two error correction encoding units 2013*a* and 2013*b* disposed in the two lanes distributed by the first distribution unit 2012, and the second distribution units 2016*a* and 2016*b* that further distribute signals having error correction codes appended thereto. In contrast, the multi-carrier optical transport system 2004 has a configuration in which the order of arrangement of the first distribution unit 2012, the error correction encoding units 2013*a* and 2013*b*, and the second distribution units 2016*a* and 2016*b* of the multi-carrier optical transport system 2001 is changed to the order of arrangement of the first distribution unit 2012, the second distribution units 2016*a* and 2016*b*, and the error correction encoding units 2013*a* and 2013*b*, the first distribution unit 2012 and the second distribution units 2016*a* and 2016*b* are integrated into one distribution unit 2017, and the four error correction encoding units 2013-1, 2013-2, 2013-3, and 2013-4 are disposed. A reception apparatus 2020*d* is configured such that four error correction decoding units 2023-1, 2023-2, 2023-3, and 2023-4 are disposed after the demultiplexing unit/reception unit/digital demodulation unit 2029 and a coupling unit 2027 that couples four divided signals is provided so as to correspond to the configuration of a transmission apparatus 2010*d*.

A difference between the multi-carrier optical transport system 2004 of the fifteenth embodiment and the multi-carrier optical transport system 2001 of the twelfth embodiment lies in the number of error correction encoding units and units of the processing. The multi-carrier optical transport system 2001 illustrated in FIG. 40 includes two error correction encoding units 2013*a* and 2013*b* and each processes 50 Gbit/s signals. In contrast, the multi-carrier optical transport system 2004 illustrated in FIG. 48 includes four error correction encoding units 2013-1, 2013-2, 2013-3, and 2013-4 and each processes 25 Gbit/s signals. In general, the higher the performance of an error correction encoding unit and the higher the data rate processed by the error correction encoding unit, the larger the size of the error correction encoding unit. Thus, when the same performance is to be achieved, the lower the data rate processed, the smaller the circuit size. For example, when it is desired to use an error correction code having an extremely high accuracy, due to a constraint on the size when forming an LSI or a field programmable gate array (FPGA), or the like, the circuit size may become too large and it is difficult to form the LSI or the FPGA if the two error correction encoding units 2013*a* and 2013*b* illustrated in FIG. 40 are used. Even in such a case, when the four error correction encoding units 2013-1, 2013-2, 2013-3, and 2013-4 as in the fifteenth embodiment are used, it is possible to form the LSI or the FPGA.

It is to be noted that in the division and distribution process by the distribution unit 2017, the distribution process that is performed in two stages by the first distribution unit 2012 and the second distribution units 2016*a* and 2016*b* of the twelfth, thirteenth, and fourteenth embodiments is performed in one stage. Moreover, also in the fifteenth embodiment, a value which is a divisor of the frame size and which is equal to or larger than the number of bytes of an overhead element required for a process of a functional unit referring to the distributed signals to detect a frame structure is selected as the block size. Moreover, the distribution unit 2017 performs distribution to lanes 1 to 4 in accordance with the round-robin scheme and performs lane rotation on lanes 1 to 4 so that overhead elements periodically appear in the lanes.

As a result, it is possible to detect the frame structure even in the distributed signals output by the distribution unit 2017. Thus, it is possible to perform signal processing which uses the frame structure such as an error correction encoding process after the signals are distributed. Moreover, circuit elements that perform the signal processing can be divided and disposed at a subsequent stage of the distribution units. In the fifteenth embodiment, the error correction encoding unit is divided into four units, and thus it is possible to dispose the units more flexibly than in the multi-carrier optical transport system 2001. By increasing the degree of freedom of the layout in this manner, functions which cannot be achieved with a single device due to a constraint on the circuit scale can be achieved by dividing the circuit elements into a plurality of chips.

Figure 49:
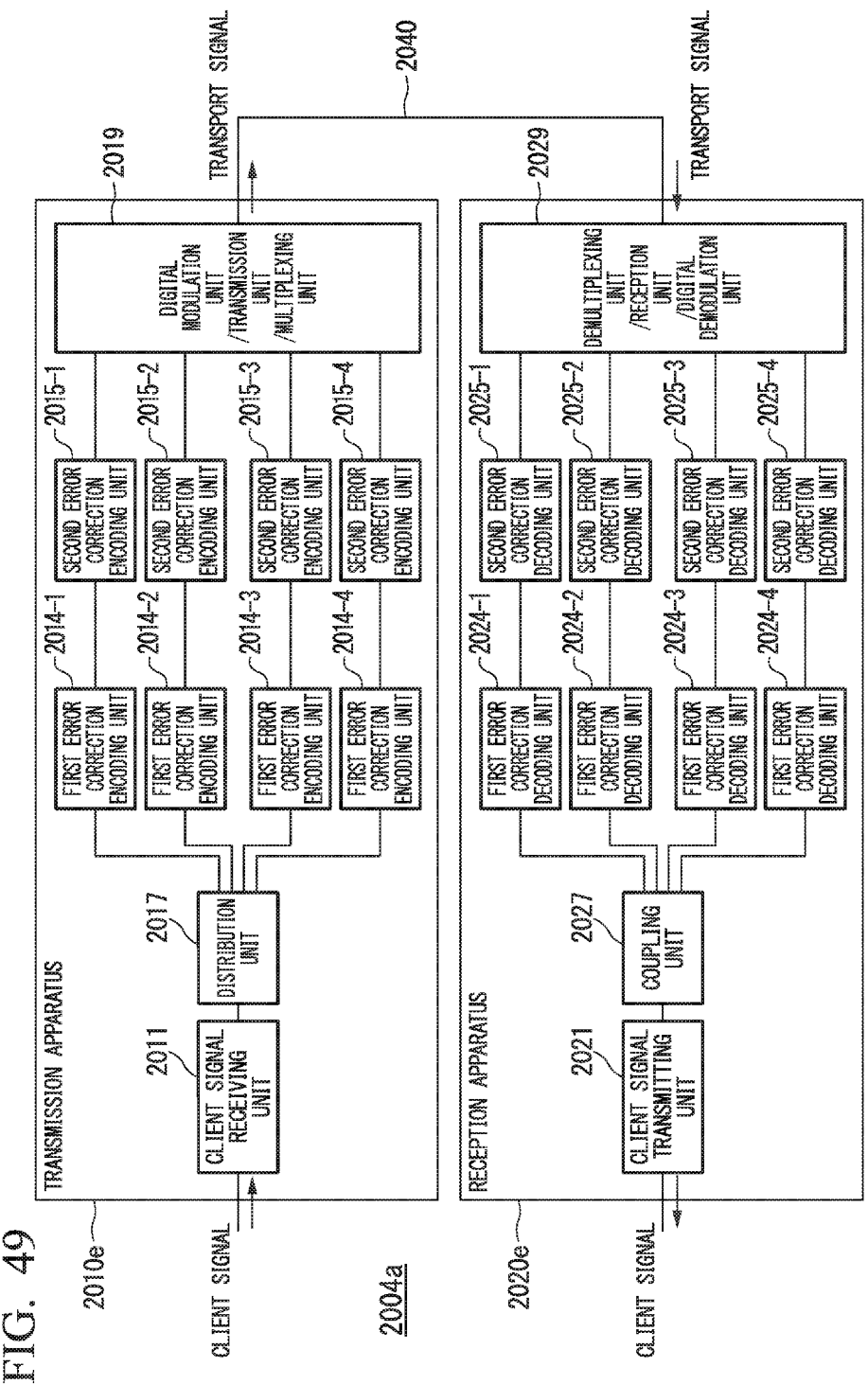
FIG. 49 is a block diagram illustrating a modified example (first example) of the multi-carrier optical transport system in accordance with the fifteenth embodiment.
Figure 50:
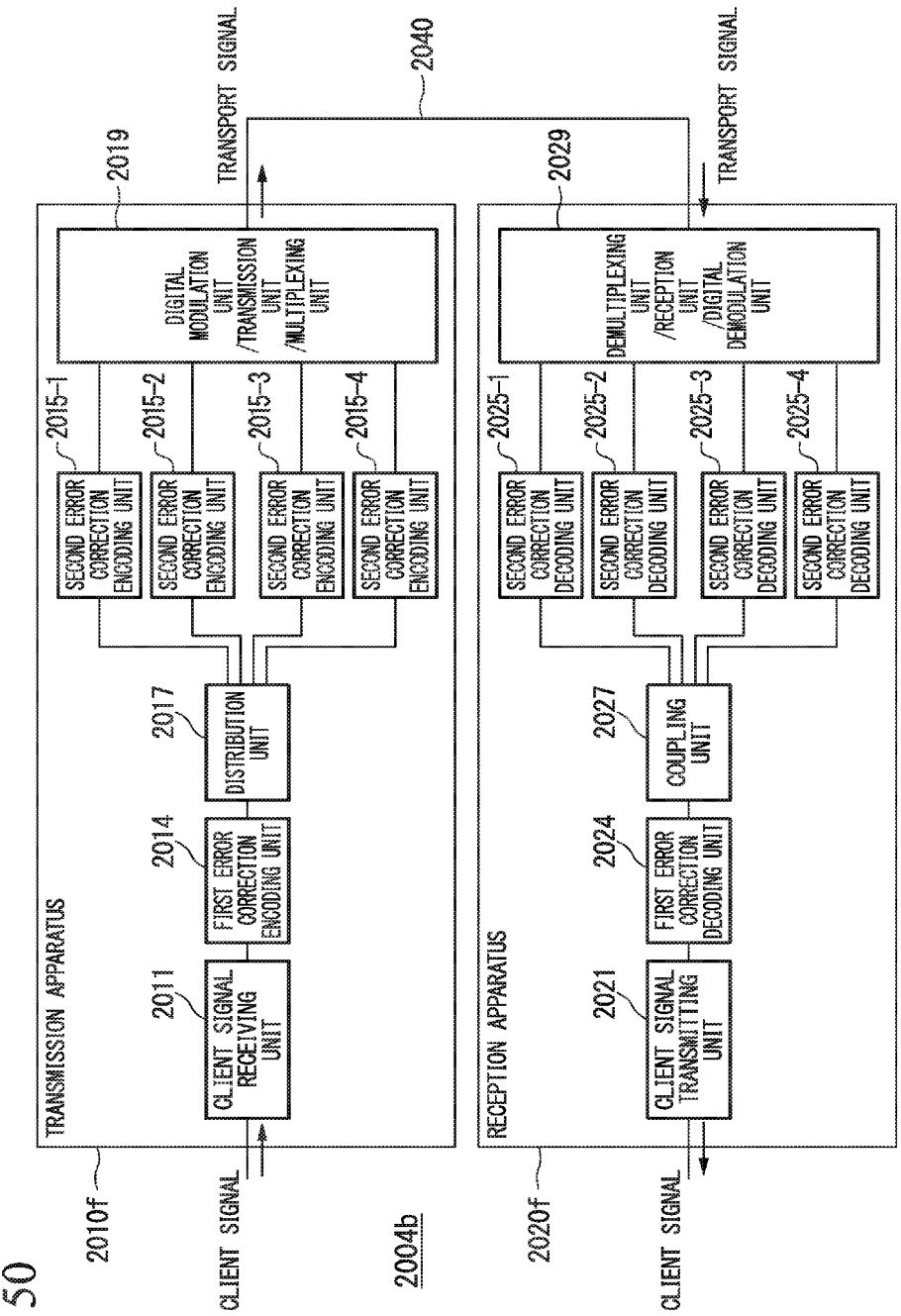
FIG. 50 is a block diagram illustrating a modified example (second example) of the multi-carrier optical transport system in accordance with the fifteenth embodiment.

Moreover, also in the multi-carrier optical transport system 2004 of the fifteenth embodiment, each of the error correction encoding units and the error correction decoding units may be divided into two as illustrated in FIG. 49. Moreover, as illustrated in FIG. 50, a first error correction encoding unit and a first error correction decoding unit among the two divided units may be disposed before the distribution unit 2017 and after the coupling unit 2027, respectively. Further, in the case of the configurations illustrated in FIGS. 49 and 50, similarly to the configurations of the modified example of the twelfth embodiment and the thirteenth and fourteenth embodiments, the first error correction encoding process performs HD-FEC with a redundancy of approximately 7%, and the second error correction encoding process performs SD-FEC with a redundancy of approximately 13%. Further, although FIGS. 48, 49, and 50 describe examples in which the number of distributions is four, the number of distributions is not limited to four, and may be a number larger than four.

It is to be noted that the redundancy of the error correction code and the encoding algorithm illustrated in the twelfth to fifteenth embodiments are examples only, and other redundancies and other algorithms may be applied.

Moreover, in the twelfth to fifteenth embodiments, it is assumed that a defined frame (e.g., the OTU4 frame or the like) is applied, but the frame configuration is not limited to that in the embodiments. A frame having an arbitrary frame length may be applied. Moreover, when an appropriate divisor is not present as the divisor of the frame length, the first distribution unit 2012, the second distribution units 2016a and 2016b, and the distribution unit 2017 may use a technique of appending a dummy byte to a frame as disclosed in Japanese Unexamined Patent Application, First Publication No. 2011-223454 to increase the frame length so that an appropriate divisor is selected. In this case, the first coupling unit 2022, the second coupling units 2026a and 2026b, and the coupling unit 2027 on the reception side perform a process of removing the dummy byte after reproducing a frame.

<Sixteenth Embodiment>

Figure 51:
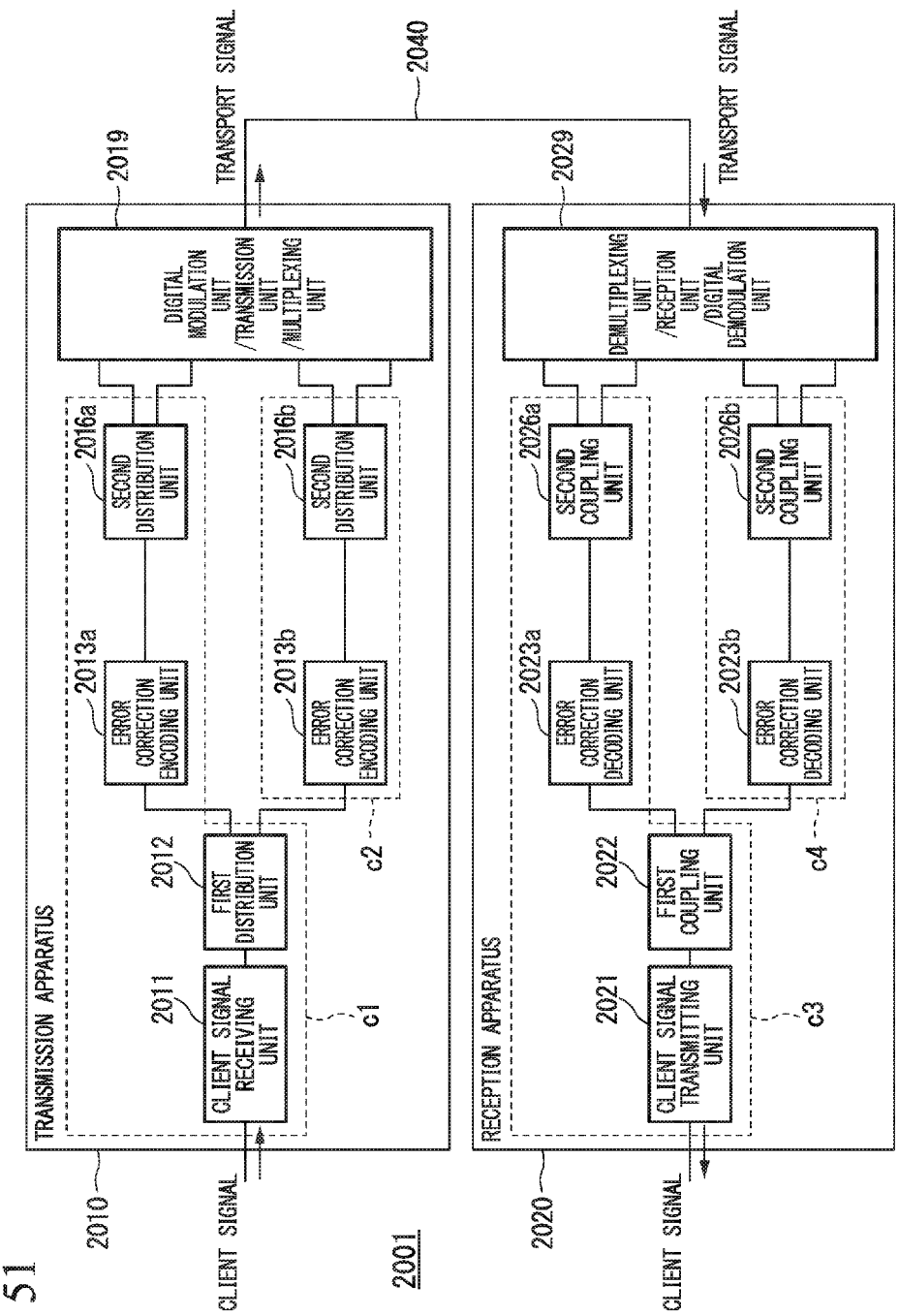
FIG. 51 is a diagram illustrating an example of chip division in the multi-carrier optical transport system of the twelfth embodiment in accordance with a sixteenth embodiment of the present invention.

Next, referring to FIGS. 51 to 57, an example of dividing functional units in the configurations illustrated in the twelfth to fifteenth embodiments into chips will be described as the sixteenth embodiment of the present invention. The twelfth to fifteenth embodiments describe a configuration in which a plurality of error correction encoding units are provided after the distribution unit and a plurality of error correction decoding units are provided before the coupling unit. As described above, in general, error correction processing circuits has a large size, and the higher the performance and the higher the data rate processed, the larger the size. Thus, in some cases, the use of a single LSI or FPGA makes it difficult to achieve the error correction encoding process due to a constraint on the circuit size. In contrast, for example, as illustrated in FIG. 51, when an error correction encoding process is performed at a subsequent stage of the first distribution unit 2012 in the multi-carrier optical transport system 2001 of the twelfth embodiment, the error correction encoding functional unit can be divided into two error correction encoding units (the error correction encoding units 2013a and 2013b) and disposed after the first distribution unit 2012. When the error correction encoding functional unit is divided into two, it is possible to decrease the bit rate processed by one functional unit and to decrease the circuit size of error correction encoding while maintaining the error correction performance. As a result, when the transmission apparatus 2010 is configured, a high-performance error correction encoding process can be achieved using two chips c1 and c2 each including an error correction encoding functional unit having an appropriate circuit size. The same is true for the error correction decoding units 2023a and 2023b of the reception apparatus 2020, and a high-performance error correction decoding process can be achieved using two chips c3 and c4.

Figure 52:
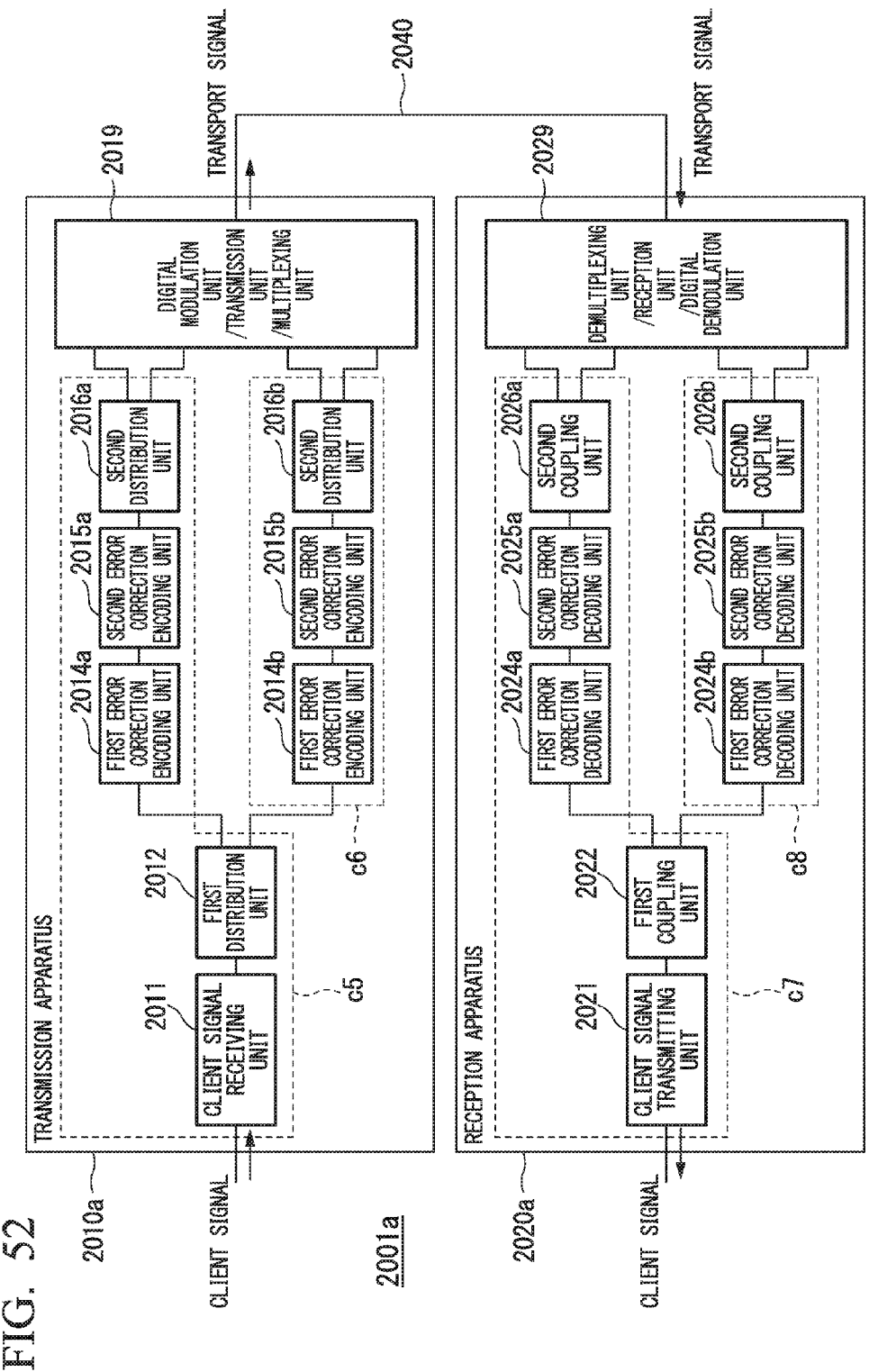
FIG. 52 is a diagram illustrating an example of chip division in the modified example of the multi-carrier optical transport system of the twelfth embodiment in accordance with the sixteenth embodiment of the present invention.
Figure 53:
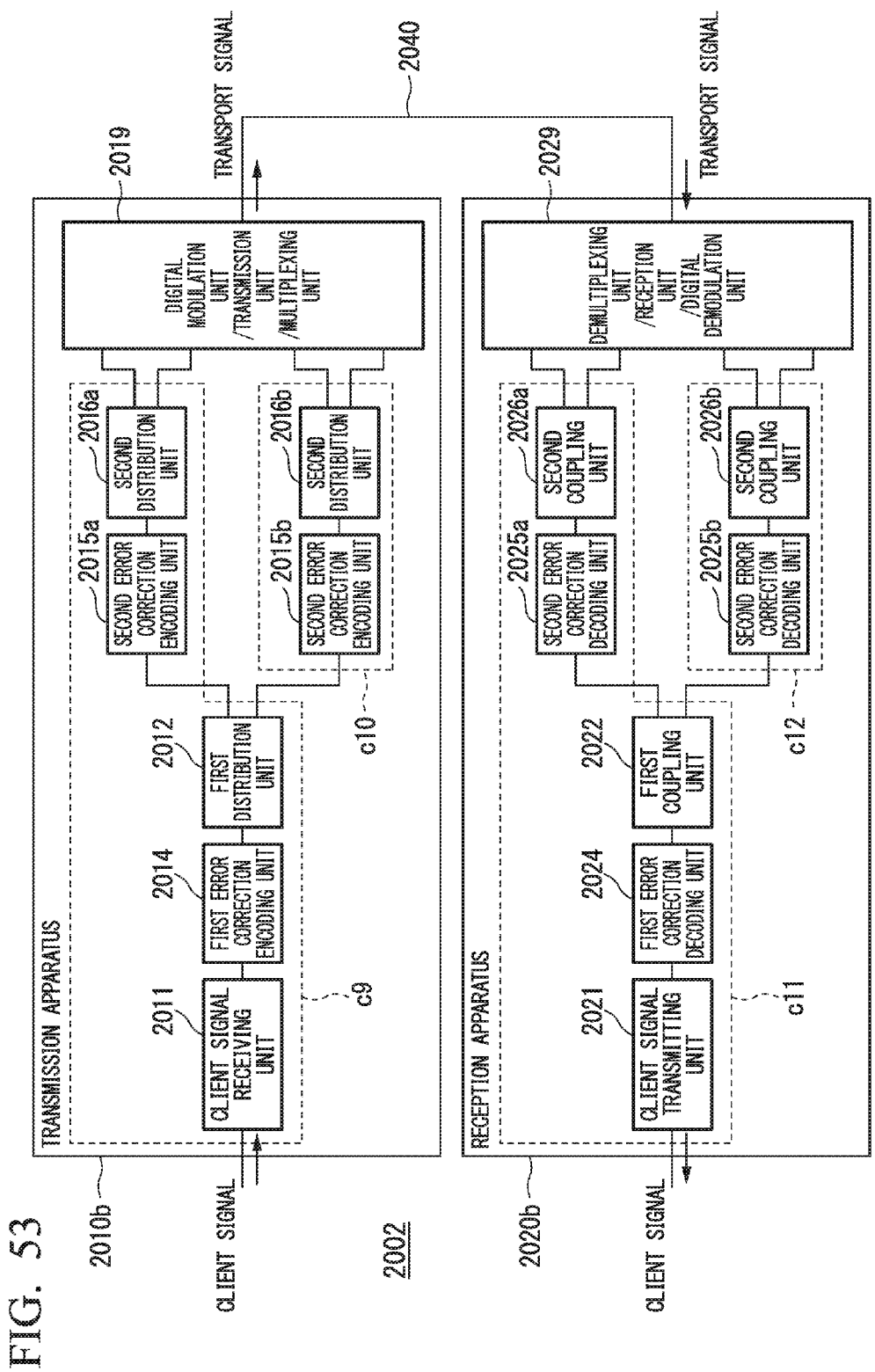
FIG. 53 is a diagram illustrating an example of chip division in the multi-carrier optical transport system of the thirteenth embodiment in accordance with the sixteenth embodiment of the present invention.
Figure 54:
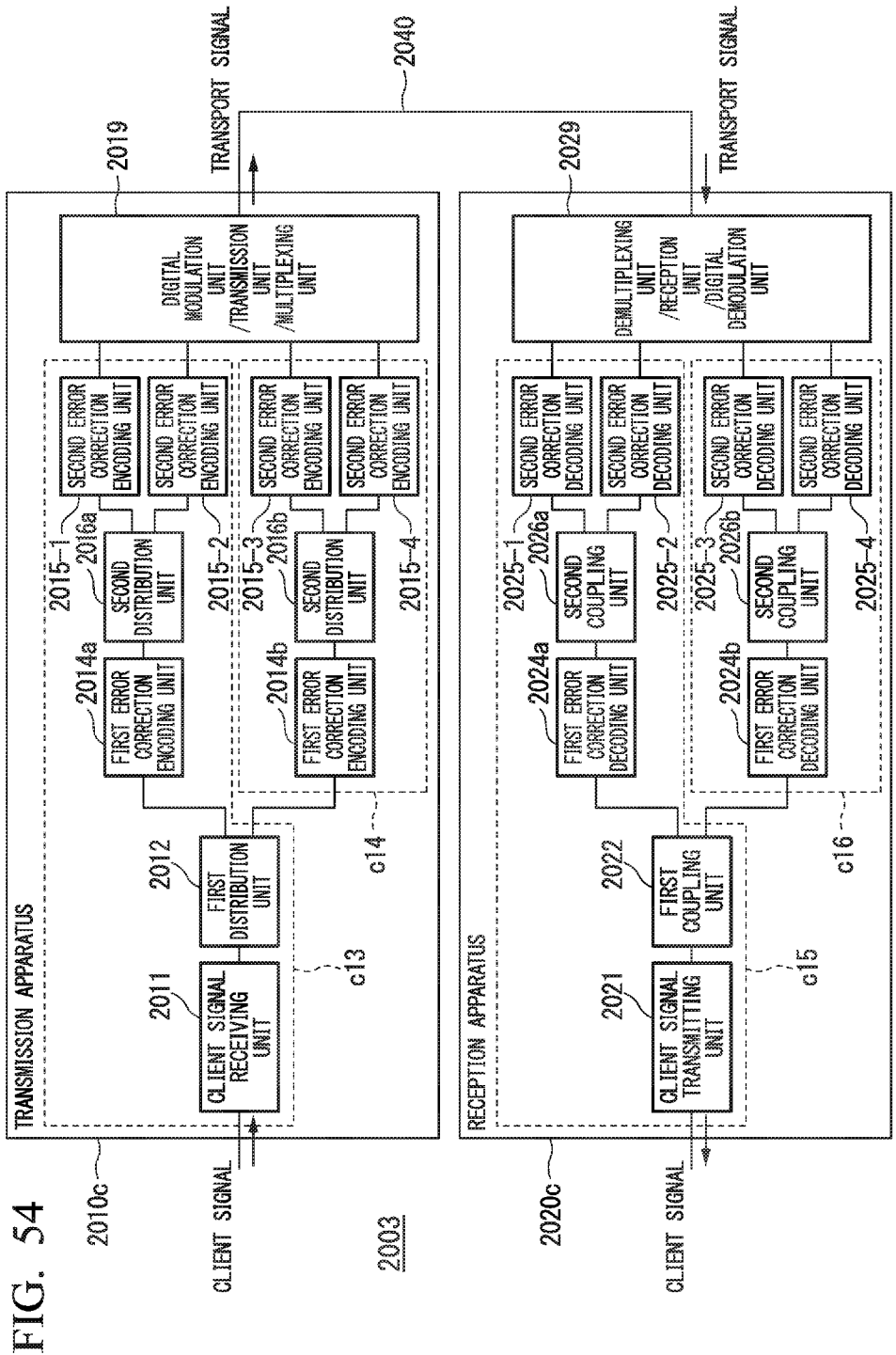
FIG. 54 is a diagram illustrating an example of chip division in the multi-carrier optical transport system of the fourteenth embodiment in accordance with the sixteenth embodiment of the present invention.

Moreover, similarly, in the case of the multi-carrier optical transport system 2001a of the modified example of the twelfth embodiment illustrated in FIG. 52, the transmission apparatus 2010a can be achieved by two separate chips c5 and c6, and the reception apparatus 2020a can be achieved by two separate chips c7 and c8. Moreover, in the case of the multi-carrier optical transport system 2002 of the thirteenth embodiment illustrated in FIG. 53, the transmission apparatus 2010b can be achieved by two separate chips including a chip c9 having two error correction encoding functional units and a chip c10 having one error correction encoding functional unit, and the reception apparatus 2020b can be achieved by two separate chips including a chip c11 having two error correction decoding functional units and a chip c12 having one error correction decoding functional unit. Further, in the case of the multi-carrier optical transport system 2003 of the fourteenth embodiment illustrated in FIG. 54, the transmission apparatus 2010c can be achieved by two separate chips c13 and c14 each having three error correction encoding functional units, and the reception apparatus 2020c can be achieved by two separate chips c15 and c16 each having three error correction decoding functional units. Further, in the case of the multi-carrier optical transport system 2004 of the fifteenth embodiment illustrated in FIG. 55, the transmission apparatus 2010d can be achieved by four separate chips c17, c18, c19, and c20 each having one error correction encoding functional unit, and the reception apparatus 2020d can be achieved by four separate chips c21, c22, c23, and c24 each having one error correction decoding functional unit. Further, in the case of the multi-carrier optical transport system 2004a of the fifteenth embodiment illustrated in FIG. 56, a transmission apparatus 2010e can be achieved by four separate chips c25, c26, c27, and c28 each having two error correction encoding functional units, and a reception apparatus 2020e can be achieved by four separate chips c29, c30, c31, and c32 each having two error correction decoding functional units. Further, in the case of the multi-carrier optical transport system 2004b of the fifteenth embodiment illustrated in FIG. 57, a transmission apparatus 2010f can be achieved by four separate chips c33, c34, c35, and c36 each having one error correction encoding functional unit, and a reception apparatus 2020f can be achieved by four separate chips c37, c38, c39, and c40 each having one error correction decoding functional unit.

It is to be noted that the chip divisions illustrated in FIGS. 51 to 57 are merely examples, and the functional units may be divided arbitrarily in accordance with a circuit size or the like.

Figure 55:
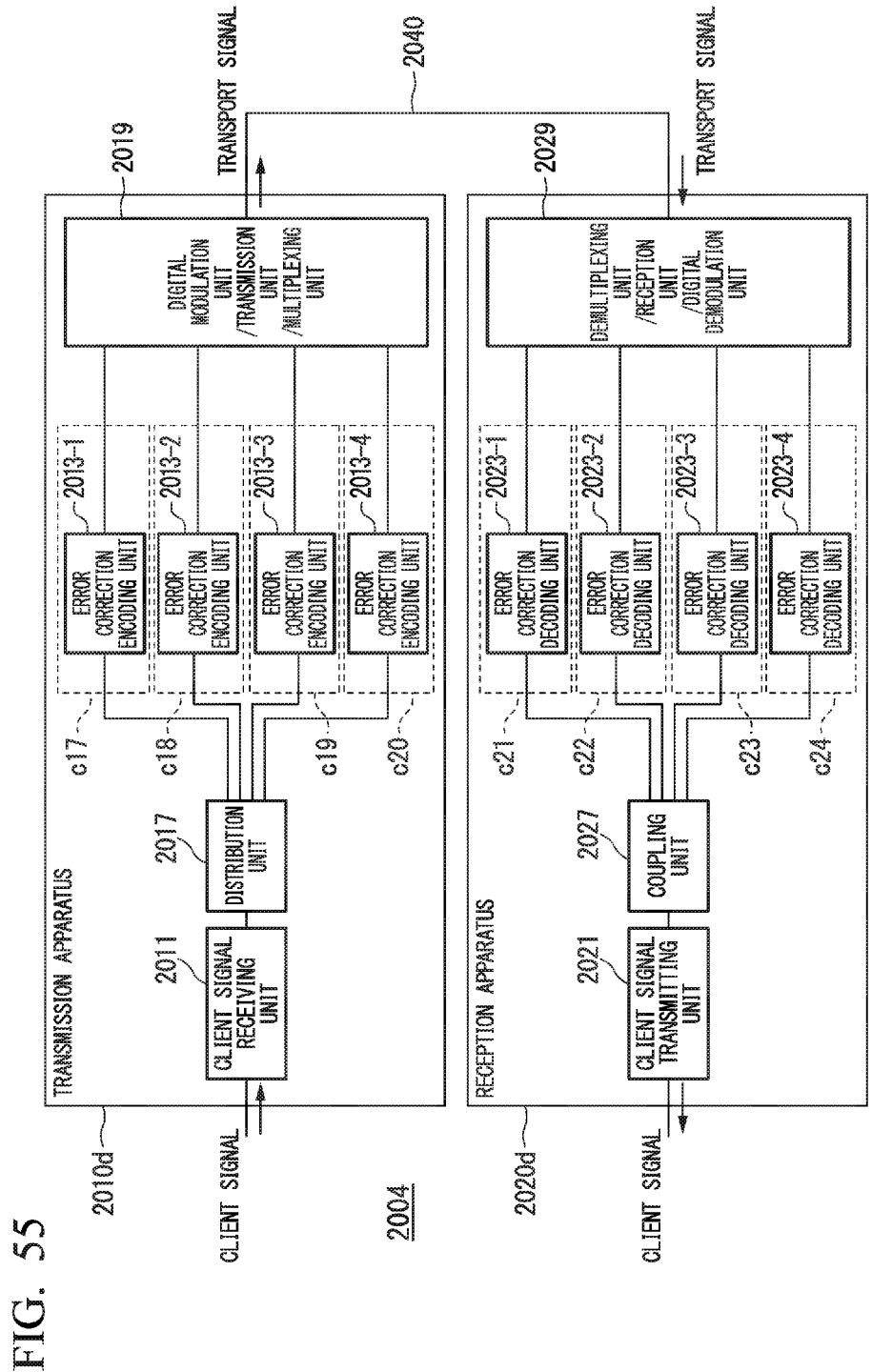
FIG. 55 is a diagram illustrating an example of chip division in the multi-carrier optical transport system of the fifteenth embodiment in accordance with the sixteenth embodiment of the present invention.
Figure 56:
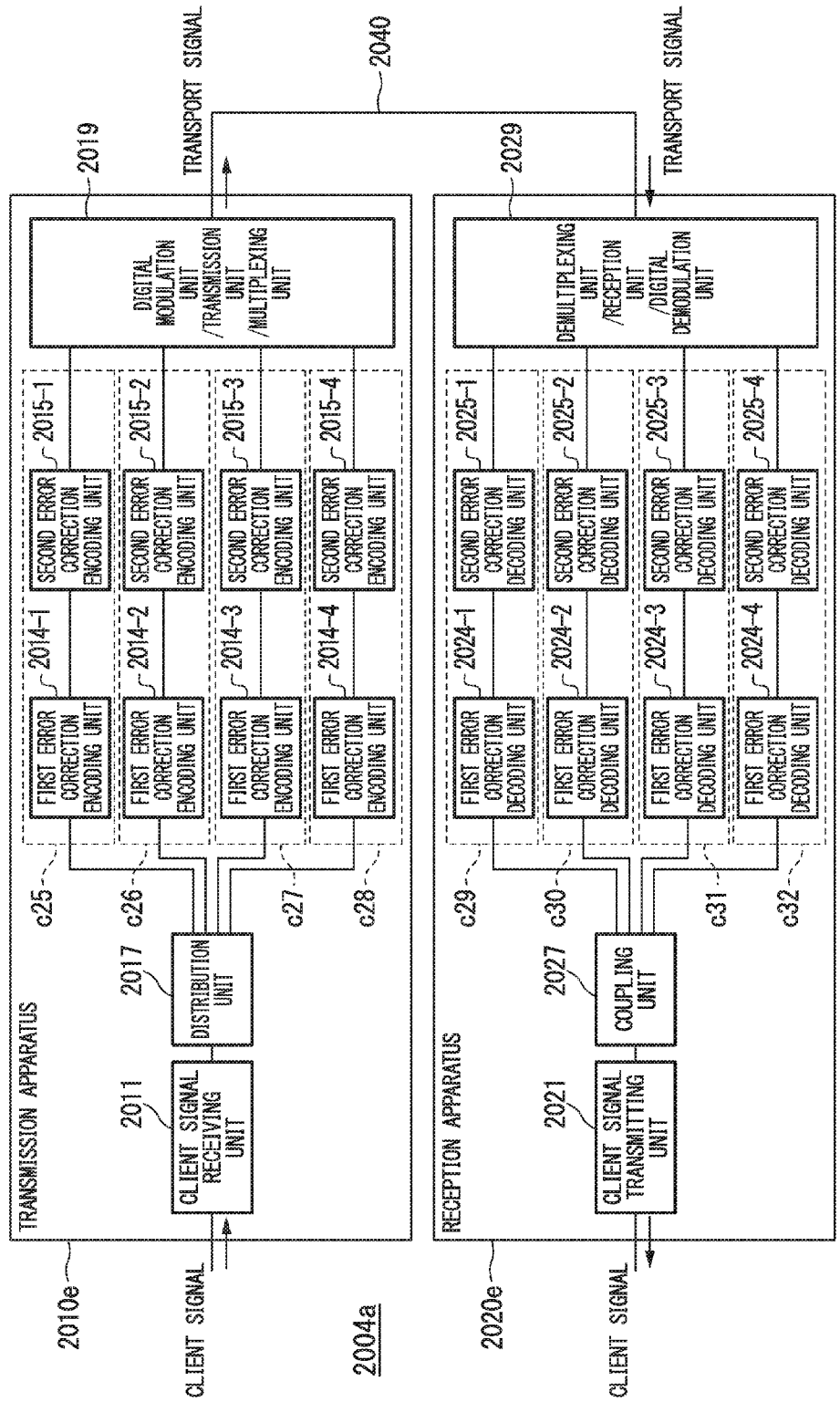
FIG. 56 is a diagram illustrating an example of chip division in the modified example (first example) of the multi-carrier optical transport system of the fifteenth embodiment in accordance with the sixteenth embodiment of the present invention.
Figure 57:
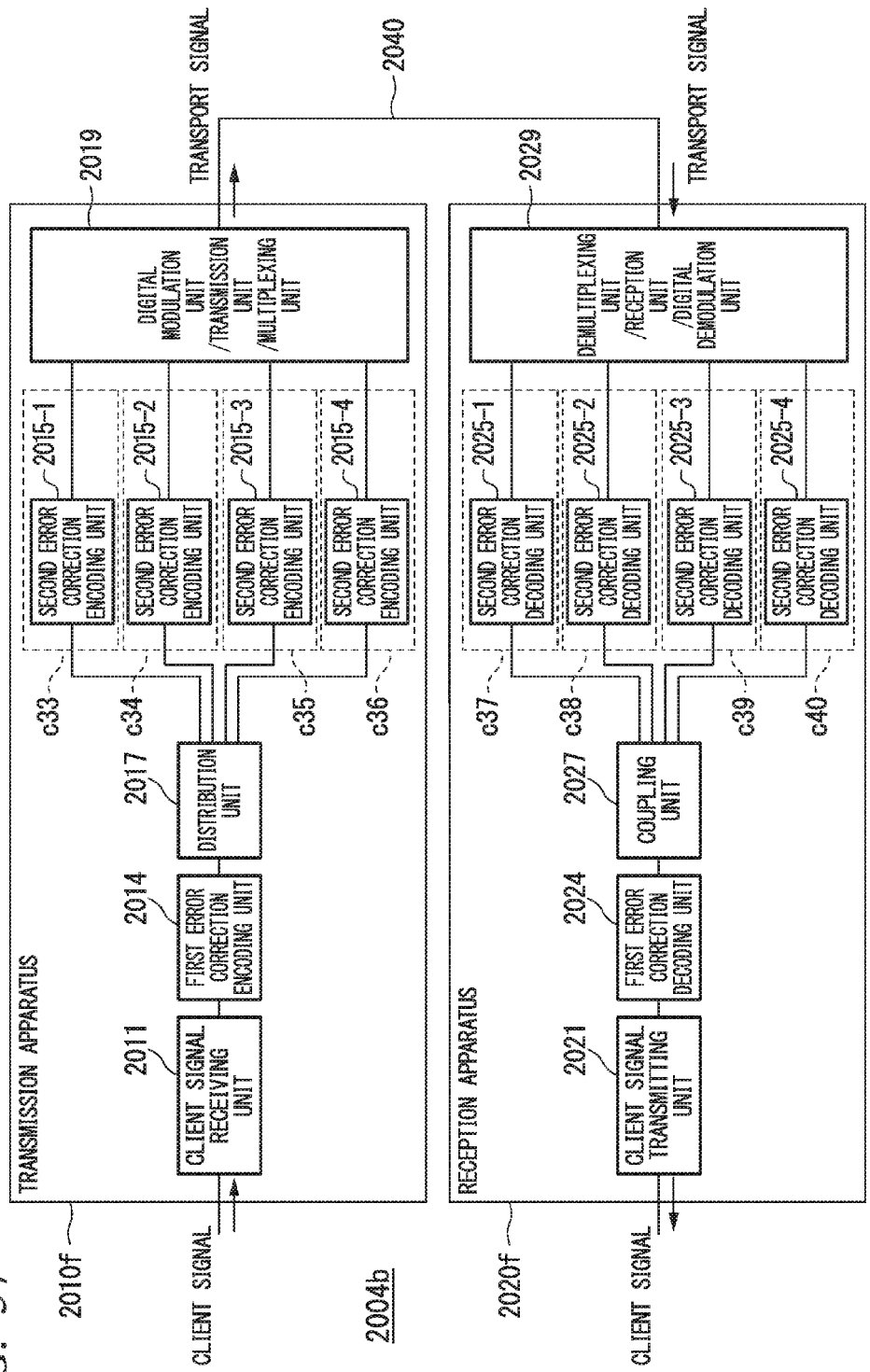
FIG. 57 is a diagram illustrating an example of chip division in the modified example (second example) of the multi-carrier optical transport system of the fifteenth embodiment in accordance with the sixteenth embodiment of the present invention.

Moreover, the client signal receiving unit 2011, the distribution unit 2017, the client signal transmitting unit 2021, and the coupling unit 2027 of FIGS. 55, 56, and 57 and the first error correction encoding unit 2014 and the first error correction decoding unit 2024 of FIG. 57 may be included in any one of the divided chips, they may be divided as another chip, or they may be combined arbitrarily and divided into chips so that an appropriate layout is obtained.

The transport apparatuses, the transponders, and the transmission apparatuses and the reception apparatuses of the multi-carrier optical transport systems in accordance with the above-described embodiments may be achieved by a computer. In this case, they may be achieved by recording a program for achieving their functions on a computer-readable recording medium and causing a computer system to read and execute the program recorded on the recording medium. It is to be noted that the "computer system" mentioned herein includes an operating system (OS) and hardware such as a peripheral device. Moreover, the "computer-readable recording medium" refers to a portable medium such as a flexible disc, a magneto-optical disc, a read only memory (ROM), or a compact disc (CD)-ROM and a storage device such as a hard disk included in a computer system. Further, the "computer-readable recording medium" may include a medium that holds a program dynamically for a short period of time, such as a communication line in the case of transmitting the program via a network, such as the Internet, or a communication line, such as a telephone line, and a medium that holds a program for a certain period of time, such as a volatile memory inside the computer system which serves as a server or a client. Moreover, the program may be configured to achieve part of the above-described functions, or may be configured to achieve the above-described functions in combination with a program already recorded in the computer system. Moreover, the transport apparatuses, the transponders, and the transmission apparatuses and the reception apparatuses of the multi-carrier optical transport systems may be achieved using a programmable logic device such as an FPGA.

While embodiments of the present invention have been described in detail with reference to the drawings, specific configurations are not limited to these embodiments, and designs or the like which do not depart from the gist of the present invention may be included. For example, the above-described embodiments may be combined appropriately.

INDUSTRIAL APPLICABILITY

The present invention can be applied to a transport system that relays signals, for example. In accordance with the present invention, it is possible to transfer a plurality of client signals as a plurality of line signals of different systems.

DESCRIPTION OF REFERENCE SIGNS 1, 201, 301, 501, 601 Transport apparatus
11-1 to 11-3, 211-1, 311-1 to 311-4, 511-1 to 511-5, 611-1 to 611-5 Client signal transceiving unit
12-1 to 12-3, 212-1, 312-1 to 312-4 Parallel signal transceiving unit
13-1, 13-2, 313-1, 313-2, 313-3 Signal merging/branching unit
14, 213 Signal branching/merging unit
15-1, 15-2, 215-1, 215-2, 315-1, 315-2, 315-3 Inter-chip signal transceiving unit
16-1, 16-2, 216-1, 216-2, 316-1, 316-2, 316-3 Line-side signal output/input unit
17-1, 17-2, 217-1, 217-2, 317-1, 317-2, 317-3, 517-1, 517-2, 617-1, 617-2 Line signal transceiving unit
18, 218, 318-1, 318-2, 518 Inter-chip wiring
19, 19-1, 19-2, 19-3, 19-4, 19-5, 19-6 Framing processing unit
20-1, 20-2, 20-3, 20-4, 20-5, 20-6 Digital signal processing unit
1001, 1001a, 1001b Transponder
1011 Client signal transceiving unit
1012, 1012b Framing processing unit
1013, 1013a, 1013b Digital signal processing unit
1014 Line signal transceiving unit
1015 Fixed-rate framing processing unit
1016 Variable-rate framing processing unit
1017 Transmission signal processing unit
1018 Reception signal processing unit
1121, 1151 Mapping unit
1122 Dummy signal insertion unit
1123, 1153 Overhead inserting unit
1124, 1154 Parallel signal transmitting unit
1125, 1155 Parallel signal receiving unit
1126, 1156 Overhead extracting unit
1127 Dummy signal removing unit
1128, 1158 Demapping unit
1131, 1171 Parallel signal receiving unit
1132, 1132a Transmission-side rate conversion unit
1133, 1173 Error correction encoding unit
1134 Digital signal transmission processing unit
1135 Digital signal reception processing unit
1136, 1186 Error correction decoding unit
1137, 1137a Reception-side rate conversion unit
1138, 1188 Parallel signal transmitting unit
1174 Signal merging unit
1181 Signal branching unit
2001 Multi-carrier optical transport system
2010 Transmission apparatus
2011 Client signal receiving unit
2012 First distribution unit
2013a Error correction encoding unit
2013b Error correction encoding unit
2016a Second distribution unit
2016b Second distribution unit
2019 Digital modulation unit/transmission unit/multiplexing unit
2020 Reception apparatus
2021 Client signal transmitting unit
2022 First coupling unit
2023a Error correction decoding unit
2023b Error correction decoding unit
2026a Second coupling unit
2026b Second coupling unit
2029 Demultiplexing unit/reception unit/digital demodulation unit
2040 Optical transmission path

The invention claimed is:

1. A transport apparatus comprising:
a client signal transceiving unit which transceives a client signal;
a line signal transceiving unit which performs electric-optic conversion on a line signal to be transmitted, transmits an optical line signal, performs optic-electric conversion on a received line signal, and outputs an electrical line signal; and
a plurality of signal processing units which perform signal processing on the client signal to generate the line signal to be transmitted and perform signal processing on the electrical line signal to generate the client signal,
wherein each of the plurality of signal processing units comprises a signal transceiving unit which performs transfer of a branched signal obtained by branching a signal to be transmitted and a merged signal obtained by merging received signals with another signal processing unit, and
the signal transceiving unit of each of the plurality of signal processing units and the signal transceiving unit of the other signal processing unit are coupled via an inter-chip wiring.

2. The transport apparatus according to claim 1, wherein each of the plurality of signal processing units comprises a signal branching/merging unit which branches a signal to be transferred to the other signal processing unit among signals to be transferred from the client signal transceiving unit to the line signal transceiving unit and merges signals transferred from the other signal processing unit among signals to be transferred from the line signal transceiving unit to the client signal transceiving unit.

3. The transport apparatus according to claim 1, wherein each of the plurality of signal processing units comprises a signal merging/branching unit which merges signals to be transferred from the client signal transceiving unit to the line signal transceiving unit and branches a signal to be transferred from the line signal transceiving unit to the client signal transceiving unit.

4. The transport apparatus according to claim 1, wherein each of the plurality of signal processing units further comprises a framing processing unit which performs framing on the client signal input from the client signal transceiving unit and recovers the client signal from a frame received from the line signal transceiving unit.

5. The transport apparatus according to claim 1, wherein each of the plurality of signal processing units further comprises a digital signal processing unit which performs signal processing on a signal to be transferred from the client signal transceiving unit to the line signal transceiving unit and a signal to be transferred from the line signal transceiving unit, to the client signal transceiving unit.

6. The transport apparatus according to claim 1, wherein each of the plurality of signal processing units performs rate conversion between the client signal transceived with a first transfer rate and the line signal transceived with a second transfer rate, and
each of the plurality of signal processing units comprises:
a transmission-side framing processing unit which sets the client signal received with the first transfer rate in a transport frame that is compliant with a third transfer rate, inserts a dummy signal having a deficient data amount for transfer with the third transfer rate into the transport frame that is compliant with the third transfer rate, and transmits the transport frame that is compliant with the third transfer rate with the third transfer rate;
a transmission-side digital signal processing unit which sets the client signal set in the transport frame received with the third transfer rate from the transmission-side framing processing unit in a transport frame that is compliant with the second transfer rate and transmits the transport frame that is compliant with the second transfer rate with the second transfer rate as the line signal;
a reception-side digital signal processing unit which sets a client signal in a transport frame received with the second transfer rate as the electrical line signal in the transport frame that is compliant with the third transfer rate, inserts a dummy signal having a deficient data amount for transfer with the third transfer rate into the transport frame that is compliant with the third transfer rate, and transmits the transport frame that is compliant with the third transfer rate with the third transfer rate; and
a reception-side framing processing unit which extracts the client signal set in the transport frame received with the third transfer rate from the reception-side digital signal processing unit and transmits the extracted client signal with the first transfer rate.

7. The transport apparatus according to claim 1, wherein the client signal transceiving unit receives the client signal and outputs a signal having a frame structure to the plurality of signal processing units,
each of the plurality of signal processing units comprises:
a distribution unit which divides the signal having the frame structure based on a value equal to or larger than the number of bytes of an overhead element used for detecting the frame structure of the signal having the frame structure to generate a plurality of blocks of the same size and distributes the blocks to a plurality of lanes so that a block including the overhead element among the blocks is included in each lane;
a transmission-side signal processing unit which detects the frame structure based on the overhead element included in each of signals of the plurality of lanes distributed by the distribution unit and performs transmission-side signal processing on each of the signals of the plurality of lanes;
a transmitting unit which transmits signals included in the plurality of lanes, having been subjected to the transmission-side signal processing as the line signal;
a reception-side signal processing unit which performs reception-side signal processing corresponding to the transmission-side signal processing performed by the transmission-side signal processing unit on the electrical line signal and outputs signals having been subjected to the reception-side signal processing to the lanes; and
a coupling unit which detects the frame structure based on the overhead element included in the signals having been subjected to the reception-side signal processing and distributed to the plurality of lanes and couples the signals having been subjected to the reception-side signal processing and distributed to the plurality of lanes,
wherein the client signal transceiving unit receives a signal coupled by the coupling unit and outputs the client signal.

8. A transport apparatus comprising:
a client signal transceiving unit which transceives a client signal;
a mapping unit which maps the received client signal to a first transport frame;
a transmission-side rate conversion unit which performs rate conversion on the first transport frame to generate a second transport frame;
a line signal transceiving unit which converts the second transport frame obtained by the rate conversion into an optical signal, transmits the converted optical signal as a line signal, converts a received line signal into an electrical signal, and outputs an electrical line signal;
a reception-side rate conversion unit which performs rate conversion on a third transport frame included in the electrical line signal to generate a fourth transport frame; and
a demapping unit which extracts a client signal from the fourth transport frame and outputs the extracted client signal to the client signal transceiving unit.

9. The transport apparatus according to claim 8, wherein the client signal transceiving unit transceives the client signal with a first transfer rate, and the line signal transceiving unit transceives the line signal with a second transfer rate,
the mapping unit sets the client signal received with the first transfer rate in the first transport frame that is compliant with a third transfer rate,
the transport apparatus comprises a transmission-side framing processing unit which inserts a dummy signal having a deficient data amount for transfer with the third transfer rate into the first transport frame and transmits the first transport frame with the third transfer rate,
the transmission-side rate conversion unit sets the client signal set in the first transport frame received from the transmission-side framing processing unit in the second transport frame that is compliant with the second transfer rate and transmits the second transport frame with the second transfer rate, the reception-side rate conversion unit sets a client signal in the third transport frame received with the second transfer rate as the electrical line signal in the fourth transport frame that is compliant with the third transfer rate, inserts a dummy signal having a deficient data amount for transfer with the third transfer rate into the fourth transport frame, and transmits the fourth transport frame with the third transfer rate, and the demapping unit extracts the client signal set in the fourth transport frame received from the reception-side rate conversion unit and transmits the extracted client signal to the client signal transceiving unit with the first transfer rate.

10. The transport apparatus according to claim 8, wherein the mapping unit receives the client signal and outputs a signal having a frame structure, the transport apparatus comprises:

a distribution unit which divides the signal having the frame structure based on a value equal to or larger than the number of bytes of an overhead element used for detecting the frame structure of the signal having the frame structure to generate a plurality of blocks of the same size and distributes the blocks to a plurality of lanes so that a block including the overhead element among the generated blocks is included in each lane; and a transmission-side signal processing unit which detects the frame structure based on the overhead element included in each of signals of the plurality of lanes distributed by the distribution unit and performs transmission-side signal processing on each of the signals of the plurality of lanes, the line signal transceiving unit transmits signals included in the plurality of lanes, having been subjected to the transmission-side signal processing;

the transport apparatus comprises:

a reception-side signal processing unit which performs reception-side signal processing corresponding to the transmission-side signal processing performed by the transmission-side signal processing unit on the electrical line signal and outputs signals having been subjected to the reception-side signal processing to the lanes; and a coupling unit which detects the frame structure based on the overhead element included in the signals having been subjected to the reception-side signal processing and distributed to the plurality of lanes and couples the signals having been subjected to the reception-side signal processing and distributed to the plurality of lanes, and the client signal transceiving unit receives a signal coupled by the coupling unit and outputs the client signal.

11. A transport method comprising:

a step of receiving a client signal;

a step of transferring a branched signal obtained by branching a signal to be transmitted and a merged signal obtained by merging received signals between each of a plurality of signal processing units and another signal processing unit via an inter-chip wiring that couples the plurality of signal processing units;

a step of performing signal processing on the client signal in the plurality of signal processing units to generate a line signal to be transmitted;

a step of performing optic-electric conversion on the line signal to be transmitted and transmitting an optical line signal;

a step of performing optic-electric conversion on a received line signal to output an electrical line signal;

a step of performing signal processing on the electrical line signal in the plurality of signal processing units to generate a client signal; and a step of transmitting the generated client signal.

\* \* \* \* \*